US012789874B2

(12) United States Patent
Hittepole et al.

(10) Patent No.: US 12,789,874 B2
(45) Date of Patent: Nov. 10, 2026

(54) LAYOVER BRACKET SYSTEM

(71) Applicant: Crown Equipment Corporation, New Bremen, OH (US)

(72) Inventors: Neal A. Hittepole, Celina, OH (US); Sheldon R. Houseworth, Eaton, OH (US); Kent Waller, Greenville, OH (US); Kevin D. Ranly, Fort Loramie, OH (US); Nicholas J. Schlater, North Star, OH (US); Gregory J. Meiring, Minster, OH (US); Patrick H. Wenning, Sidney, OH (US); Steven E. Koenig, New Bremen, OH (US); Kevin A. Gilliland, Coldwater, OH (US); John F. Hemmelgarn, Coldwater, OH (US)

(73) Assignee: Crown Equipment Corporation, New Bremen, OH (US)

( * ) Notice: Subject to any disclaimer, the term of this patent is extended or adjusted under 35 U.S.C. 154(b) by 252 days.

(21) Appl. No.: 18/754,366

(22) Filed: Jun. 26, 2024

(65) Prior Publication Data

US 2024/0343286 A1 Oct. 17, 2024

Related U.S. Application Data

(62) Division of application No. 17/653,204, filed on Mar. 2, 2022, now Pat. No. 12,377,896.

(Continued)

(51) Int. Cl.
*B62B 3/10* (2006.01)

(52) U.S. Cl.
CPC .................................... *B62B 3/10* (2013.01)

(58) Field of Classification Search
CPC ........... F16M 11/42; F16M 3/00; B66F 9/063; B66F 9/07504; B66F 9/07563; B66F 2700/123; B60P 3/064; B62B 3/10

(Continued)

(56) References Cited

U.S. PATENT DOCUMENTS

| | | |
|---|---|---|
| 1,591,719 A | 7/1926 | Merrifield |
| 1,604,723 A | 10/1926 | Rutherford |

(Continued)

FOREIGN PATENT DOCUMENTS

| | | |
|---|---|---|
| CH | 654279 A5 | 2/1986 |
| CN | 104030195 B | 4/2016 |

(Continued)

OTHER PUBLICATIONS

Farooji, Vahid Etminan; Examination Report No. 1 dated Jan. 14, 2026; Australia Application No. 2022228491; IP Australia; Canberra, Australia.

(Continued)

*Primary Examiner* — James A Shriver, II
*Assistant Examiner* — Hilary L Johns
(74) *Attorney, Agent, or Firm* — Stevens & Showalter LLP

(57) ABSTRACT

A layover bracket system is provided for supporting an industrial vehicle in a horizontal position on a floor surface. The layover bracket system includes a base section removably attached to a first portion of the vehicle at a first location, and an extension section removably attached to a second portion of the vehicle at a second location spaced apart in a first direction from the first location. The first direction is parallel to a vertical axis of the vehicle when positioned in an upright position. The extension section is pivotably coupled to the base section.

18 Claims, 37 Drawing Sheets

Related U.S. Application Data

(60) Provisional application No. 63/157,330, filed on Mar. 5, 2021.

(58) Field of Classification Search
USPC ........................................................ 280/79.3
See application file for complete search history.

(56) References Cited

U.S. PATENT DOCUMENTS

| | | | | |
|---|---|---|---|---|
| 3,052,323 | A | 9/1962 | Hopfeld | |
| 3,385,401 | A | 5/1968 | Campbell et al. | |
| 3,512,663 | A | 5/1970 | Guerrico | |
| 3,533,640 | A | 10/1970 | Fator | |
| 3,809,261 | A | 5/1974 | Lee | |
| 4,098,518 | A | 7/1978 | Minkoff | |
| 4,465,421 | A | 8/1984 | Murillo | |
| 4,784,402 | A | 11/1988 | Roman | |
| 4,863,334 | A | 9/1989 | Girerd | |
| 6,302,381 | B1 * | 10/2001 | Roll | B60D 1/665 254/424 |
| 7,641,235 | B1 * | 1/2010 | Anduss | B62B 5/0003 224/520 |
| 7,653,204 | B2 | 1/2010 | Chen et al. | |
| 8,181,983 | B2 * | 5/2012 | Walstrom | B60S 9/21 254/419 |
| 8,348,241 | B2 * | 1/2013 | Trowbridge | B60D 1/665 254/420 |
| 8,505,691 | B2 * | 8/2013 | Smeeton | B66F 9/07504 414/800 |
| 8,919,476 | B2 | 12/2014 | Holland et al. | |
| 9,014,836 | B2 | 4/2015 | Stone et al. | |
| 9,090,357 | B2 | 7/2015 | Oberoi et al. | |
| 9,365,401 | B2 * | 6/2016 | Nakazawa | B60K 1/00 |
| 9,555,849 | B1 * | 1/2017 | Abbott | B62K 5/10 |
| 9,751,546 | B2 | 9/2017 | Spruth et al. | |
| 10,093,368 | B2 | 10/2018 | Black et al. | |
| 10,207,762 | B2 * | 2/2019 | Takenaka | B60G 17/0162 |
| 10,427,254 | B2 | 10/2019 | Day et al. | |
| 10,907,764 | B2 * | 2/2021 | Waller | B66F 9/07504 |
| 2001/0045718 | A1 | 11/2001 | Boirum | |
| 2005/0212243 | A1 | 9/2005 | Terry | |
| 2006/0108470 | A1 | 5/2006 | McCrary et al. | |
| 2007/0036627 | A1 | 2/2007 | Wright et al. | |
| 2008/0205763 | A1 | 8/2008 | Marsh et al. | |
| 2009/0016863 | A1 | 1/2009 | Rauch et al. | |
| 2009/0057633 | A1 * | 3/2009 | Beck | B66F 3/16 280/475 |
| 2009/0139803 | A1 * | 6/2009 | Smeeton | B66F 9/07504 187/408 |
| 2009/0142174 | A1 | 6/2009 | Fischer et al. | |
| 2009/0236577 | A1 * | 9/2009 | Pollock | B60S 9/18 254/418 |
| 2011/0297905 | A1 | 12/2011 | Arensdorf et al. | |
| 2012/0251276 | A1 | 10/2012 | Rathbun et al. | |
| 2014/0115860 | A1 | 5/2014 | Sarh et al. | |
| 2014/0246637 | A1 * | 9/2014 | Anderson | B60S 9/18 254/425 |
| 2015/0314889 | A1 | 11/2015 | Day et al. | |
| 2015/0314890 | A1 | 11/2015 | DesJardien et al. | |
| 2015/0314892 | A1 | 11/2015 | DesJardien et al. | |
| 2016/0011593 | A1 | 1/2016 | Oberoi et al. | |
| 2016/0375948 | A1 * | 12/2016 | Takenaka | B60G 17/0162 280/5.506 |
| 2017/0066462 | A1 | 3/2017 | Wright | |
| 2017/0158476 | A1 | 6/2017 | Brunckhorst et al. | |
| 2017/0190335 | A1 * | 7/2017 | Gillett | B60K 7/0007 |
| 2017/0308084 | A1 | 10/2017 | Spicer et al. | |
| 2018/0057050 | A1 * | 3/2018 | Takenaka | B60G 17/0162 |
| 2018/0237065 | A1 * | 8/2018 | Yamamoto | B60G 21/007 |
| 2019/0135600 | A1 * | 5/2019 | Waller | B66F 9/07563 |
| 2019/0144035 | A1 * | 5/2019 | Doerksen | B62K 5/10 280/124.103 |
| 2020/0269916 | A1 * | 8/2020 | Doerksen | B62D 9/02 |
| 2020/0283092 | A1 * | 9/2020 | Doerksen | B62M 6/50 |
| 2021/0061348 | A1 * | 3/2021 | Araki | B62D 61/08 |
| 2022/0281501 | A1 | 9/2022 | Hittepole et al. | |
| 2022/0324285 | A1 * | 10/2022 | Wilcox | B60G 21/007 |
| 2023/0088275 | A1 * | 3/2023 | Weiss | B62D 9/02 280/124.103 |
| 2023/0202745 | A1 | 6/2023 | Fletcher et al. | |
| 2023/0348010 | A1 * | 11/2023 | Klier | B62K 5/05 |
| 2026/0005391 | A1 * | 1/2026 | Hamzaj | H01M 50/211 |
| 2026/0018704 | A1 * | 1/2026 | Venturi | H01M 10/6568 |

FOREIGN PATENT DOCUMENTS

| | | | |
|---|---|---|---|
| CN | 103158889 | B | 12/2016 |
| CN | 112009381 | A | 12/2020 |
| DE | 102018112568 | A1 | 11/2019 |
| EP | 0855330 | A1 | 7/1998 |
| JP | 2011063947 | A | 3/2011 |
| WO | 2019090027 | A1 | 5/2019 |

OTHER PUBLICATIONS

Sheppard, Bruce; Extended European Search Report dated Jul. 5, 2024; European Application No. 24164902.9; European Patent Office; Munich, Germany.

Sheppard, Bruce; Extended European Search Report dated Jul. 22, 2024; European Application No. 24164903.7; European Patent Office; Munich, Germany.

Sheppard, Bruce; Extended European Search Report dated Nov. 26, 2024; European Application No. 24192732.6; European Patent Office; Munich, Germany.

Sheppard, Bruce; Extended European Search Report dated Nov. 27, 2024; European Application No. 24192734.2; European Patent Office; Munich, Germany.

Sheppard, Bruce; Extended European Search Report dated Nov. 27, 2024; European Application No. 24192736.7; European Patent Office; Munich, Germany.

Sheppard, Bruce; Extended European Search Result dated Apr. 9, 2025; European Application No. 25150356.1; European Patent Office; Munich, Germany.

Johns, Hilary Lynn; Notice of Allowance and Fee(s) due dated Mar. 28, 2025; U.S. Appl. No. 17/653,204; United States Patent and Trademark Office; Alexandria, Virginia.

Schlater, Nicholas J.; U.S. Appl. No. 19/386,332, filed Nov. 12, 2025 entitled "Layover Fixture"; United States Patent and Trademark Office; Alexandria, Virginia.

Johns, Hilary Lynn; Non-Final Office Action dated Aug. 29, 2024; U.S. Appl. No. 17/653,204; United States Patent and Trademark Office; Alexandria, Virginia.

Henrot, Benoist; Canadian Office Action dated Aug. 15, 2024; Canadian Application No. 3,076,675; Canadian Intellectual Property Office; Quebec, Canada.

Youtube Video Entitled "Standing Up a Raymond Reach Truck" dated Dec. 6, 2014; https://www.youtube.com/watch?v=r2JVaOeB-1g; retrieved from the internet Jun. 8, 2022.

Youtube Video Entitled "Standing up an Orderpicker" dated Dec. 30, 2015; https://www.youtube.com/watch?v=eW-nV2urz1w; retrieved from the internet Jun. 8, 2022.

Sheppard, Bruce; International Search Report and Written Opinion of the International Searching Authority; International Application No. PCT/US2018/058863; Feb. 5, 2019; European Patent Office; Rijswijk, Netherlands.

International Preliminary Report on Patentability dated May 12, 2020; International Application No. PCT/US2018/058863; The International Bureau of WIPO; Geneva, Switzerland.

Notice of Allowance dated Oct. 13, 2020; U.S. Appl. No. 16/178,748; United States Patent and Trademark Office; Alexandria, Virginia.

First Search dated Mar. 27, 2021; Chinese Application No. 201880064238.7; The State Intellectual Property Office of People's Republic of China.

The First Office Action dated Apr. 21, 2021; Chinese Application No. 201880064238.7; The State Intellectual Property Office of People's Republic of China.

(56) References Cited

OTHER PUBLICATIONS

LinkedIn video undated by Bryan Hastings of Raymond Storage Concepts; https://www.linkedin.com/feed/update/urn:li:activity:6799886286460108800/; retrieved from the internet Jun. 8, 2022.
Office Action dated May 1, 2020; U.S. Appl. No. 16/178,748; United States Patent and Trademark Office; Alexandria, Virginia.
Election/Restrictions dated Jan. 10, 2020; U.S. Appl. No. 16/178,748; United States Patent and Trademark Office; Alexandria, Virginia.
Invitation to Pay Additional Fees dated Jun. 24, 2022; International Application No. PCT/US2022/070919; European Patent Office; Rijswijk, Netherlands.
International Search Report and Written Opinion of the International Searching Authority dated Oct. 7, 2022; International Application No. PCT/US2022/070919; European Patent Office; Rijswijk, Netherlands.
Information pertaining to a disclosure of the claimed invention by the applicant at a customer facility as set forth in the Information Disclosure Statement Cover Letter mailed together with the Information Disclosure Statement dated Oct. 24, 2022.
Lee, Sun Hwa; International Preliminary Report on Patentability dated Sep. 14, 2023; International Application No. PCT/US2022/070919; The International Bureau of WIPO; Geneva, Switzerland.
Johns, Hilary Lynn; Requirement for Restriction/Election dated Apr. 4, 2024; U.S. Appl. No. 17/653,204; United States Patent and Trademark Office; Alexandria, Virginia.
Deane, Herbert C.; U.S. Pat. No. 605,162A entitled "Transfer Truck"; Issue Date June 7, 1898; United States Patent and Trademark Office.
Li Mei; Notification of Grant of Invention Patent dated Jan. 26, 2026; Chinese Application No. 202280016251.1; China National Intellectual Property Administration; Beijing, China.
Avila, José Enrique Cázares; Office Action dated May 22, 2026, Mexican Application No. MX/a/2023/010364; Mexican Institute of Industrial Property; Mexico City, Mexico.
Sheppard, Bruce; Communication pursuant to Article 94(3) EPC dated Jul. 16, 2026; European Application No. 25150356.1; European Patent Office; Munich, Germany.

* cited by examiner

FIG. 16A
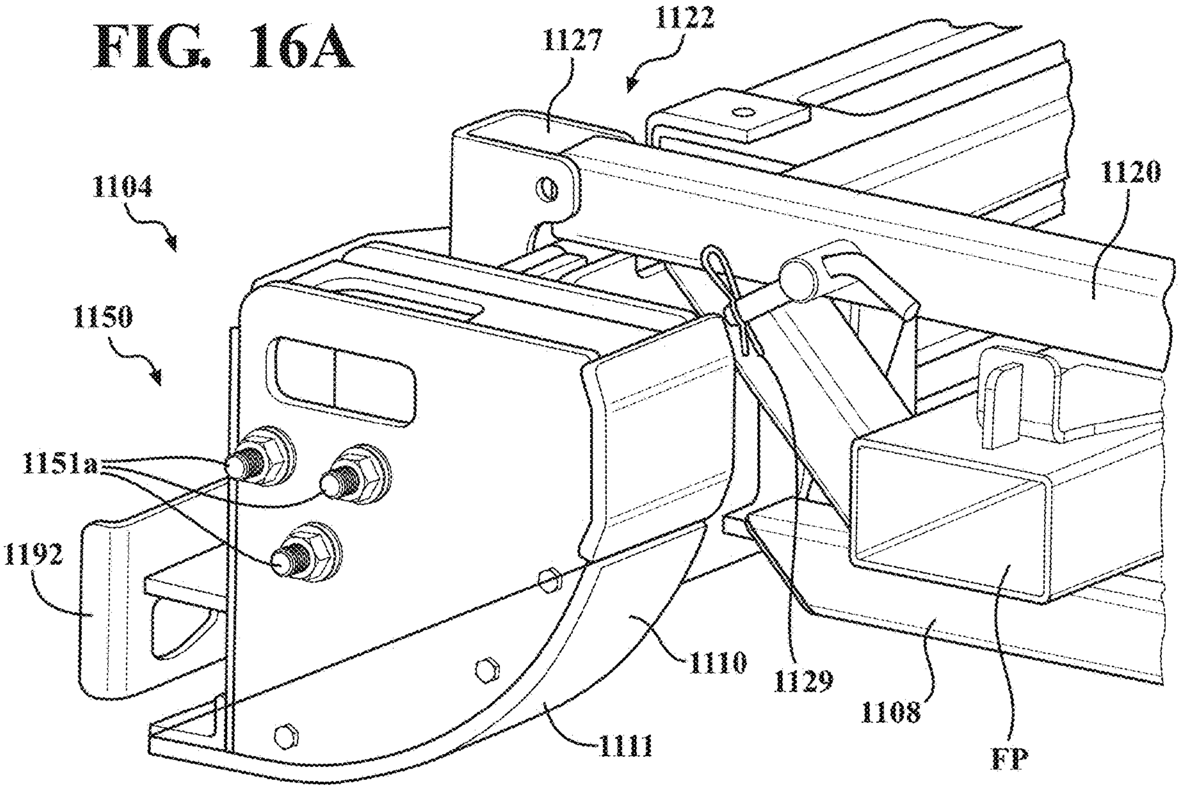
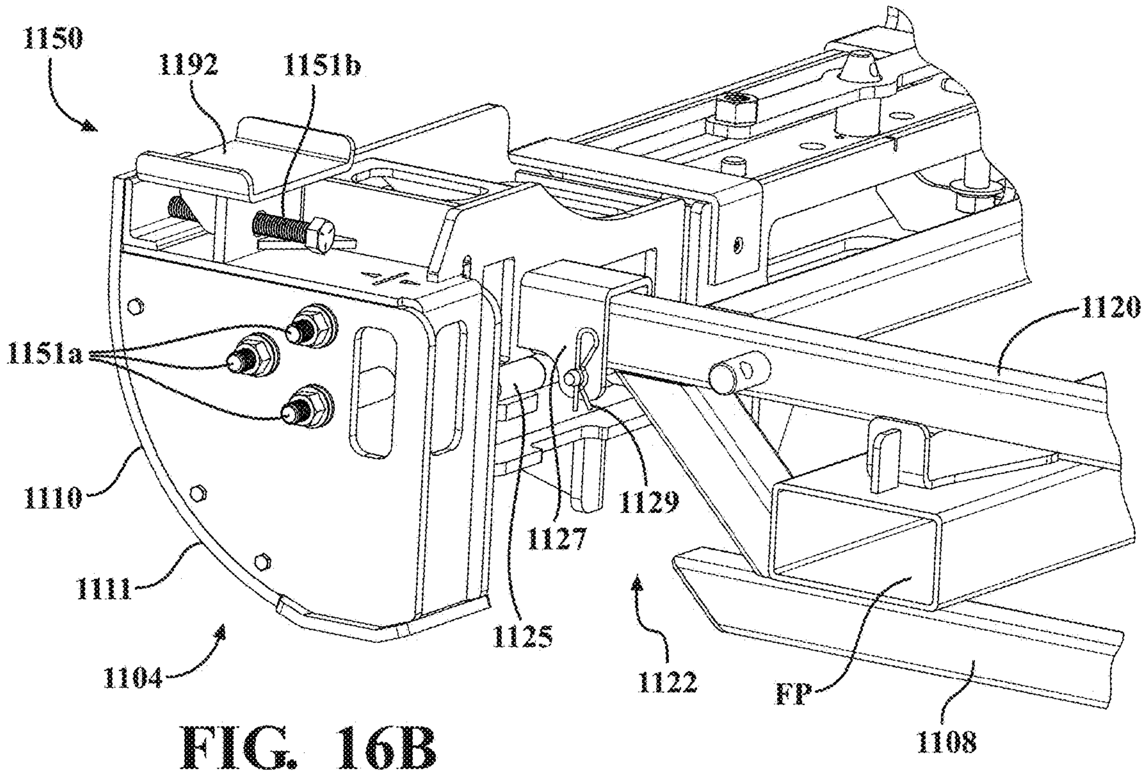
FIG. 16B

LAYOVER BRACKET SYSTEM

CROSS REFERENCE TO RELATED APPLICATION

This application is a divisional of U.S. patent application Ser. No. 17/653,204, filed Mar. 2, 2022, entitled "LAYOVER BRACKET SYSTEM," which claims the benefit of U.S. Provisional Patent Application Ser. No. 63/157,330, filed Mar. 5, 2021, entitled "LAYOVER BRACKET SYSTEM," the entire disclosures of which are hereby incorporated by reference herein.

FIELD

The present disclosure relates to materials handling vehicles, and more particularly, to a layover bracket system for materials handling vehicles.

BACKGROUND

Materials handling vehicles, such as forklift trucks, may include a power unit, a mast assembly, and an operator platform. When transported between facilities, it is generally preferable to lay the materials handling vehicle over onto its back or side due to the height of the vehicle when standing upright.

SUMMARY

In accordance with a first aspect, a layover bracket system is provided for supporting an industrial vehicle in a horizontal position on a floor surface. The system comprises a base section removably attached to a first portion of the vehicle at a first location, and an extension section removably attached to a second portion of the vehicle at a second location spaced apart in a first direction from the first location. The first direction is parallel to a vertical axis of the vehicle when positioned in an upright position. The extension section is pivotably coupled to the base section.

The base section may comprise a plurality of wheels for facilitating movement of the vehicle on the floor surface while the vehicle is supported in the horizontal position on the layover bracket system.

The extension section may comprise a plurality of wheels for facilitating movement of the vehicle on the floor surface while the vehicle is supported in the horizontal position on the layover bracket system.

The system may further comprise at least one anchor structure for temporarily securing the layover bracket system and the vehicle in place on the floor surface. The at least one anchor structure may be temporarily coupled to the floor surface and to at least one of the base section or the extension section. The anchor structure may comprise a body portion that can be temporarily coupled to the floor surface, and at least one insertion element that is insertable into a corresponding opening in the at least one of the base section or the extension section.

The base section may comprise at least one curved ramp surface facing away from the vehicle when the base section is secured to the vehicle. The curved ramp surface may support the layover bracket system and the vehicle on the floor surface while the vehicle is being transitioned from the upright position to the horizontal position.

The extension section may comprise at least one first bar pivotably connected to the base section, and at least one second bar rigidly attached to the at least one first bar and positioned at an angle transverse to the at least one first bar. The at least one second bar may engage the second portion of the vehicle at the second location. A length of the at least one second bar may be adjustable.

The base section may be attached to the first portion of the vehicle and the extension section may be attached to the second portion of the vehicle. While the vehicle is in the horizontal position, the at least one first bar is in a horizontal position and the at least one second bar is in a vertical position, and while the vehicle is in the upright position, the at least one first bar is in a vertical position, and the at least one second bar is in a horizontal position.

The system may further comprise a connection mechanism removably coupled to an upper portion of the vehicle, wherein the connection mechanism is actuated to facilitate a transition of the vehicle between the upright position and the horizontal position.

The system may further comprise a plurality of un-wheeled support elements for supporting the system while the vehicle is supported on the system. The plurality of un-wheeled support elements may comprise elongate rail members with surfaces that extend along the floor surface when the system is supporting the vehicle in the horizontal position.

The system may further comprise at least one raise/lower assembly for raising and lowering a positional portion of the base section between a raised position where the base section is distal from the floor surface and a lowered position where the base section is proximate to the floor surface.

In accordance with a second aspect, a layover bracket system is provided for transitioning an industrial vehicle from a first position to a second position. The system comprises a bracket structure including a base section removably attachable to a first portion of the vehicle at a first location, and an extension section coupled to the base section and including at least one securing structure removably attachable to a second portion of the vehicle at a second location spaced apart in a first direction from the first location. The first direction is parallel to a vertical axis of the vehicle when positioned in an upright position. A length of the extension section is adjustable. The vehicle is transitioned from the first position to the second position by rotating the bracket structure with the vehicle supported thereon relative to a floor surface.

The base section may comprise a plurality of wheels for facilitating movement of the vehicle on the floor surface while the vehicle is supported in the second position on the layover bracket system.

The extension section may comprise a plurality of wheels for facilitating movement of the vehicle on the floor surface while the vehicle is supported in the second position on the layover bracket system.

The system may further comprise at least one anchor structure for temporarily securing the layover bracket system and the vehicle in place on the floor surface. The at least one anchor structure may be temporarily coupled to the floor surface and to at least one of the base section or the extension section. The at least one anchor structure may comprise a body portion that can be temporarily coupled to the floor surface, and at least one insertion element that is insertable into a corresponding opening in the at least one of the base section or the extension section.

The base section may comprise at least one curved ramp surface facing away from the vehicle when the base section is secured to the vehicle. The curved ramp surface may support the layover bracket system and the vehicle on the floor surface while the vehicle is being transitioned from the first position to the second position.

The extension section may comprise at least one first bar connected to the base section. The extension section may further comprise at least one second bar rigidly attached to the at least one first bar and positioned at an angle transverse to the at least one first bar. The at least one second bar may engage the second portion of the vehicle at the second location.

The system may further comprise a connection mechanism removably coupled to an upper portion of the vehicle, wherein the connection mechanism is actuated to facilitate the transition of the vehicle between the first position and the second position.

The system may further comprise a plurality of un-wheeled support elements for supporting the system while the vehicle is supported on the system. The plurality of un-wheeled support elements may comprise elongate rail members with surfaces that extend along the floor surface when the system is supporting the vehicle in the horizontal position.

The system may further comprise at least one raise/lower assembly for raising and lowering a positional portion of the base section between a raised position where the base section is distal from the floor surface and a lowered position where the base section is proximate to the floor surface.

In accordance with a third aspect, a method is provided for transitioning an industrial vehicle between an upright position and a horizontal position using a layover bracket system. The method comprises removably attaching a base section of the layover bracket system to a first portion of the vehicle at a first location, pivoting an extension section of the layover bracket system with respect to the base section, and removably attaching the extension section of the layover bracket system to a second portion of the vehicle at a second location. The extension section is pivotably coupled to the base section. The second location is spaced apart in a first direction from the first location, and the first direction is parallel to a vertical axis of the vehicle when positioned in the upright position. The method further comprises transitioning the vehicle from the upright position to the horizontal position by rotating the vehicle and the layover bracket system relative to a floor surface.

The base section may comprise at least one curved ramp surface that supports the layover bracket system and the vehicle on the floor surface while the vehicle is being transitioned from the upright position to the horizontal position.

The method may further comprise, after transitioning the vehicle from the upright position to the horizontal position, removably coupling an anchor structure to the floor surface and to at least one of the base section or the extension section to secure the layover bracket system with the vehicle supported thereon in place on the floor surface.

The extension section may comprise at least one bar that engages the second portion of the vehicle at the second location. A length of the at least one bar may be adjustable.

Transitioning the vehicle from the upright position to the horizontal position may comprise removably coupling a connection mechanism to an upper portion of the vehicle, and actuating the connection mechanism to rotate the vehicle and the layover bracket relative to the floor surface to transition the vehicle from the upright position to the horizontal position.

The extension section may comprise at least one first bar pivotably coupled to the base section, and at least one second bar rigidly attached to the at least one first bar and positioned at an angle transverse to the at least one first bar. The at least one second bar may engage the second portion of the vehicle at the second location. Pivoting the extension section with respect to the base section may comprise pivoting the at least one first bar relative to the base section from a horizontal position of the at least one first bar to a vertical position of the at least one first bar.

The extension section may comprise a plurality of un-wheeled support elements for supporting the system while the vehicle is supported on the system. The plurality of un-wheeled support elements may comprise elongate rail members with surfaces that extend along the floor surface when the system is supporting the vehicle in the horizontal position.

The vehicle may be completely supported on the layover bracket system once the vehicle is transitioned to the horizontal position.

The extension section may comprise at least one wheel, wherein pivoting the extension section may cause the at least one wheel to transition from being in a floor engaging position wherein the at least one wheel of the extension section engages the floor surface, to a non-floor engaging position wherein the at least one wheel of the extension section does not engage the floor surface.

The extension section may comprise a plurality of un-wheeled support elements for supporting the system while the vehicle is supported on the system. The plurality of un-wheeled support elements may comprise elongate rail members with surfaces that extend along the floor surface when the system is supporting the vehicle in the horizontal position.

In accordance with a fourth aspect, a method comprises providing a layover bracket system having an industrial vehicle supported thereon in a horizontal position. The layover bracket system comprises a base section removably attached to a first portion of the vehicle at a first location and an extension section pivotably coupled to the base section and removably attached to a second portion of the vehicle at a second location spaced apart in a first direction from the first location. The first direction is parallel to a vertical axis of the vehicle when positioned in an upright position. The method additionally comprises transitioning the vehicle from the horizontal position to the upright position by rotating the layover bracket with the vehicle supported thereon relative to a floor surface. The method further comprises detaching the extension section of the layover bracket system from the second portion of the vehicle, pivoting the extension section relative to the base section, and detaching the base section of the layover bracket system from the first portion of the vehicle.

The base section may comprise at least one curved ramp surface that supports the layover bracket system and the vehicle on the floor surface while the vehicle is being transitioned from the horizontal position to the upright position.

The extension section may comprise at least one bar that engages the second portion of the vehicle at the second location. A length of the at least one bar may be adjustable.

Transitioning the vehicle from the horizontal position to the upright position may comprise removably coupling a connection mechanism to an upper portion of the vehicle, and actuating the connection mechanism to rotate the vehicle and the layover bracket relative to the floor surface to transition the vehicle from the horizontal position to the upright position.

The extension section may comprise at least one first bar pivotably coupled to the base section and at least one second bar rigidly attached to the at least one first bar and positioned at an angle transverse to the at least one first bar. The at least one second bar may engage the second portion of the vehicle at the second location.

The extension section may comprise at least one wheel, wherein pivoting the extension section may cause the at least one wheel to transition from being in a non-floor engaging position wherein the at least one wheel of the extension section does not engage the floor surface, to a floor engaging position wherein the at least one wheel of the extension section engages the floor surface.

The extension section may comprise a plurality of un-wheeled support elements for supporting the system while the vehicle is supported on the system. The plurality of un-wheeled support elements may comprise elongate rail members with surfaces that extend along the floor surface when the system is supporting the vehicle in the horizontal position.

In accordance with a fifth aspect, a layover bracket system is provided for an industrial vehicle. The layover bracket system comprises a bracket structure that supports the vehicle on a floor surface when the vehicle is supported in the horizontal position, wherein the bracket structure includes a plurality of wheels. The layover bracket system further comprises at least one first anchor structure that comprises a first body portion, and at least one insertion element. The at least one first anchor structure temporarily secures the bracket structure and the vehicle in place on the floor surface when the vehicle is supported on the bracket structure in the horizontal position. The at least one first anchor structure and the plurality of wheels remain in contact with the floor surface while the at least one first anchor structure is securing the bracket structure and the vehicle in place on the floor surface.

The at least one insertion element of the at least one first anchor structure may be insertable into a corresponding opening in the bracket structure. The opening in the bracket structure may be located proximate to one of the plurality of wheels.

The system may further comprise at least one second anchor structure that temporarily secures the bracket structure and the vehicle in place on the floor surface when the vehicle is supported on the bracket structure in the horizontal position. The at least one second anchor structure may comprise a second body portion that can be temporarily secured to the floor surface, and a hook element that is removably attachable to a component of the bracket structure.

The at least one insertion element of the at least one first anchor structure may be inserted into the corresponding opening in the bracket structure at a first bracket structure location, and the hook element of the at least one second anchor structure may be attached to the component of the bracket structure at a second bracket structure location. The first bracket structure location may be spaced apart from the second bracket structure location in a direction that is parallel to a vertical axis of the vehicle.

The at least one first anchor structure may be temporarily coupled to the floor surface by a fastener that engages the at least one first anchor structure and is removably inserted into the floor surface.

The bracket structure may further comprise at least one fork retaining structure for supporting a fork that has been removed from the vehicle.

The bracket structure may include nesting structure for supporting a second bracket structure.

The extension section may comprise a plurality of un-wheeled support elements for supporting the system while the vehicle is supported on the system. The plurality of un-wheeled support elements may comprise elongate rail members with surfaces that extend along the floor surface when the system is supporting the vehicle in the horizontal position.

BRIEF DESCRIPTION OF THE DRAWINGS

FIGS. 16A-16D are perspective views illustrating a portion of a base section of the bracket structure of FIG. 14;

DETAILED DESCRIPTION

The following text sets forth a broad description of numerous different embodiments of the present disclosure. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. It should be understood that multiple combinations of the embodiments described and shown are contemplated and that a particular focus on one embodiment does not preclude its inclusion in a combination of other described embodiments. Numerous alternative embodiments could also be implemented, using either current technology or technology developed after the filing date of this patent, which would still fall within the scope of the claims. All publications and patents cited herein are incorporated herein by reference.

Figure 1:
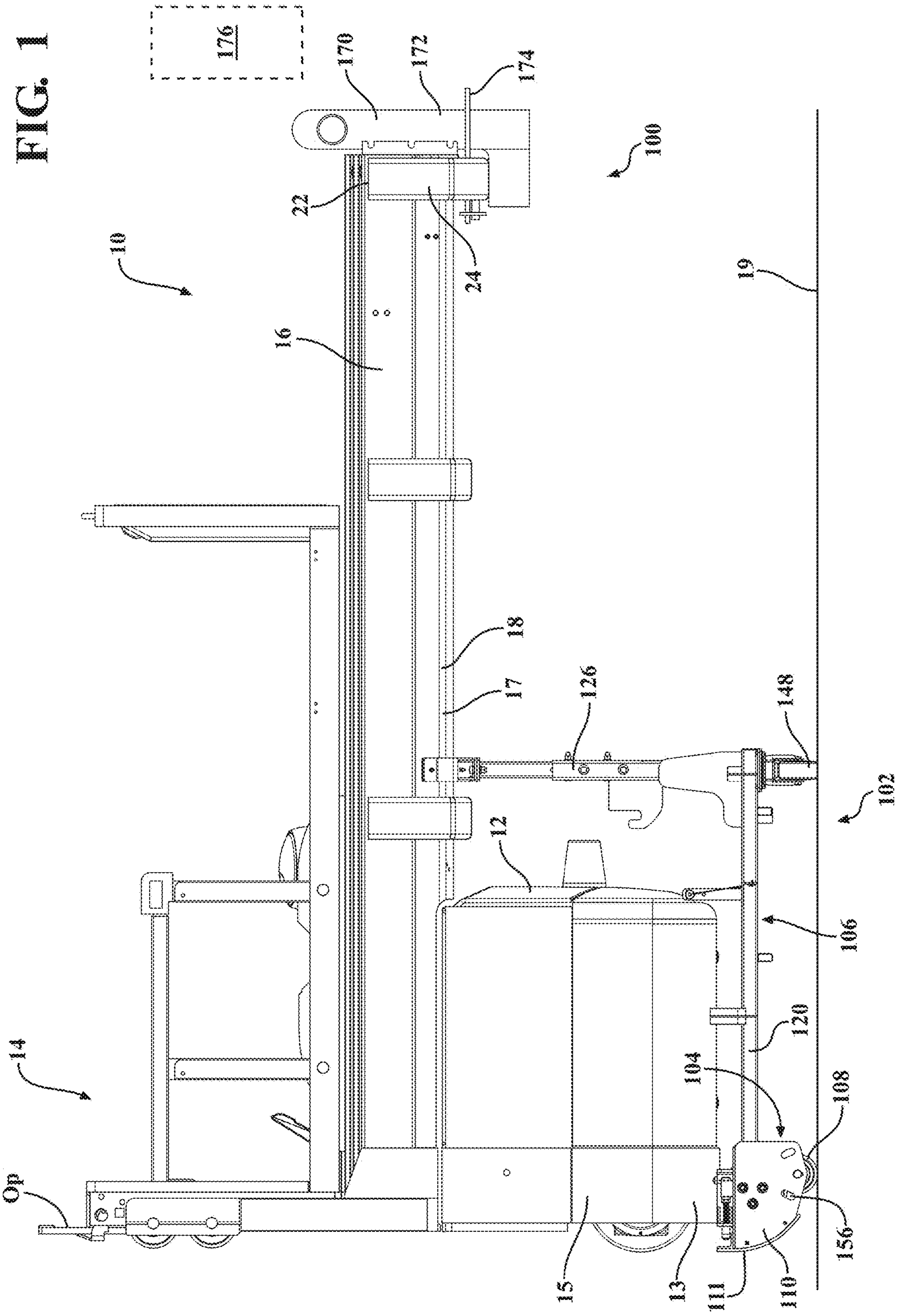
FIG. 1 is a side plan view of an industrial vehicle supported in a horizontal position on a layover bracket system according to embodiments.

Referring now to the drawings, FIG. 1 illustrates an industrial vehicle 10 (hereinafter "vehicle 10") supported on a layover bracket system 100 constructed in accordance with embodiments. The vehicle 10 depicted in FIG. 1 is a forklift truck, but the embodiments disclosed herein may be used with any suitable type of industrial vehicle. The vehicle 10 includes a power unit 12 and a load handling assembly 14 having a mast assembly 16. The power unit 12, the load handling assembly 14, and the mast assembly 16 each include traditional components, as will be apparent to those having ordinary skill in the art, which components will not be described in detail herein. A first portion 13 of the vehicle 10 is defined by a lower portion 15 of the power unit 12 adjacent to a floor surface 19 when the vehicle 10 is in an upright position, also referred to herein as a vertical position, see FIG. 1A. A second portion 17 of the vehicle 10 is spaced apart in a first direction $F_D$ from the first portion 13 and is defined by a portion 18 of the mast assembly 16, and ranges from near the center of mass of the vehicle 10 (the center of mass of the vehicle 10, as defined herein, is taken with reference to the vehicle 10 being positioned in the horizontal position) to the top of the mast assembly 16, wherein the first direction $F_D$ is parallel to a vertical axis $V_A$ of the vehicle 10 when positioned in the upright position, see FIG. 1A. In the illustrated embodiment, the second portion 17 is located generally around the center of mass of the vehicle 10.

Figure 2:
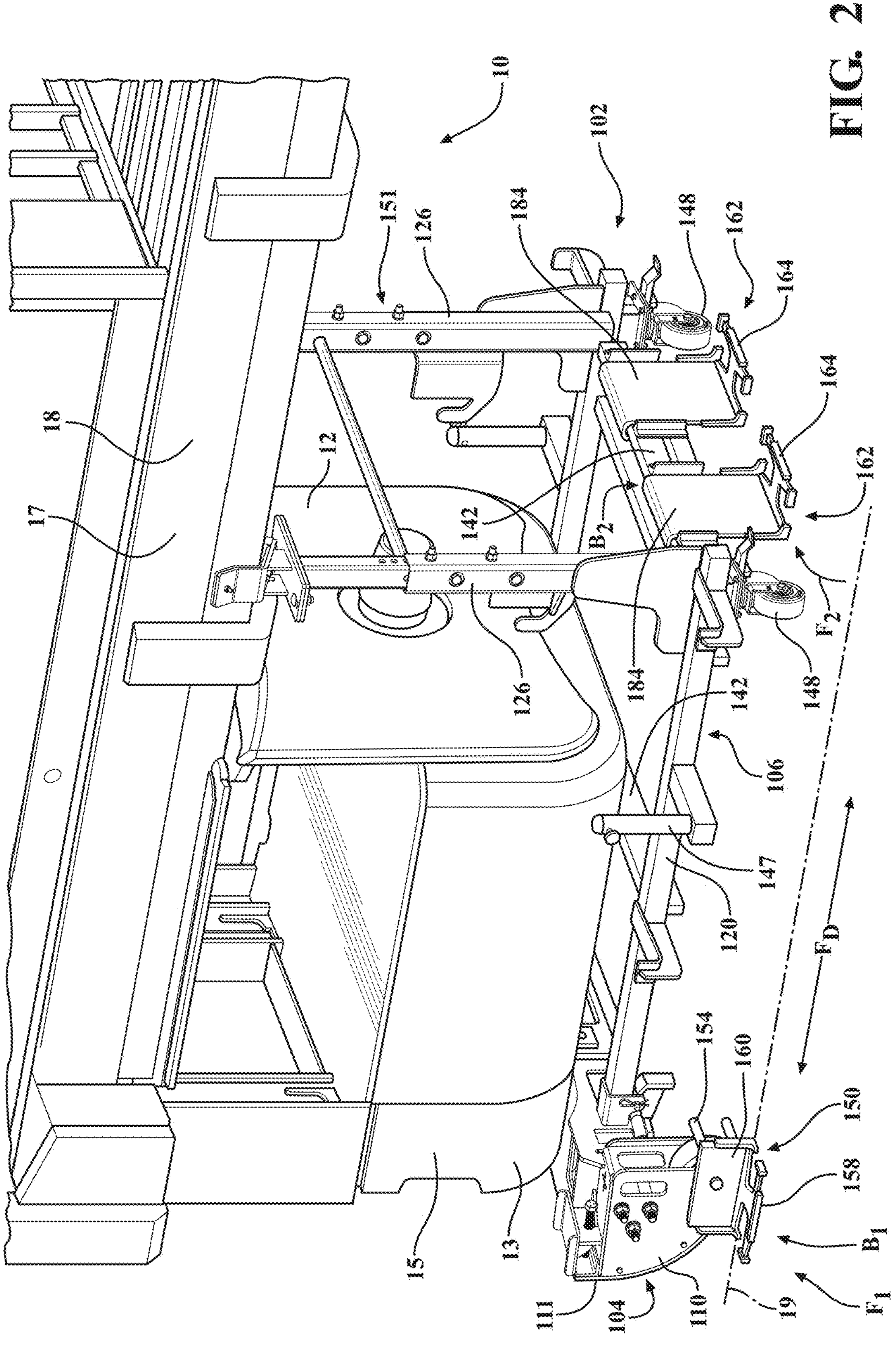
FIG. 2 is a perspective view of a portion of the vehicle supported on the bracket structure.

The vehicle 10 is depicted in FIGS. 1 and 2 as being completely supported on the layover bracket system 100 in a horizontal position, also referred to herein as a laid over position. One of the vertical position or the horizontal position of the vehicle 10 may also be referred to herein as a first position, with the other of the vertical position or the horizontal position of the vehicle 10 being referred to herein as a second position. The layover bracket system 100 (hereinafter "system 100") is used to transition the vehicle 10 from the vertical position to the horizontal position, and vice versa, and to support the vehicle 10 on the floor surface 19 while the vehicle 10 is in the horizontal position, as will be described in detail herein. The system 100 comprises a bracket structure 102, which includes a base section 104 and an extension section 106 pivotably coupled together as a single structure.

Figure 3:
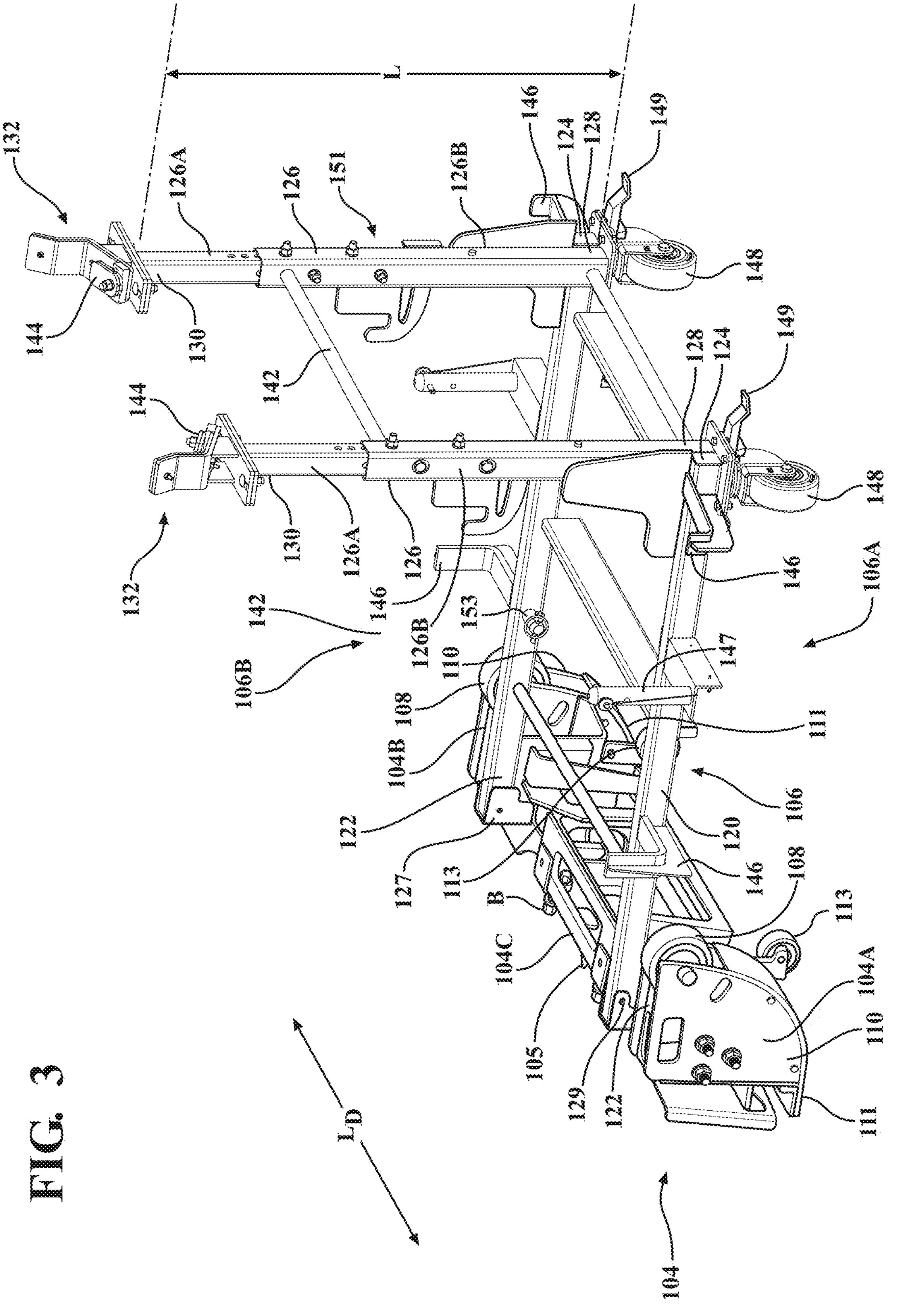
FIG. 3 is a perspective view of the bracket structure.

With reference to FIG. 3, the base section 104 of the bracket structure 102 includes at least one wheel 108, and preferably a pair of wheels 108 spaced apart in a lateral direction $L_D$ of the bracket structure 102. The wheels 108 are provided for moving the system 100 while the vehicle 10 is supported on the system 100 in the horizontal position, as will be discussed in greater detail herein. According to embodiments, the wheels 108 may be spaced apart from one another such that the wheels 108 are respectively located toward opposed lateral sides 104A, 104B of the base section 104 to provide maximum support and stability for the vehicle 10 while supported on the system 100 in the horizontal position. It is contemplated that the base section 104 may include any number of wheels 108.

The base section 104 further includes at least one curved ramp surface 110 facing away from the vehicle 10 when the base section 104 is secured to the vehicle 10, see also FIGS. 1 and 2. The at least one curved ramp surface 110 supports the system 100 and the vehicle 10 on the floor surface 19 while the vehicle 10 is being transitioned between the vertical and horizontal positions via the system 100. The embodiment shown in FIG. 3 includes two curved ramp surfaces 110, each ramped surface 110 located proximate to a respective wheel 108 to provide maximum support and stability for the vehicle 10 while being transitioned between the vertical and horizontal positions. The at least one curved ramp surface 110 may include a traction portion 111, see FIGS. 2 and 3, to militate against unwanted sliding or skidding movement of the bracket structure 102 and the supported vehicle 10 when the system 100 is being used to transition the vehicle 10 between the vertical and horizontal positions. The traction portion 111 may be integrally formed with the curved ramp surface 110, such as, for example, a series of corrugations or protuberances formed in the curved ramp surface 110, or may be separately formed from the curved ramp surface 110 and applied thereto, such as, for example, a friction pad.

Figure 6:
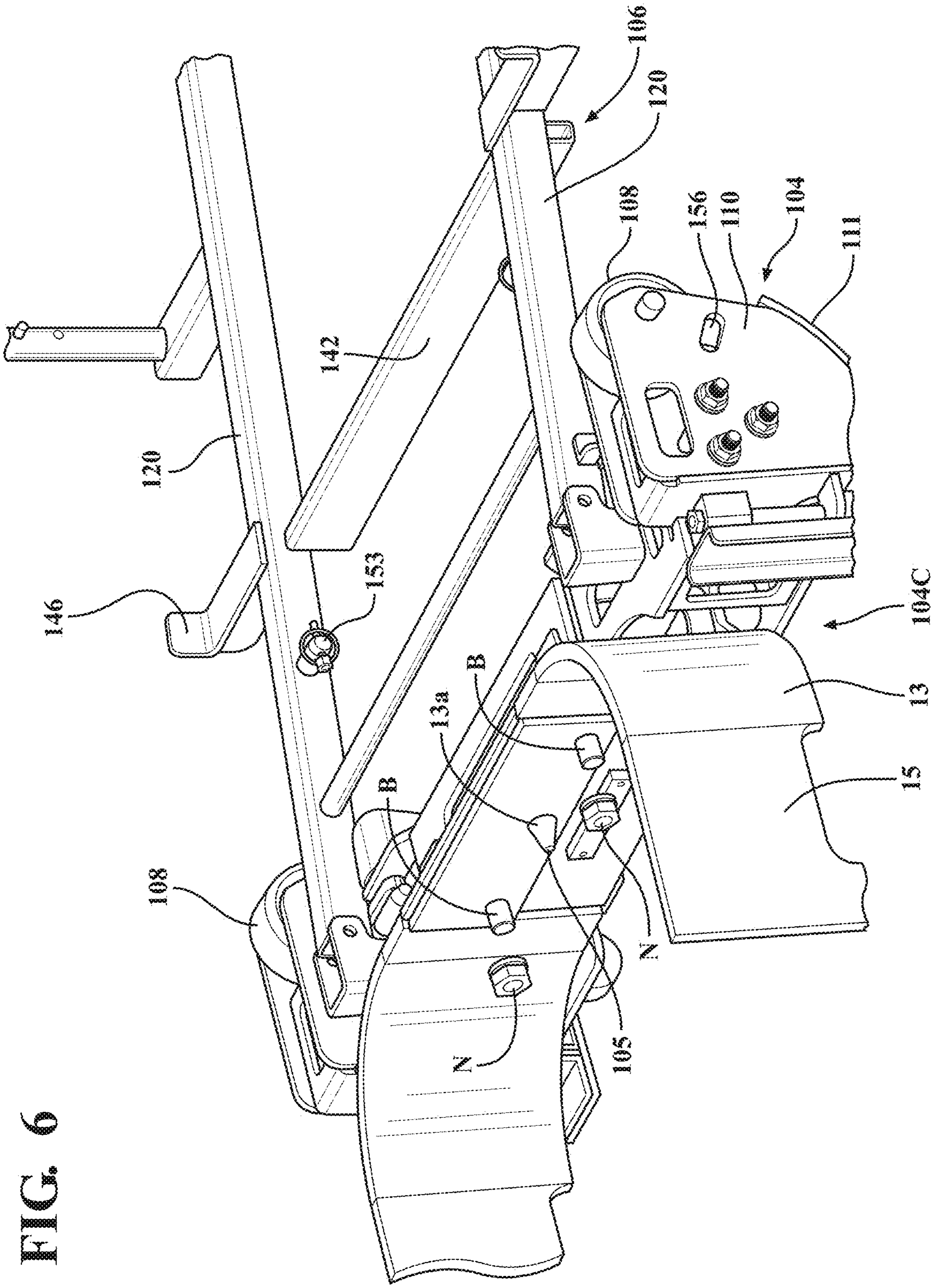
FIG. 6 is a perspective view of a portion of the vehicle being attached to the bracket structure.

With reference to FIG. 6, the base section 104 further includes fastening structure, for example one or more bolts B, which fastening structure is used to removably attach the base section 104 to the vehicle 10 at a first location. The first location may correspond to the first portion 13 of the vehicle 10, such that the base section 104 is removably securable to the lower portion 15 of the power unit 12 adjacent to the floor surface 19 when the vehicle 10 is in an upright position. Additional details in connection with removably attaching the base section 104 to the vehicle 10 will be discussed below.

Figure 4:
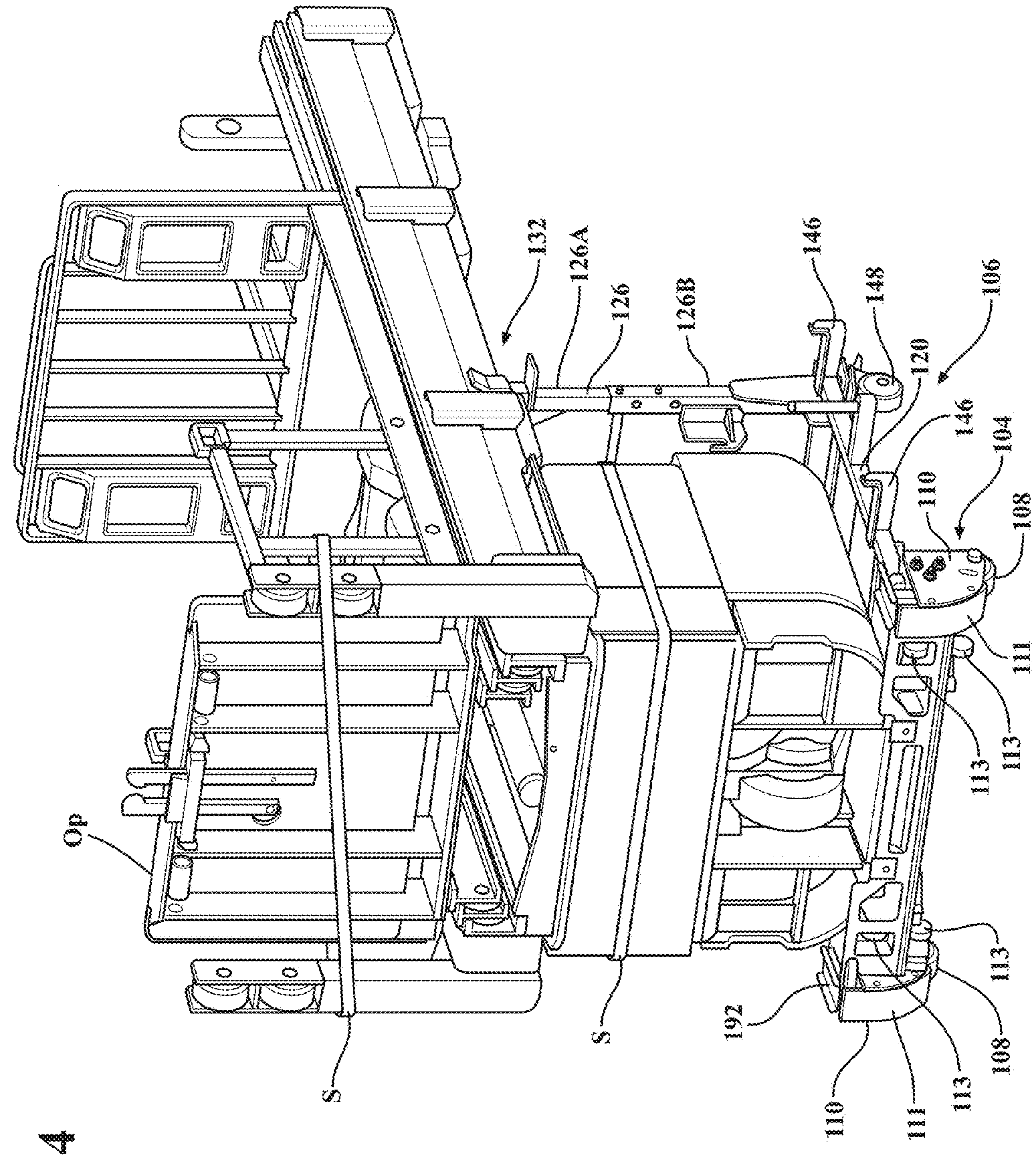
FIG. 4 is a perspective view of the vehicle supported on the bracket structure.

The base section 104 additionally comprises at least one secondary wheel 113, and preferably a plurality of secondary wheels 113, as shown in FIG. 3. The secondary wheels 113 may be moved between an extended position, see FIG. 3, and a retracted position, see FIG. 4. When in the extended position, the secondary wheels 113 extend outwardly from the base section 104 past the at least one curved ramp surface 110, and when in the retracted position, the secondary wheels 113 are withdrawn into the base section 104 such that they are withdrawn from the at least one curved ramp surface 110. The secondary wheels 113 are used for moving the system 100 when the vehicle 10 is not supported thereon and may be moved between the extended and retracted positions using a manual process. For example, an operator may use a manual process to move the secondary wheels 113 between the extended and retracted positions as desired.

Figure 10A:
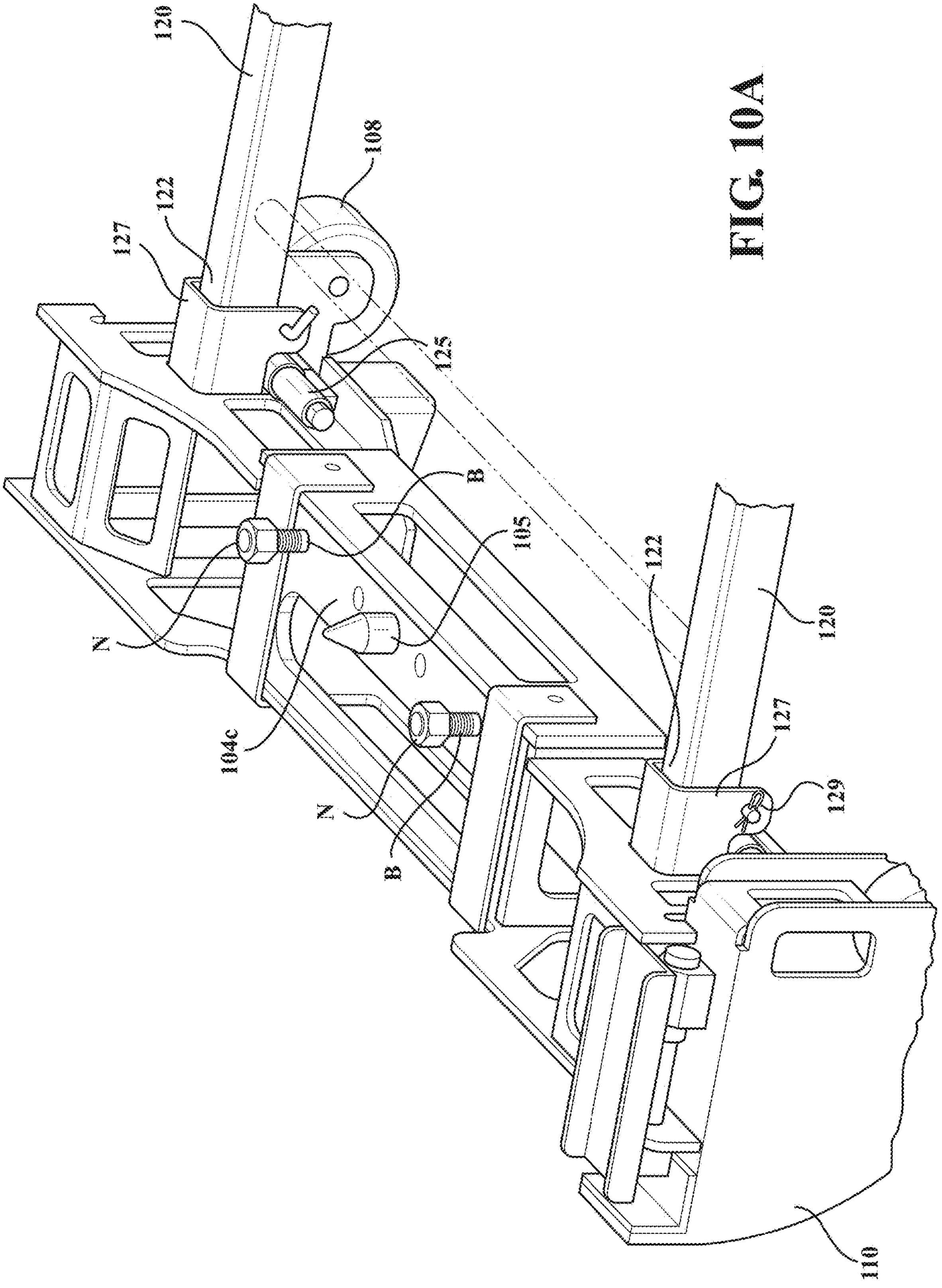
FIGS. 10A-10C are perspective views illustrating a pivoting movement of a portion of the bracket structure according to embodiments.
Figure 10B:
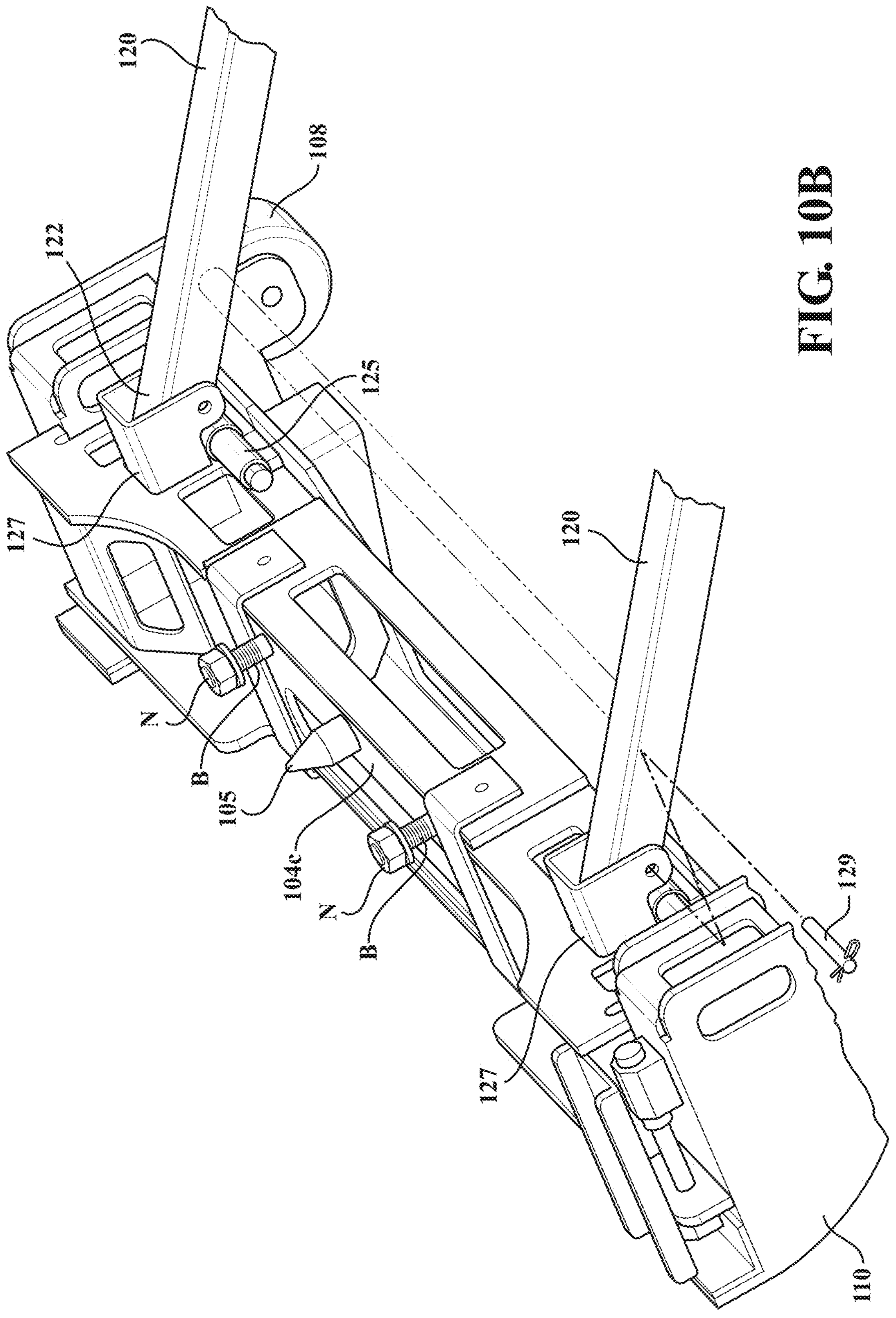
Figure 10C:
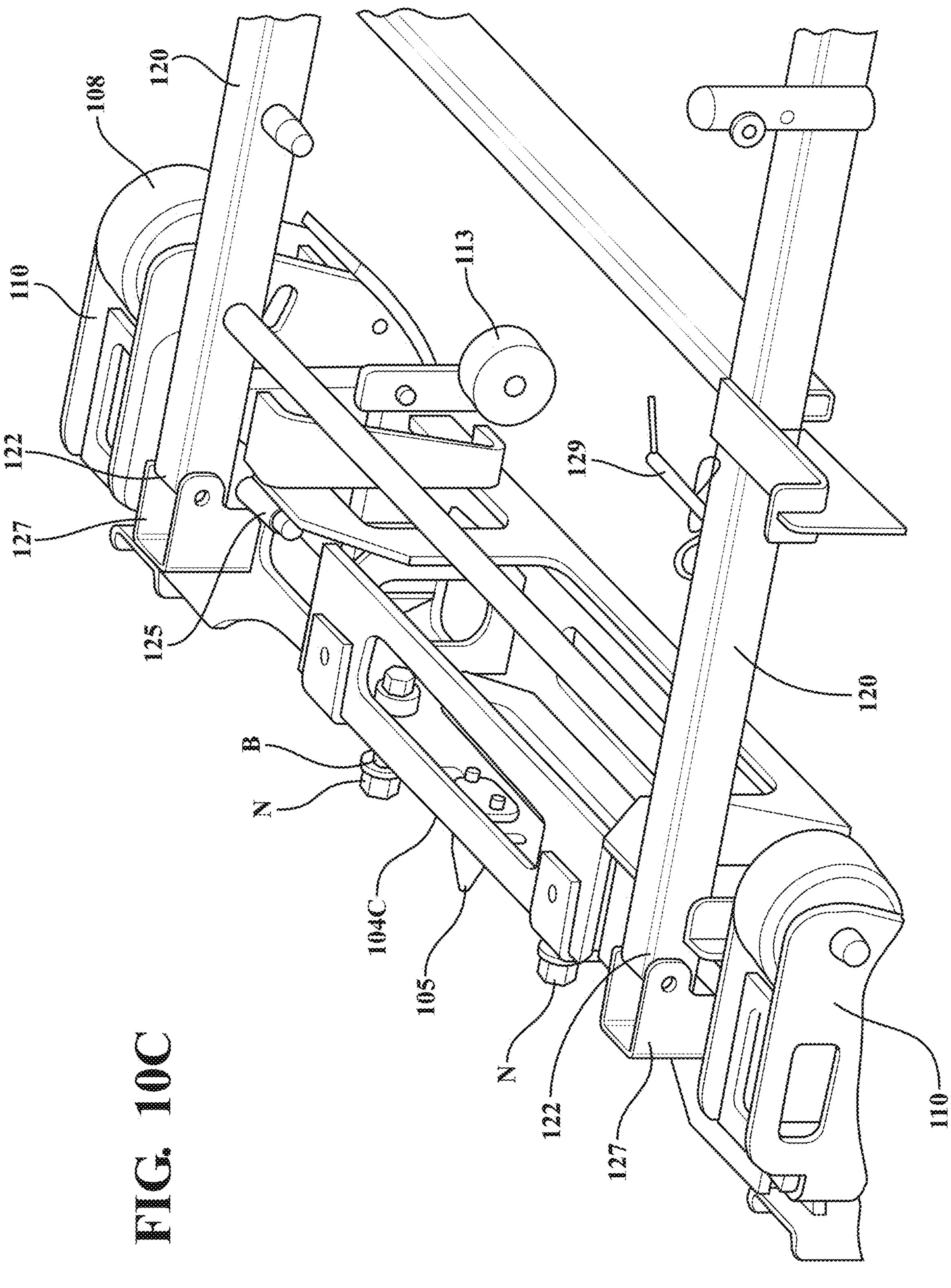

Referring still to FIG. 3, the extension section 106 of the bracket structure 102 includes at least one first bar 120, and preferably a pair of first bars 120, each first bar 120 having a first end 122 and a second end 124. With reference to FIGS. 10A-10C, the first end 122 of the at least one first bar 120 is pivotably connected to the base section 104 via a pivot connection provided by a pivot pin 125. A U-shaped bracket 127 may be provided to limit movement between the at least one first bar 120 and the base section 104, and a removable locking pin 129 may be provided to restrict pivoting movement between the at least one first bar 120 and the base section 104 when such pivoting movement is not desired.

The extension section 106 further includes at least one second bar 126, and preferably a pair of second bars 126, each second bar 126 having a first end 128 and a second end 130, see FIG. 3. The first end 128 of the at least one second bar 126 is rigidly attached to the second end 124 of the at least one first bar 120 at an angle transverse to the at least one first bar 120, wherein this angle may be 90 degrees. The second end 130 of the at least one second bar 126 engages the vehicle 10 at a second location, wherein the second location is spaced apart from the first location in the first direction $F_D$. The second location may correspond to the second portion 17 of the vehicle 10 such that the extension section 106 engages the mast assembly 16 near the center of mass of the vehicle 10, see FIG. 1B.

As shown in FIG. 3, a length L of the at least one second bar 126 may be adjustable such that the distance between the first and second ends 128, 130 thereof may be adjusted such that the system 100 is able to accommodate a variety of different types and/or sizes of industrial vehicles. The length adjustment of the at least one second bar 126 may be effected, such as, for example, by forming the at least one second bar 126 with two bar members 126A, 126B that are movably securable with respect to one another. According to one exemplary embodiment, the first bar member 126A is slidable within a hollow interior portion of the second bar member 126B. The bar members 126A, 126B may be temporarily locked together and prevented from moving with respect to one another, for example, using spring loaded pins on the first bar member 126A or bolts that are able to be inserted through a selective one of a series of openings formed in the second bar member 126B so as to adjust the total length L of the at least one second bar 126.

The extension section 106 includes securing structure 132 for temporarily attaching the extension section 106 to the vehicle 10 at the second location. The securing structure 132 may comprise any suitable structure for removably securing the extension section 106 to the vehicle 10 at the second location, such as, for example, a clamping or bolting structure 144 that is located at the second end 130 of one or both of the second bars 126, or a strap (not shown) that is secured around a lower portion 18 of the mast assembly 16 and a component of the extension section 106, such as around one or more cross bar members 142 that extend in the lateral direction $L_D$ between the first bars 120 and/or between the second bars 126. The cross bar members 142 also provide stability to the extension section 106.

Figure 3A:
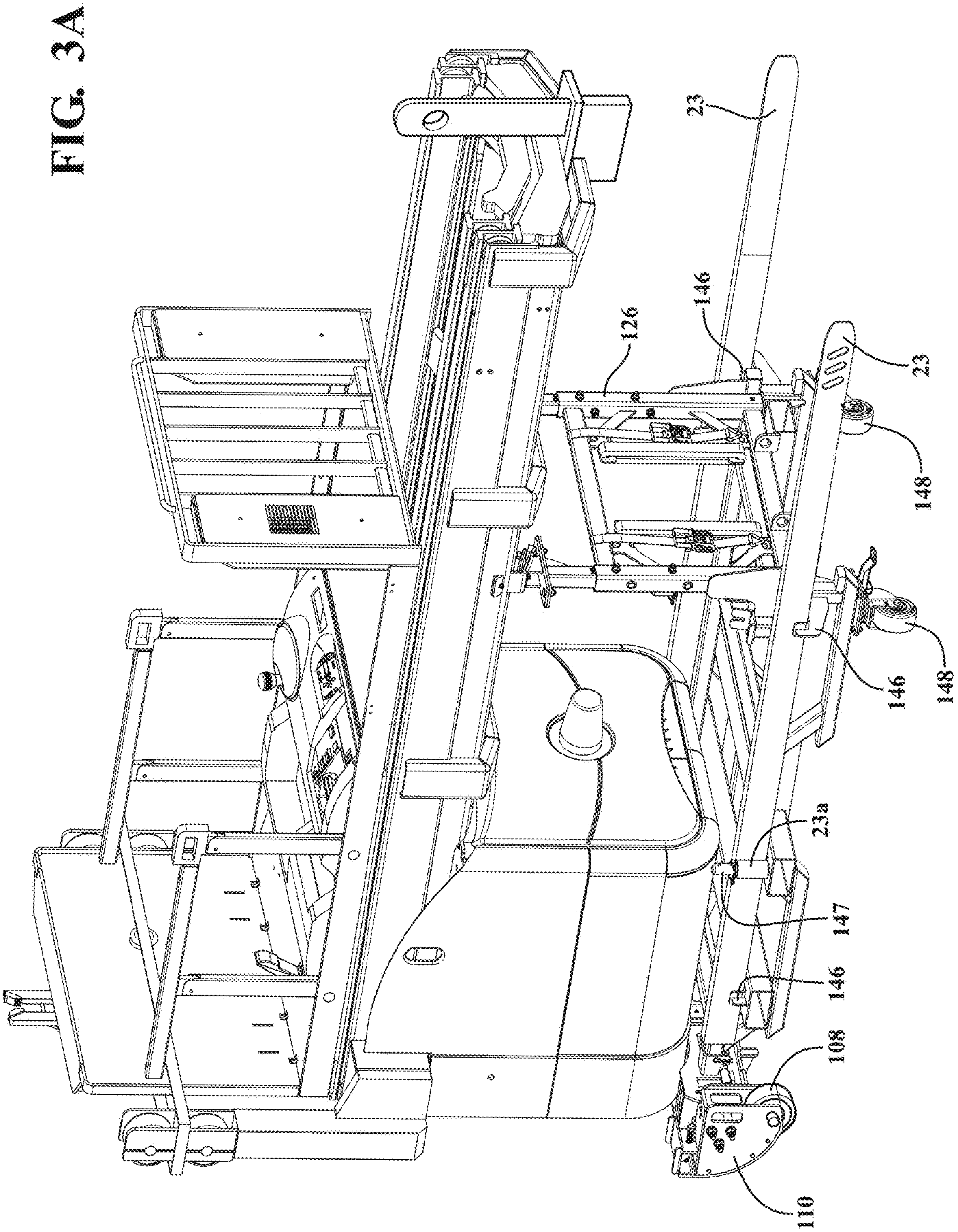
FIG. 3A is a perspective view of the layover bracket system attached to the vehicle.

The extension section 106 may further include at least one fork retainer 146 for supporting forks 23 that have been removed from the vehicle 10 for transport. In the embodiment shown in FIG. 3, two sets of fork retainers 146 are provided, which are connected to the first and second bars 120, 126 of the extension section 106. The extension section 106 may further include at least one fork pin 147 that receives a fork brace structure 23*a* of the fork 23, see for example, FIG. 3A. The fork pin 147 and the fork retainer 146 cooperate to secure and support the forks 23 during transport of the vehicle 10 on the system 100. It is contemplated that the fork retainers 146 and fork pins 147 may be located elsewhere on the bracket structure 102 if desired. The extension section 106 may further include storage compartment 151, such as, for example, a mesh bag, for holding tools and/or additional other items.

The extension section 106 also includes at least one wheel 148, and preferably a pair of wheels 148 spaced apart in the lateral direction $L_D$, see FIG. 3. The wheels 148 may be caster wheels having a wheel lock 149, and are provided for moving the system 100 while the vehicle 10 is supported thereon in the horizontal position, as will be discussed in greater detail herein. According to embodiments, the wheels 148 may be spaced apart from one another such that the wheels 148 are respectively located toward opposed lateral sides 106A, 106B of the extension section 106 to provide maximum support and stability for the vehicle 10 while supported on the system 100 in the horizontal position. It is contemplated that the extension section 106 may comprise any number of wheels 148.

Figure 5A:
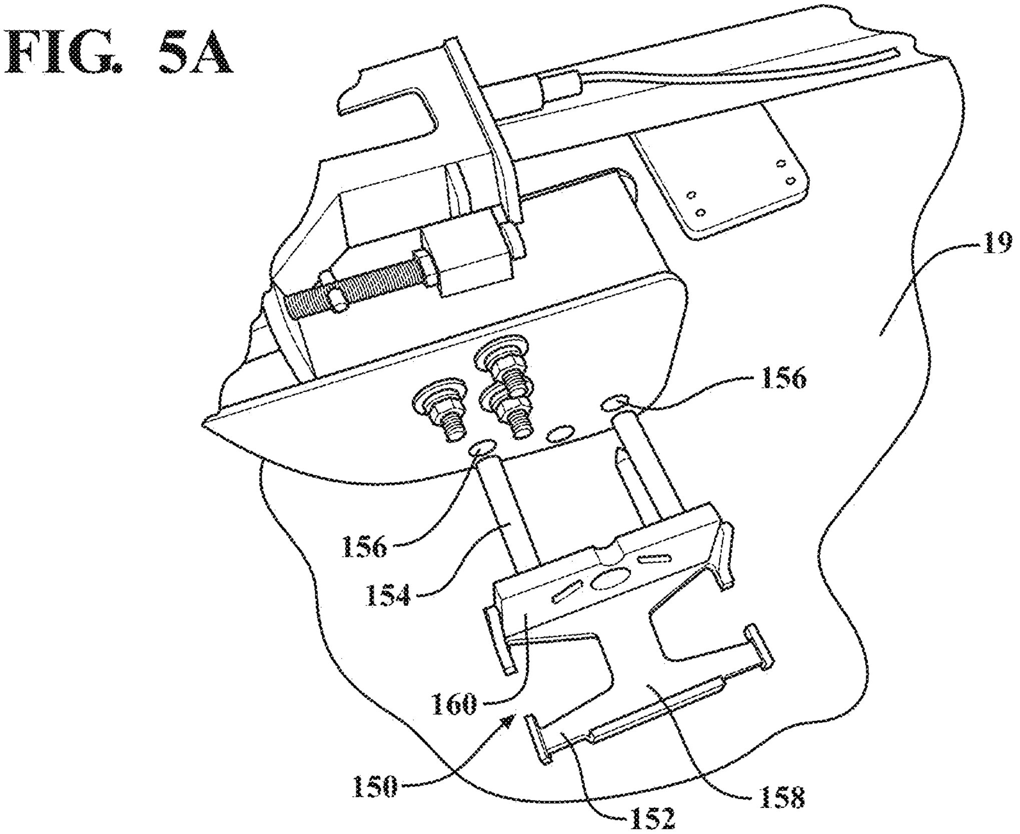
FIGS. 5A-5C are perspective views of anchor structures according to embodiments.
Figure 5B:
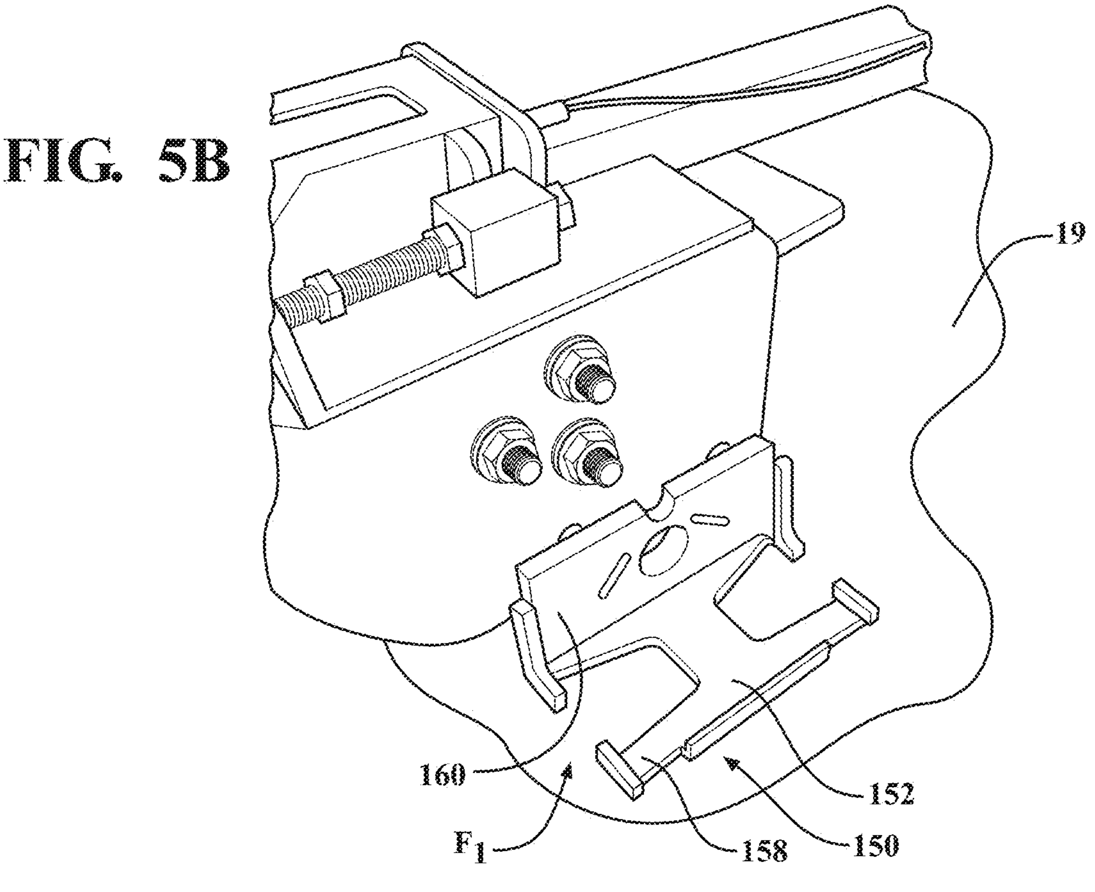

Referring now to FIGS. 2, 5A, and 5B, the system 100 may further include at least one anchor structure that may be used to temporarily secure the bracket structure 102 and the vehicle 10 supported thereon in place on the floor surface 19 by temporarily coupling the anchor structure to the floor surface 19 and to at least one of the base section 104 and/or the extension section 106.

An exemplary first anchor structure 150 shown in FIGS. 5A and 5B includes a first body portion 152 that can be temporarily coupled to the floor surface 19 at a first floor location $F_1$. The first anchor structure 150 comprises at least one insertion element 154 that is insertable into a corresponding opening 156 in at least one of the base section 104 or the extension section 106, see FIG. 5A. The opening 156 in the bracket structure 102 may be located proximate to one of the plurality of wheels 108, 148 at a first bracket location $B_1$, see FIG. 2. The first body portion 152 may include a first plate 158 and a second plate 160 positioned at an angle transverse to the first plate 158. The at least one insertion element 154 may be attached to and extend from the second plate 160 of the first body portion 152. According to one embodiment, the first plate 158 may be temporarily secured to the floor surface 19 using a fastener, such as a nail, that engages the first plate 158, e.g., inserted through an aperture formed in the first plate 158, and is removably inserted into the floor surface 19 at the first floor location $F_1$ to temporarily secure the bracket structure 102 and the vehicle 10 supported thereon in place on the floor surface 19. According to another embodiment, a block structure (which will be described below with reference to a second anchor structure 162) may be placed on the first plate 158 and the fastener may be driven through the block structure and into the floor surface 19. The anchor structure 150 and the wheels 108, 148 may remain in contact with the floor surface 19 while the anchor structure 150 is securing the bracket structure 102 and the vehicle 10 in place on the floor surface 19.

Figure 5C:
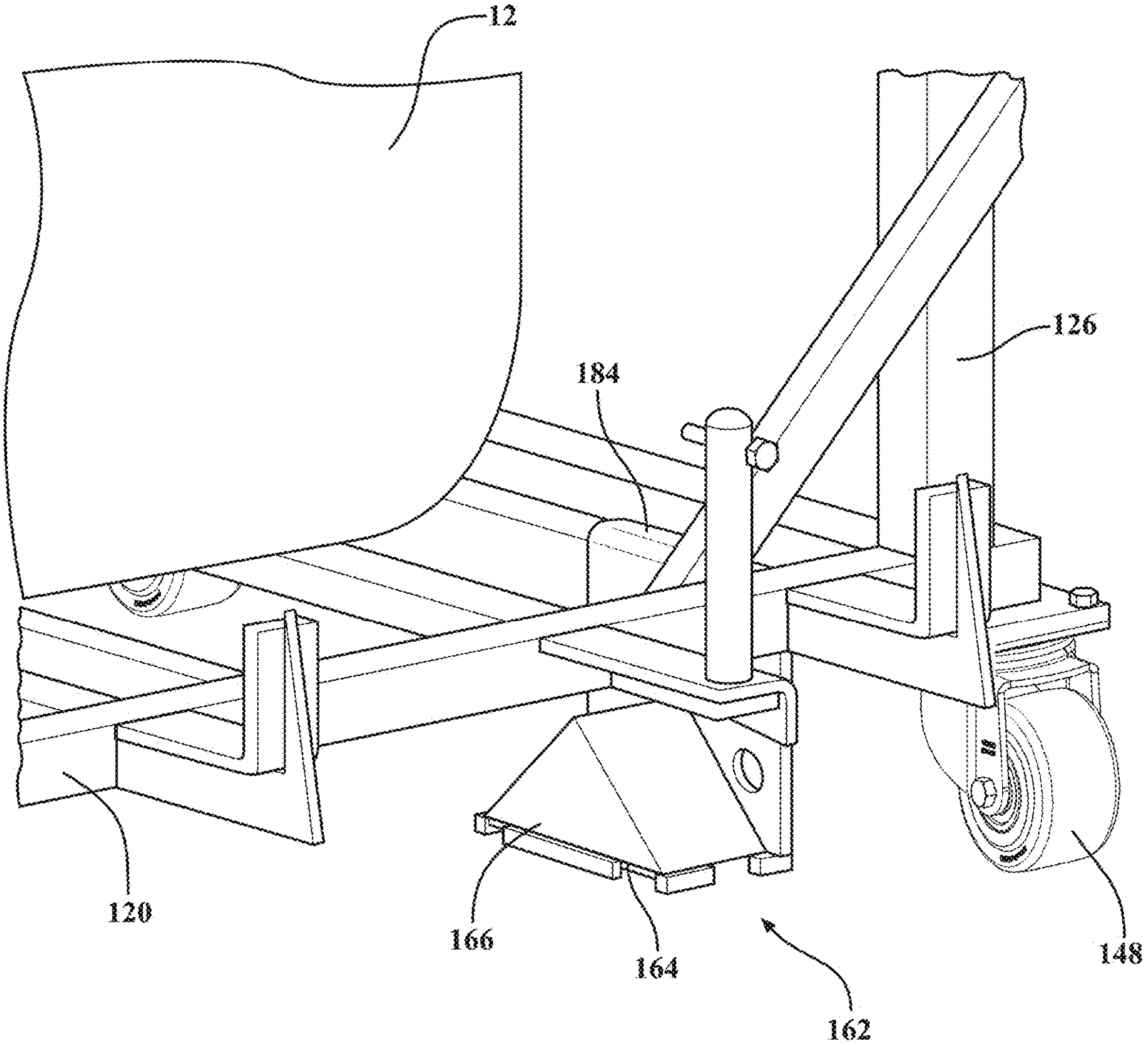

An exemplary second anchor structure 162 shown in FIG. 2, includes a second body portion 164 that may be temporarily secured to the floor surface 19 at a second floor location $F_2$ that is spaced apart from the first floor location $F_1$ in the first direction $F_D$. The second anchor structure 162 includes a hook element 184 that is removably attachable to a component of the bracket structure 102, such as to one of the cross bar members 142 of the extension section 106. The hook element 184 of the second anchor structure 162 may be attached to the bracket structure 102 at a second bracket location $B_2$, wherein the first bracket location $B_1$ is spaced apart from the second bracket location $B_2$ in the first direction $F_D$. According to one embodiment, the second body portion 164 may be temporarily secured to the floor surface 19 using a fastener, such as a nail, that engages the second body portion 164, e.g., inserted through an aperture formed in the second body portion 164, and is removably inserted into the floor surface 19 at the second floor location $F_2$. According to another embodiment, a block structure 166 may be placed on the second body portion 164 and the fastener may be driven through the block structure 166 and into the floor surface 19, see FIG. 5C. The anchor structure 162 and the wheels 108, 148 may remain in contact with the floor surface 19 while the anchor structure 162 is securing the bracket structure 102 and the vehicle 10 in place on the floor surface 19.

Referring to FIGS. 3 and 6, the extension section 106 may further include one or more support elements 153 for supporting the one or more anchor structures 150, 162 when not in use.

Referring back to FIG. 1, the system 100 may further include a connection mechanism 170 that is used to facilitate the transition of the vehicle 10 between the vertical and horizontal positions, as will be discussed in greater detail herein. The connection mechanism 170 comprises a main body 172 including an attachment portion 174 that can be removably coupled to an upper portion 22 of the vehicle 10, such as, for example, a cross beam 24 located at the top of the mast assembly 16. The main body 172 of the connection mechanism 170 may provide a stop for preventing movement of the mast assembly 16, e.g., for preventing stages of the mast assembly 16 from extending, while the vehicle 10 is located in the horizontal position and while the vehicle 10 is transitioned between the vertical and horizontal positions via the system 100. The connection mechanism 170 is coupled to and actuated by a machine 176, such as a crane, another industrial vehicle, etc. to facilitate the transition of the vehicle 10 between the upright position and the horizontal position via the system 100, as will be discussed in greater detail herein.

Figure 7A:
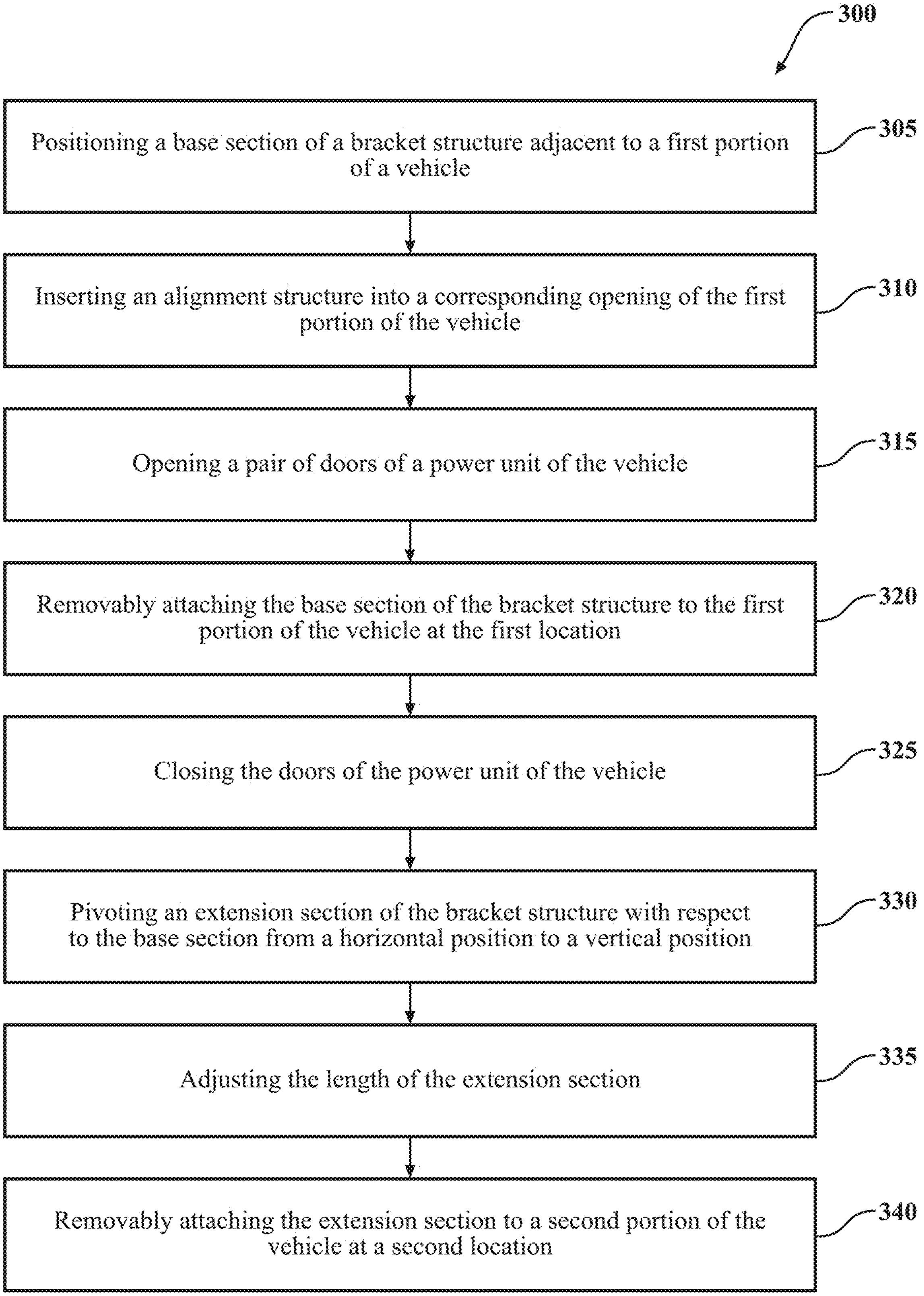
FIGS. 7A and 7B illustrate a method for transitioning a vehicle between a vertical position and a horizontal position using the layover bracket system in accordance with embodiments.
Figure 7B:
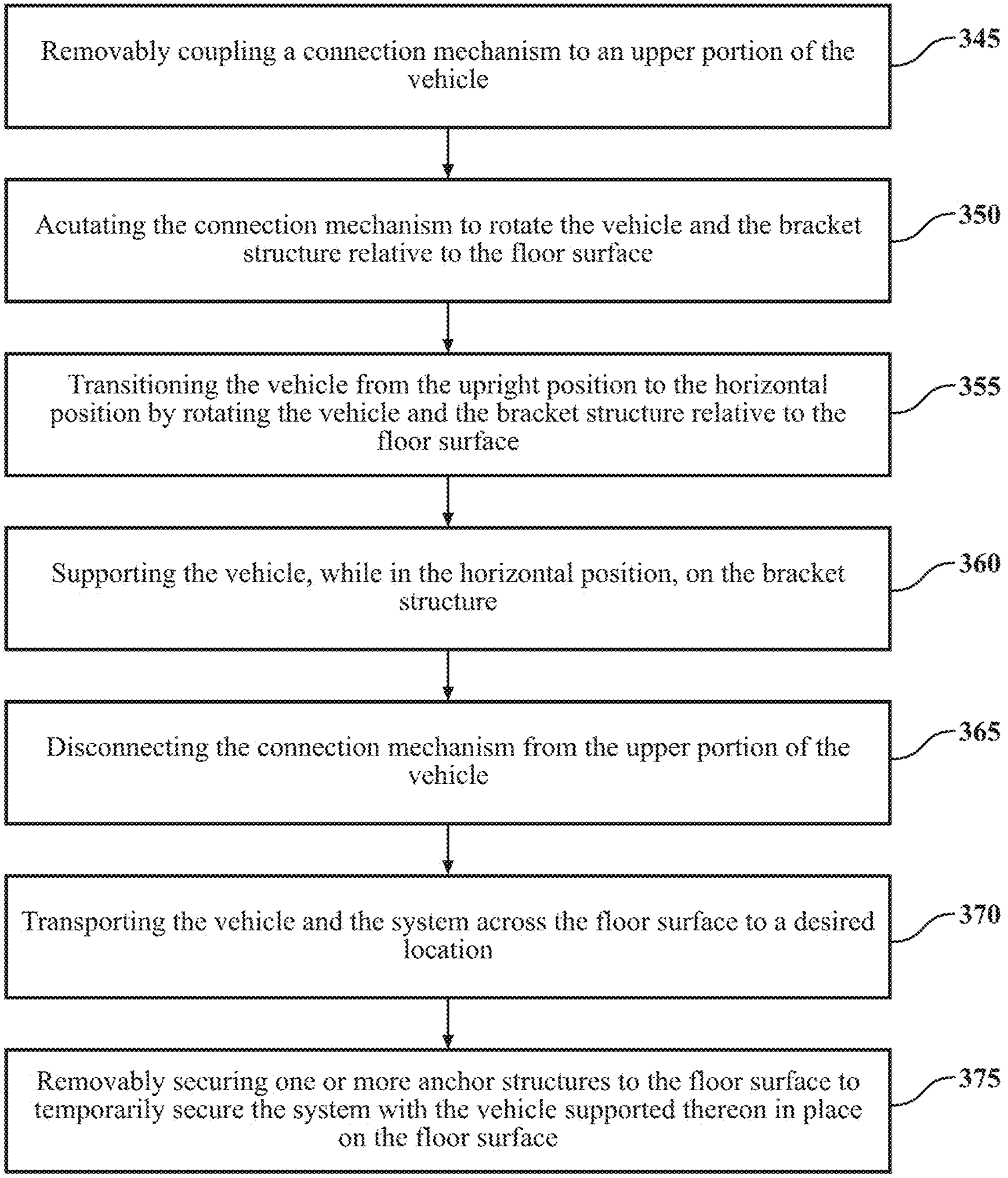

With reference now to FIGS. 7A and 7B, an exemplary method 300 for transitioning an industrial vehicle between a vertical position and a horizontal position using a layover bracket system in accordance with embodiments will now be described. The method 300 will be described with reference to the vehicle 10 and the system 100 as discussed above. Unless mentioned otherwise, the order of the steps provided for the method below is exemplary, i.e., the steps of the disclosed method do not need to be completed in the order provided unless the step indicates that it is to be completed before or after another step.

As an initial step, components of the vehicle 10 may be secured in preparation for transitioning the vehicle 10 from the upright position to the horizontal position. This preparation may include, for example, attaching straps S around various vehicle components, such as, for example an operator platform $O_P$ and outriggers, the power unit 12 and/or battery cover, etc., see, for example, FIG. 4. The strap S around the operator platform $O_P$ and outriggers may prevent extension of the mast stages, since the operator platform $O_P$ is raised/lowered with the upper mast stage and the outriggers are fixed with respect to the mast assembly 16.

Referring now to FIG. 7A, at step 305, the base section 104 of the bracket structure 102 is positioned adjacent to the first portion 13 of the vehicle 10. As a non-limiting example, an operator may move the bracket structure 102 across the floor surface 19 on the wheels 108 and 148 of the base section 104 and the extension section 106 until the base section 104 of the bracket structure 102 is aligned with the first portion 13 of the vehicle 10. The base section 104 may optionally include an alignment structure 105 (see FIGS. 3 and 6), such as, for example, a projection that extends outwardly from a front face 104C of the base section 104 between the pair of bolts B. At step 310, the alignment structure 105 may be inserted into a corresponding opening 13*a* of the first portion 13 of the vehicle 10 to properly position the bracket structure 102 relative to the vehicle 10, see FIG. 6.

Figure 9A:
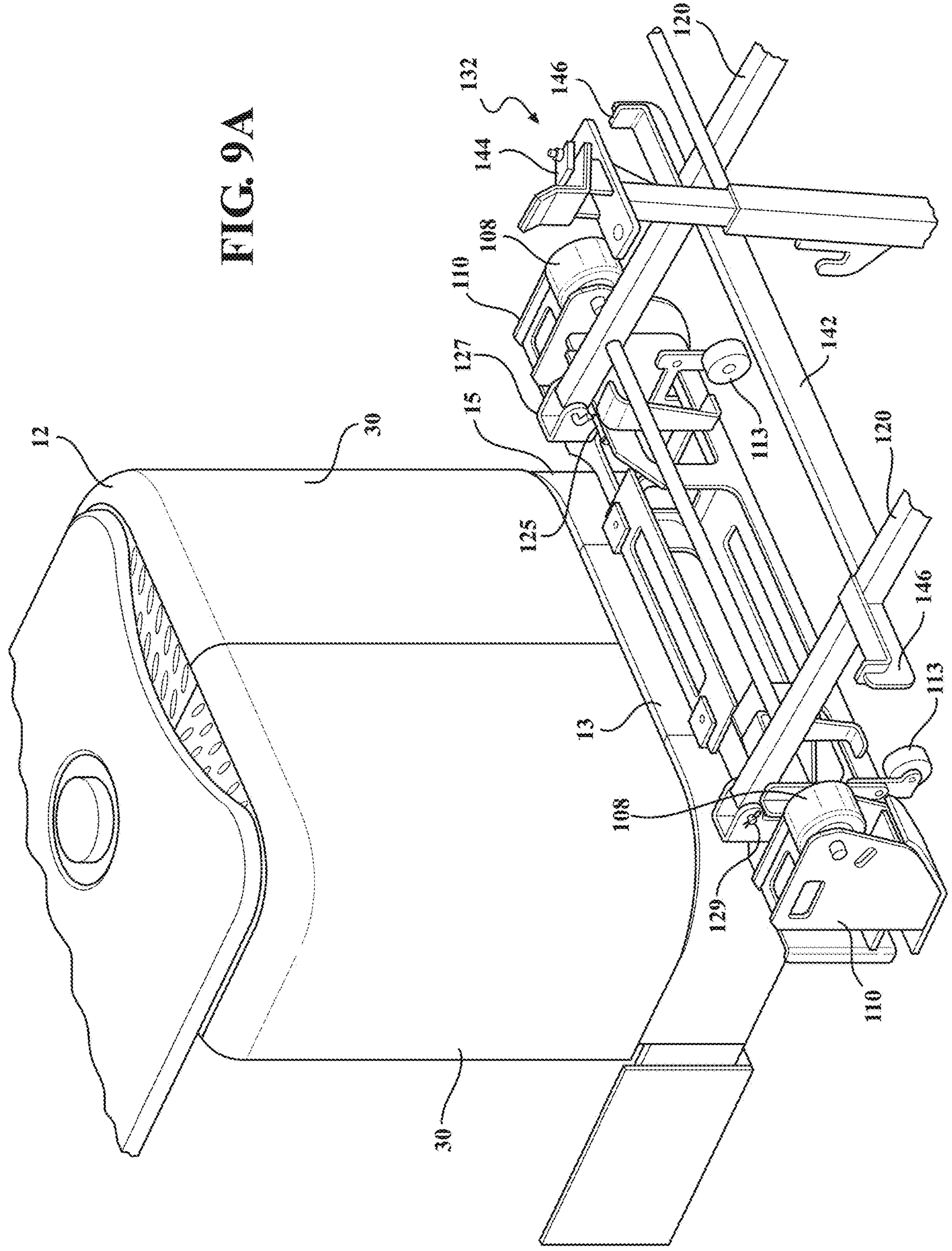
FIGS. 9A-9C are perspective views illustrating a portion of the bracket structure being attached to the vehicle according to embodiments.
Figure 9B:
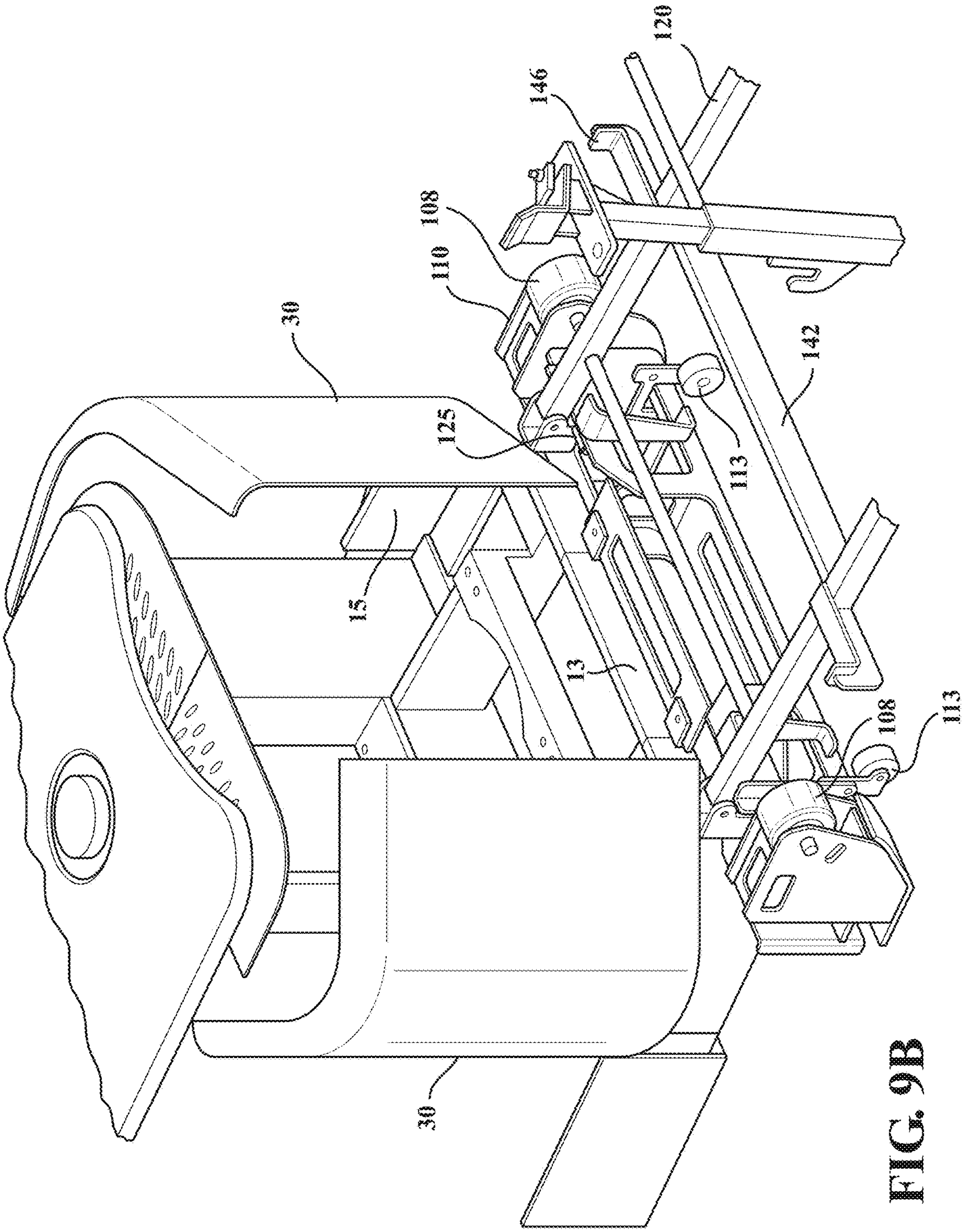
Figure 9C:
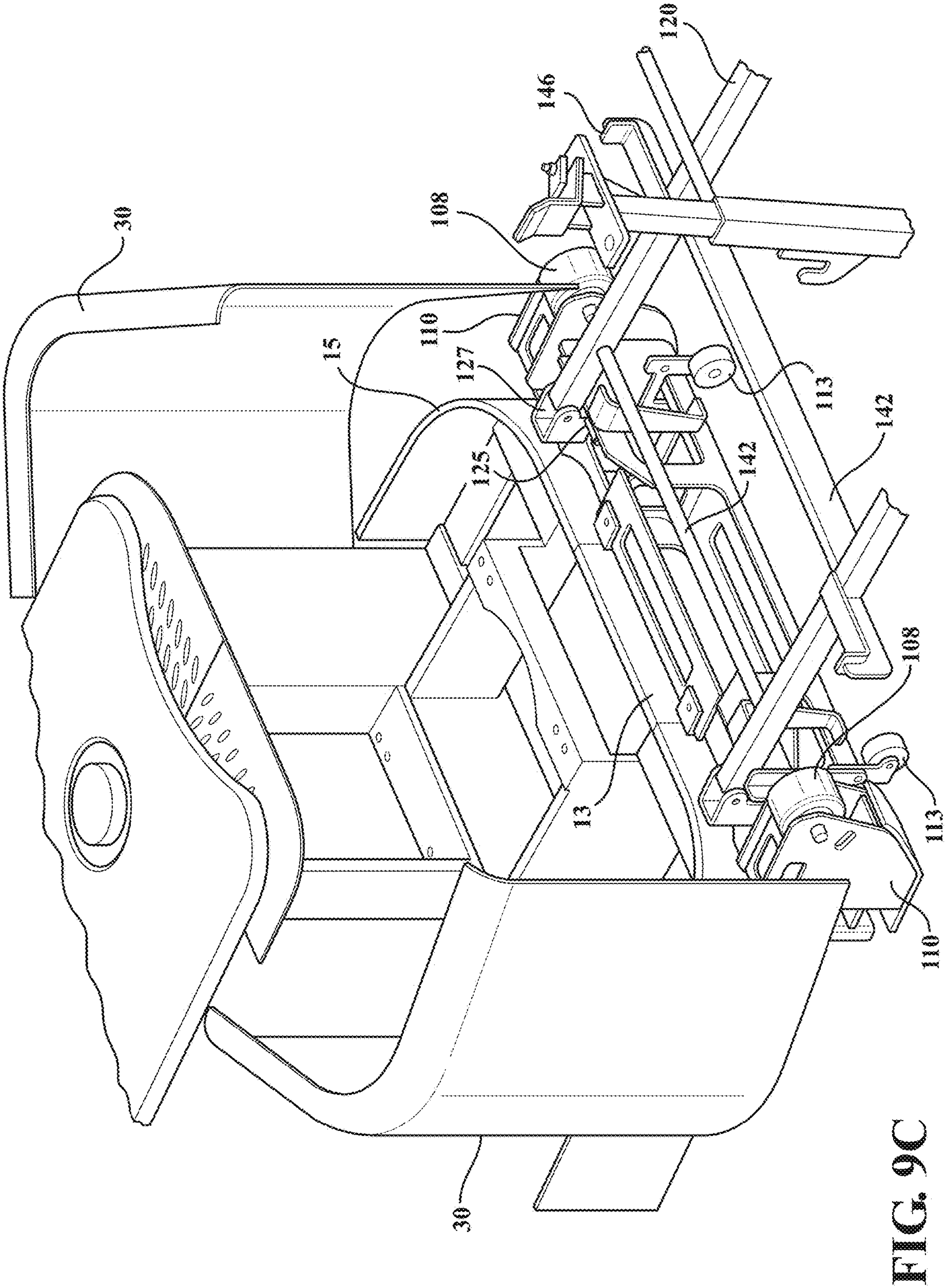

At step 315, a pair of doors 30 of the power unit 12 are opened so the operator can access an area inside the power unit 12 where the base section 104 will be removably attached to the vehicle 10 at the first location, see FIGS. 9A-9C. At step 320, the base section 104 of the bracket structure 102 is removably attached to the first portion 13 of the vehicle 10 at the first location. As shown in FIG. 6, the base section 104 may be fastened to the first portion 13 of the vehicle 10 using the bolts B and corresponding nuts N fastened onto the bolts B. After the base section 104 is removably secured to the vehicle 10, the doors 30 of the power unit 12 are closed at step 325. One or more additional straps (not shown) may be attached around the power unit 12 to prevent the doors 30 from opening while the vehicle 10 is located in the horizontal position and while the vehicle 10 is transitioned from the upright position to the horizontal position via the system 100. The secondary wheels 113 may be retracted into the base section 104 to provide ground clearance, and the traction portion 111 may be lowered to engage and grip the floor surface 19.

Figure 1A:
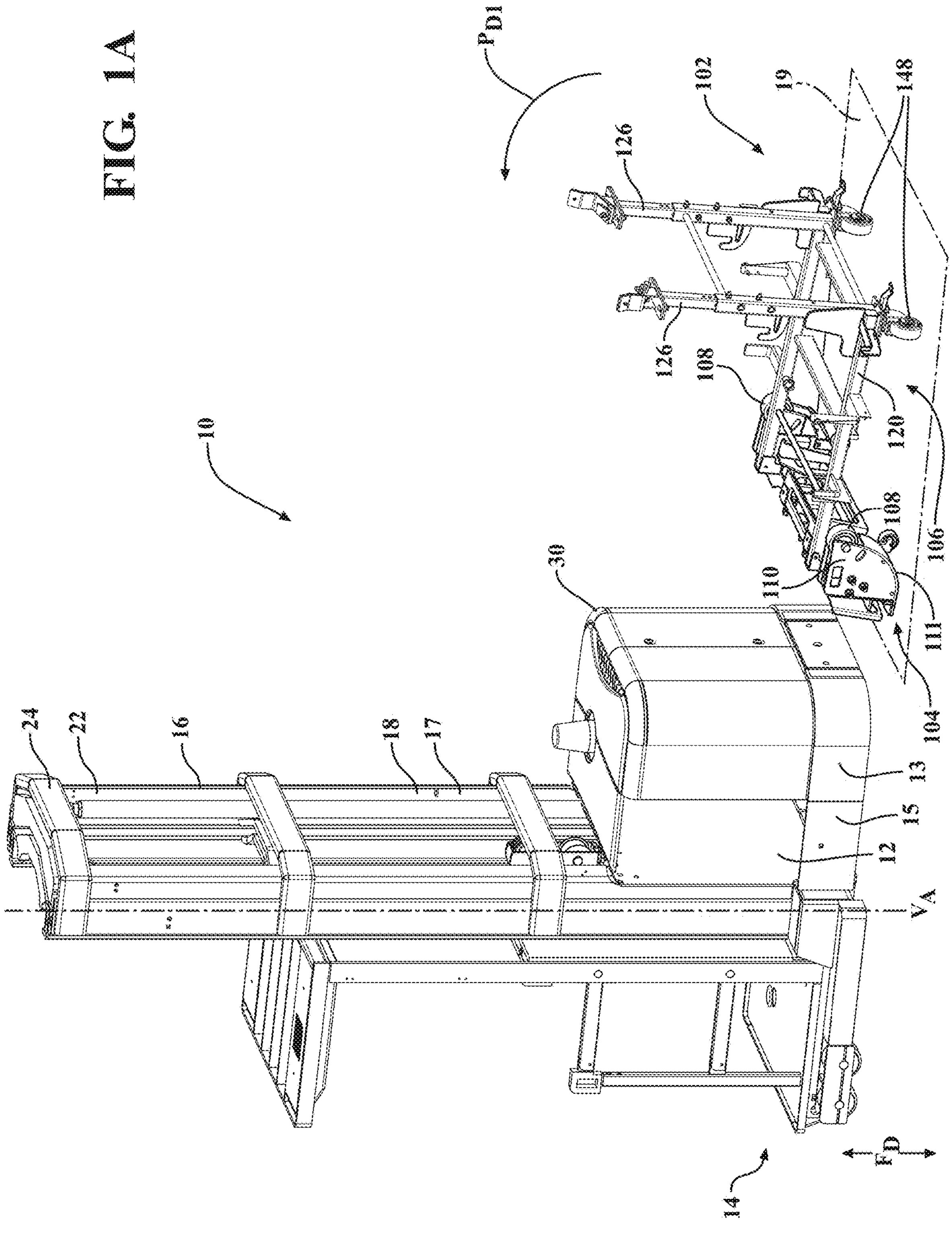
FIG. 1A is a perspective view of a portion of a bracket structure of the layover bracket system attached to the vehicle while the vehicle is in a vertical position.
Figure 1B:
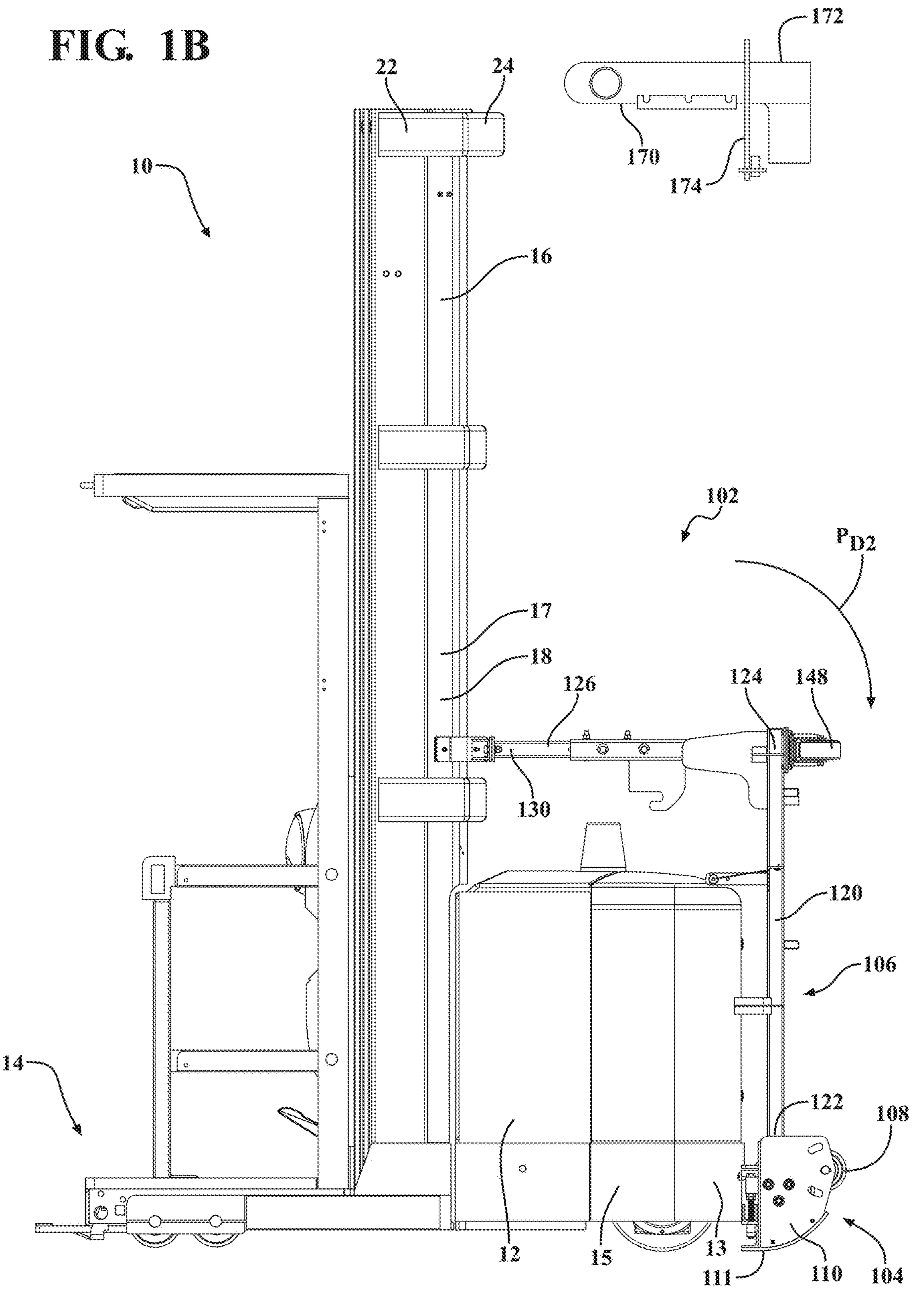
FIG. 1B is a side plan view of the layover bracket system attached to the vehicle while the vehicle is in the vertical position.

Referring still to FIG. 7A, at step 330, the extension section 106 of the bracket structure 102 is pivoted with respect to the base section 104 in a first pivot direction $PD_1$ (see FIG. 1A) from a horizontal position as shown in FIG. 1A to a vertical position as shown in FIG. 1B. In the illustrated embodiment, pivoting the extension section 106 with respect to the base section 104 is effected by pivoting the at least one first bar 120 of the extension section 106 in the first pivot direction $P_{D1}$ relative to the base section 104.

Depending on the distance from the at least one first bar 120 of the extension section 106 to the second portion 17 of the vehicle 10, the length L of the at least one second bar 126 of the extension section 106 may be adjusted at step 335 such that the at least one second bar 126 extends up to the vehicle 10 at the second location. Next, the extension section 106 is removably attached to the second portion 17 of the vehicle 10 at the second location using the securing structure 132 at step 340.

After steps 320 and 340 have been completed, the bracket structure 102 is at this point attached to the vehicle 10 at two locations that are spaced apart from one another in the first direction $F_D$, i.e., at the first and second locations at the first and second portions 13, 17 of the vehicle 10. Before step 330, while the vehicle 10 is in the vertical position, the at least one first bar 120 of the extension section 106 is in a horizontal position, the at least one second bar 126 of the extension section 106 is in a vertical position, and the at least one wheel 148 of the extension section 106 is in a floor engaging position where the at least one wheel 148 engages the floor surface, as shown in FIG. 1A. After step 340, while the vehicle 10 is in the vertical position, the at least one first bar 120 of the extension section 106 is in a vertical position, the at least one second bar 126 of the extension section 106 is in a horizontal position, and the at least one wheel 148 of the extension section 106 is in a non-floor engaging position where the at least one wheel 148 does not engage the floor surface, as shown in FIG. 1B.

Referring now to FIG. 7B, at step 345, the connection mechanism 170 is removably coupled to the upper portion 22 of the vehicle 10, for example, to the cross beam 24 of the mast assembly 16. At step 350, the connection mechanism 170 is actuated to initiate rotation of the vehicle 10 and the bracket structure 102 relative to the floor surface 19. Actuating the connection mechanism 170 may be effected by using the machine 176 to rotate the connection mechanism 170, thus transitioning the vehicle 10, with the bracket structure 102 coupled thereto, from the vertical position to the horizontal position at step 355, see FIG. 1. During this transition, the bracket structure 102 rotates while the at least one curved ramp surface 110 of the base section 104 supports the bracket structure 102 and the vehicle 10 on the floor surface 19 so as to effectively roll the bracket structure 102 and the vehicle 10 from the vertical position to the horizontal position. After step 355, while the vehicle 10 is in the horizontal position, the at least one first bar 120 of the extension section 106 is in a horizontal position, the at least one second bar 126 of the extension section 106 is in a vertical position, and the at least one wheel 148 of the extension section 106 is in a floor engaging position where the at least one wheel 148 engages the floor surface, as shown in FIG. 1.

At step 360, the bracket structure 102 supports the vehicle 10 on the floor surface 19 in the horizontal position of the vehicle 10, as shown in FIG. 1. At step 365, the connection mechanism 170 is optionally detached from the upper portion 22 of the vehicle 10 (the connection mechanism 170 may remain attached to the vehicle 10 during transport of the vehicle 10), and at step 370 the system 100 with the supported vehicle 10 may be transported to a desired location across the floor surface 19. The order of steps 365 and 370 may depend on the type of machine 176 being used to actuate the connection mechanism 170. For example, if the machine 176 is another industrial vehicle, the other industrial vehicle may be used to transport the system 100 with the supported vehicle 10 to a desired location, in which case it is contemplated that the connection mechanism 170 may remain attached to the upper portion 22 of the vehicle 10 until the system 100 with the supported vehicle 10 are at the desired location. At step 375, one or more anchor structures 150 and/or 162 are removably secured to the floor surface 19 to temporarily secure the system 100 with the vehicle 10 supported thereon in place on the floor surface 19. The forks 23 may be removed from the vehicle 10 and supported on the bracket structure 102 via the fork retainers 146 and the fork pins 147 at any suitable time.

Figure 8A:
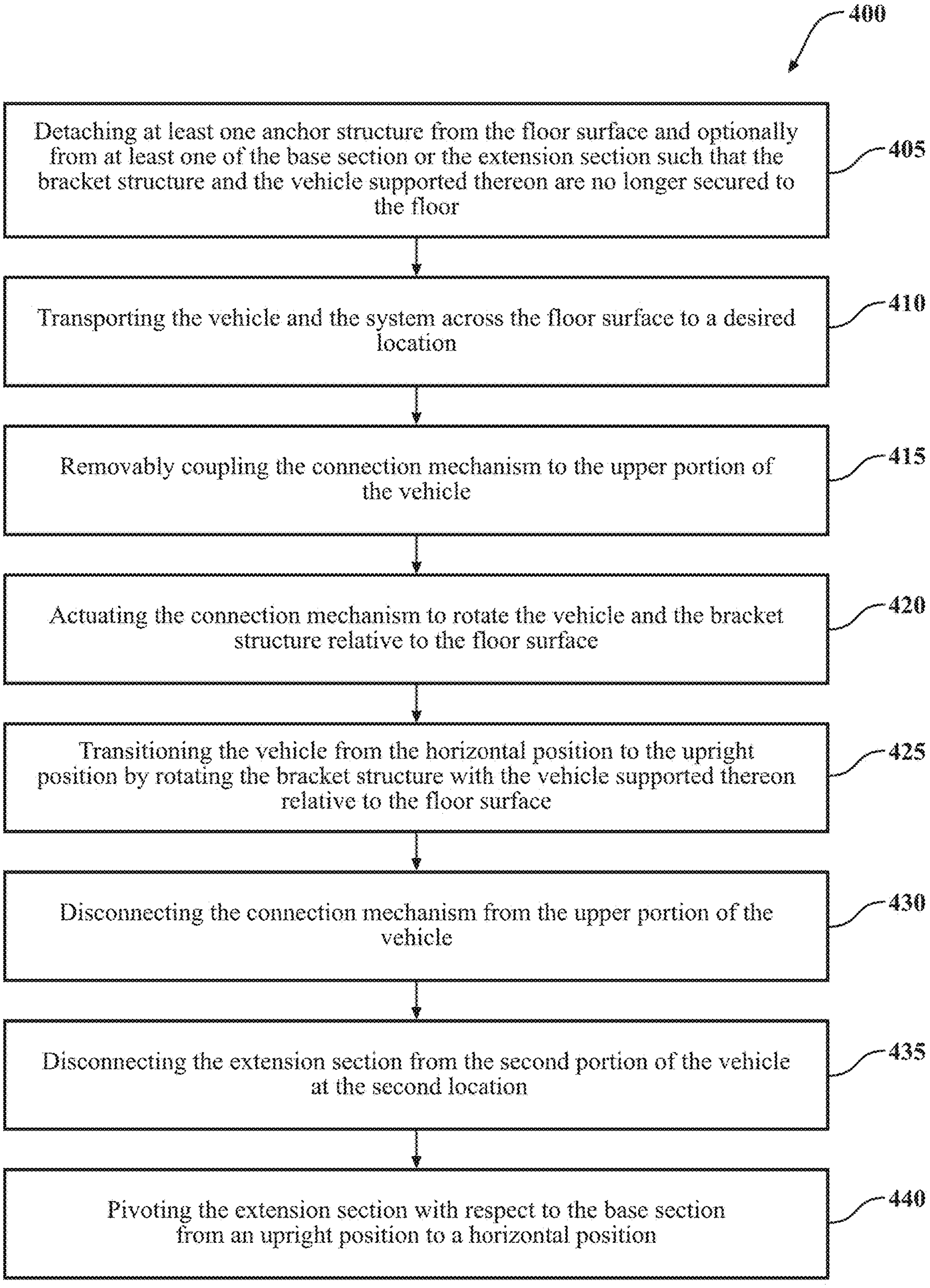
FIGS. 8A and 8B illustrate a method for transitioning a vehicle between a horizontal position and a vertical position using the layover bracket system in accordance with embodiments.
Figure 8B:
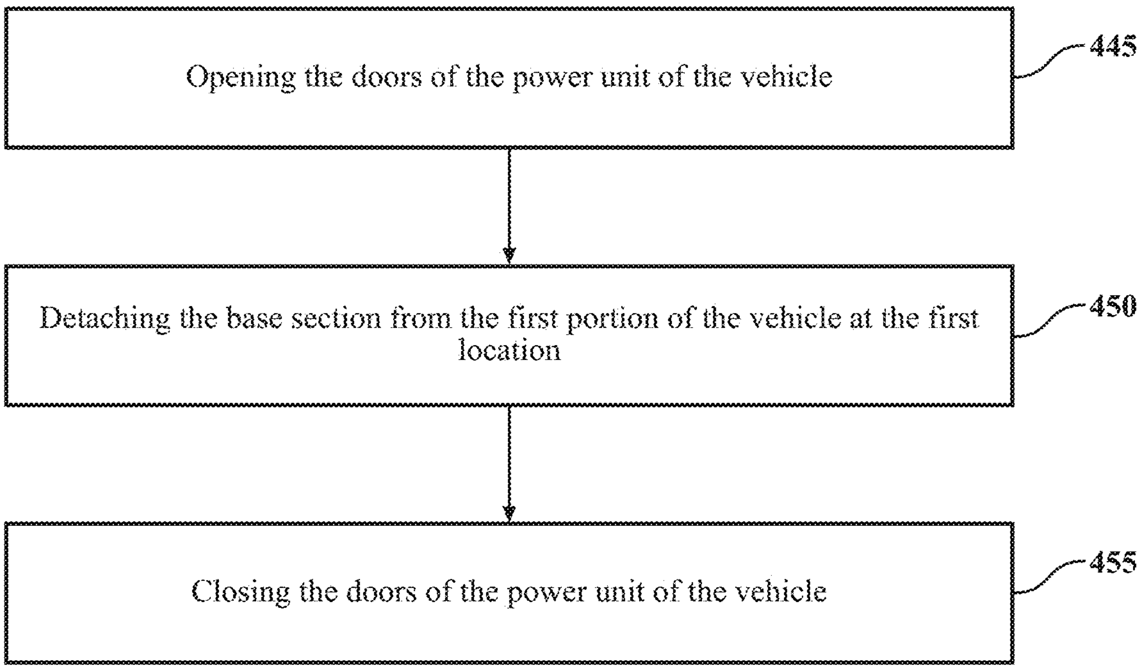

Referring now to FIGS. 8A and 8B, an exemplary method 400 for transitioning an industrial vehicle between a horizontal position and a vertical position using a layover bracket system in accordance with embodiments will now be described. The method 400 will be described with reference to the vehicle 10 and the system 100 as discussed above. Unless mentioned otherwise, the order of the steps provided for the method below is exemplary, i.e., the steps of the disclosed method do not need to be completed in the order provided unless the step indicates that it is to be completed before or after another step.

Referring to FIG. 8A, at step 405, at least one anchor structure 150 and/or 162 is detached from the floor surface 19 and from at least one of the base section 104 or the extension section 106 as needed such that the bracket structure 102 and the vehicle 10 supported thereon are no longer secured to the floor surface 19. At step 410, the system 100 and the supported vehicle 10 may be transported across the floor surface 19 to a desired location.

At step 415, if not previously performed, e.g., prior to transport of the vehicle 10, the connection mechanism 170 is removably attached to the upper portion 22 of the vehicle 10, for example, to the cross beam 24 of the mast assembly 16. The order of steps 410 and 415 may depend on the type of machine 176 being used to actuate the connection mechanism 170 at step 420. For example, if the machine 176 is another industrial vehicle, the other industrial vehicle may be used to transport the system 100 with the supported vehicle 10 to a desired location, in which case it is contemplated that the connection mechanism 170 may be attached to the upper portion 22 of the vehicle 10 before the system 100 with the supported vehicle 10 is transported to the desired location.

At step 420, the connection mechanism 170 is actuated to rotate the vehicle 10 and the bracket structure 102 relative to the floor surface 19. Actuating the connection mechanism 170 may be effected by using the machine 176 to rotate the connection mechanism 170, thus transitioning the vehicle 10, with the bracket structure 102 coupled thereto, from the horizontal position to the vertical position at step 425, see FIG. 1A. During this transition, the bracket structure 102 rotates while the at least one curved ramp surface 110 of the base section 104 supports the bracket structure 102 and the vehicle 10 on the floor surface 19 so as to effectively roll the bracket structure 102 and the vehicle 10 from the horizontal position to the vertical position.

Once the vehicle 10 is in the vertical position, at step 430, the connection mechanism 170 is detached from the upper portion 22 of the vehicle 10. At step 435, the extension section 106 is detached from the second portion 17 of the vehicle 10 at the section location.

At step 440, the extension section 106 is pivoted with respect to the base section 104 in a second pivot direction $P_{D2}$ (see FIG. 1B) from a vertical position as shown in FIG. 1B to a horizontal position as shown in FIG. 1A. In the illustrated embodiment, pivoting the extension section 106 with respect to the base section 104 is effected by pivoting the at least one first bar 120 of the extension section 106 in the second pivot direction $P_{D2}$ relative to the base section 104. Before step 440, while the vehicle 10 is in the vertical position the at least one first bar 120 of the extension section 106 is in a vertical position, the at least one second bar 126 of the extension section 106 is in a horizontal position, and the at least one wheel 148 of the extension section 106 is in a non-floor engaging position where the at least one wheel 148 does not engage the floor surface, as shown in FIG. 1B. After step 440, the at least one first bar 120 of the extension section 106 is in a horizontal position, the at least one second bar 126 of the extension section 106 is in a vertical position, and the at least one wheel 148 of the extension section 106 is in a floor engaging position where the at least one wheel 112 engages the floor surface, as shown in FIG. 1A.

Referring now to FIG. 8B, the traction portion 111 may be raised off of the floor surface 19, and the secondary wheels 113 may be lowered or extended into the extended position. At step 445, the doors 30 of the power unit 12 are opened so the operator can access the area inside the power unit 12 so that the base section 104 can be detached from the vehicle 10 at the first location. At step 450, the base section 104 is detached from the first portion 13 of the vehicle 10 at the first location. In the illustrated embodiment, this is effected by removing the nuts N from the bolts B, see FIG. 6, and then moving the bracket structure 102 away from the vehicle 10. After the base section 104 has been detached from the first portion 13 of the vehicle 10, the doors 30 of the power unit 12 may be closed at step 455. Optionally, the straps S and/or other items may be stored in the storage compartment 151. The forks 23 may be removed from the fork retainers 146 and the fork pins 147 and secured to the vehicle 10 at any suitable time.

Figure 11:
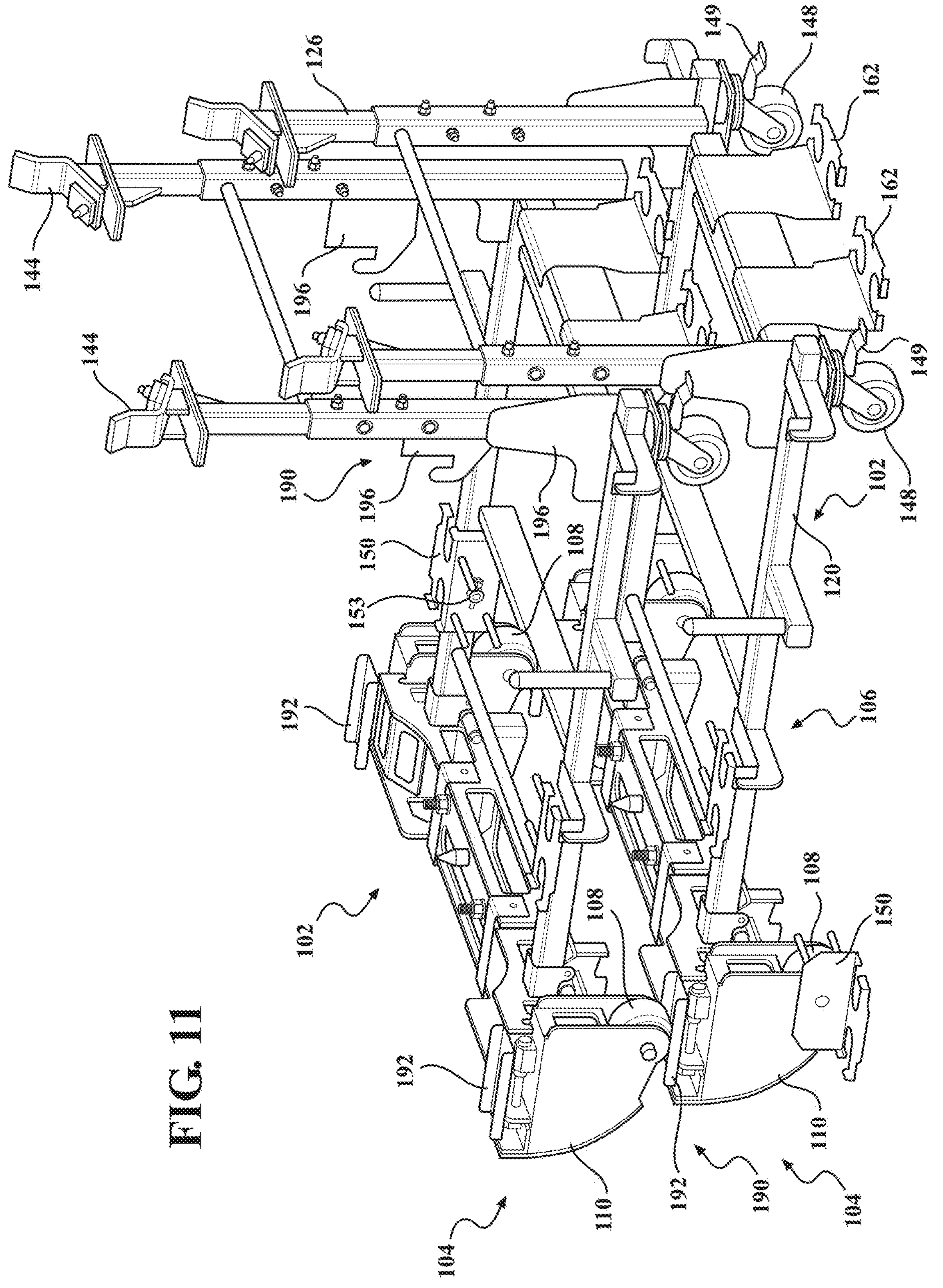
FIG. 11 is a perspective view illustrating the nesting of a plurality of bracket structures according to embodiments.

Referring now to FIG. 11, a plurality of bracket structures 102 according to embodiments are shown. The bracket structures 102 may include any or all of the structure of the bracket structures 102 discussed herein. The bracket structures 102 according to this embodiment further include nesting structure 190 that allow multiple bracket structures 102 to be stacked on top of one another. The exemplary nesting structure 190 shown in FIG. 11 include nesting channels 192 that extend upwardly from an upper surface of the base section 104. Each nesting channel 192 may receive one or more wheels of another bracket structure 102 nested on top of the bracket structure 102, such as the wheel(s) 108 of the base section 104. The exemplary nesting structure 190 shown in FIG. 11 also includes nesting shelves 196 attached to the second bars 126 of the extension section 106. The nesting shelves 196 may support and receive a portion of the extension section 106 of another bracket structure 102, and may prevent any stacked bracket structures 102 from moving in any direction. The stacked configuration for a plurality of bracket structures 102 provided by the nesting structure 190 provides space saving benefits when moving/transporting multiple bracket structures 102.

To prepare the bracket structures 102 for stacking/nesting, the base section 104 of each bracket structure 102 may be rotated such that it is in the position shown in FIG. 10A, wherein the wheels 108 are in a ground-engaging position, and the nesting channels 192 extend upwardly from the upper surface of the base section 104. The locking pin 129 may be used to lock the position of the base section 104 and the extension section 106 relative to one another, see, for example, FIG. 10A. The bracket structures 102 may then be stacked on top of one another as shown in FIG. 11. Any unused anchor structures 150, 162 may be supported on the one or more support elements 153 on the extension section 106.

Figure 12:
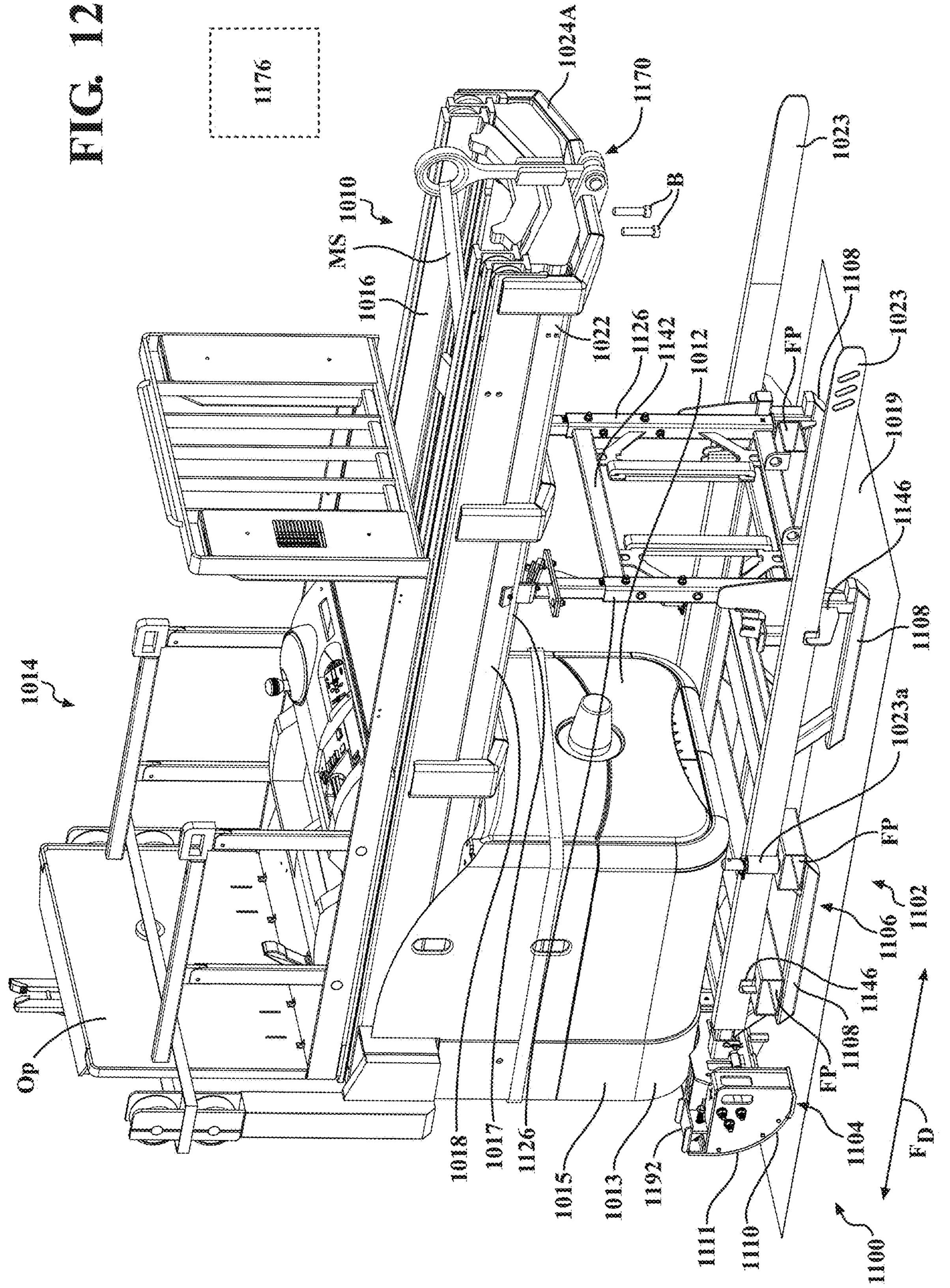
FIG. 12 is a perspective view of an industrial vehicle supported in a horizontal position on a layover bracket system according to embodiments.

Referring now to FIGS. 12-20, FIG. 12 illustrates an industrial vehicle 1010 (hereinafter "vehicle 1010") supported on a layover bracket system 1100 (hereinafter "system 1100") constructed in accordance with embodiments. The vehicle 1010 depicted in FIG. 12 is a forklift truck, but the embodiments disclosed herein may be used with any suitable type of industrial vehicle. The vehicle 1010 includes a power unit 1012 and a load handling assembly 1014 having a mast assembly 1016. The power unit 1012, the load handling assembly 1014, and the mast assembly 1016 each include traditional components, as will be apparent to those having ordinary skill in the art, which components will not be described in detail herein. A first portion 1013 of the vehicle 1010 is defined by a lower portion 1015 of the power unit 1012 adjacent to a floor surface 1019 when the vehicle 1010 is in an upright position, also referred to herein as a vertical position, see FIG. 12A. A second portion 1017 of the vehicle 1010 is spaced apart in a first direction $F_D$ of the vehicle 1010 from the first portion 1013 and is defined by a portion 1018 of the mast assembly 1016, and ranges from near the center of mass of the vehicle 1010 to the top of the mast assembly 1016, wherein the first direction $F_D$ is parallel to a vertical axis $V_A$ of the vehicle 1010 when positioned in the upright position, see FIG. 12A. In the illustrated embodiment, the second portion 1017 is located generally around the center of mass of the vehicle 1010.

Figure 13:
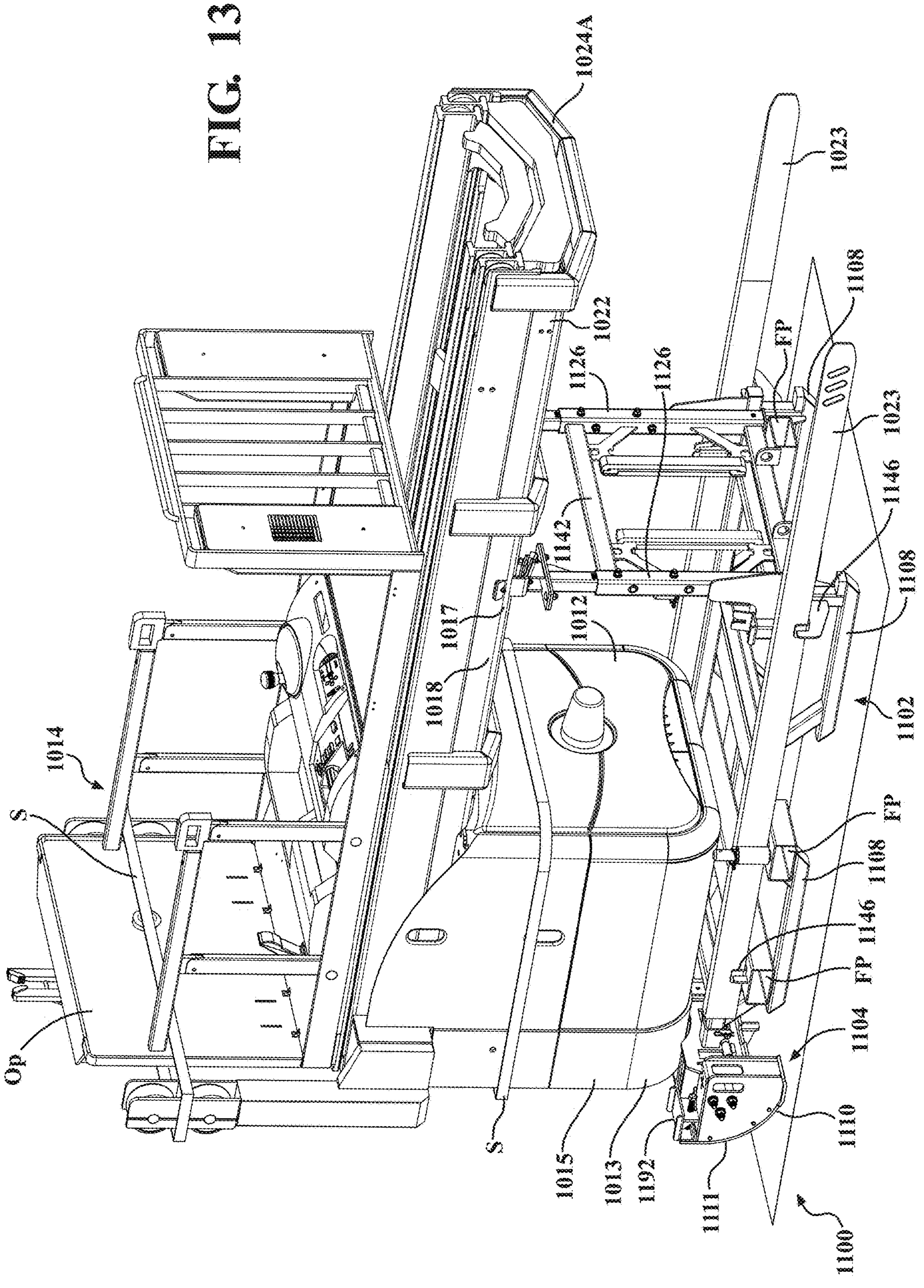
FIG. 13 is a perspective view of the industrial vehicle supported in the horizontal position on the layover bracket system of FIG. 12.

The vehicle 1010 is depicted in FIGS. 12 and 13 as being completely supported on the layover bracket system 1100 in a horizontal position, also referred to herein as a laid over position. One of the vertical position or the horizontal position of the vehicle 1010 may also be referred to herein as a first position, with the other of the vertical position or the horizontal position of the vehicle 1010 being referred to herein as a second position. The layover bracket system 1100 is used to transition the vehicle 1010 from the vertical position to the horizontal position, and vice versa, and to support the vehicle 1010 on the floor surface 1019 while the vehicle 1010 is in the horizontal position, as will be described in detail herein. The system 1100 comprises a bracket structure 1102, which includes a base section 1104 and an extension section 1106 pivotably coupled together as a single structure.

Figure 14:
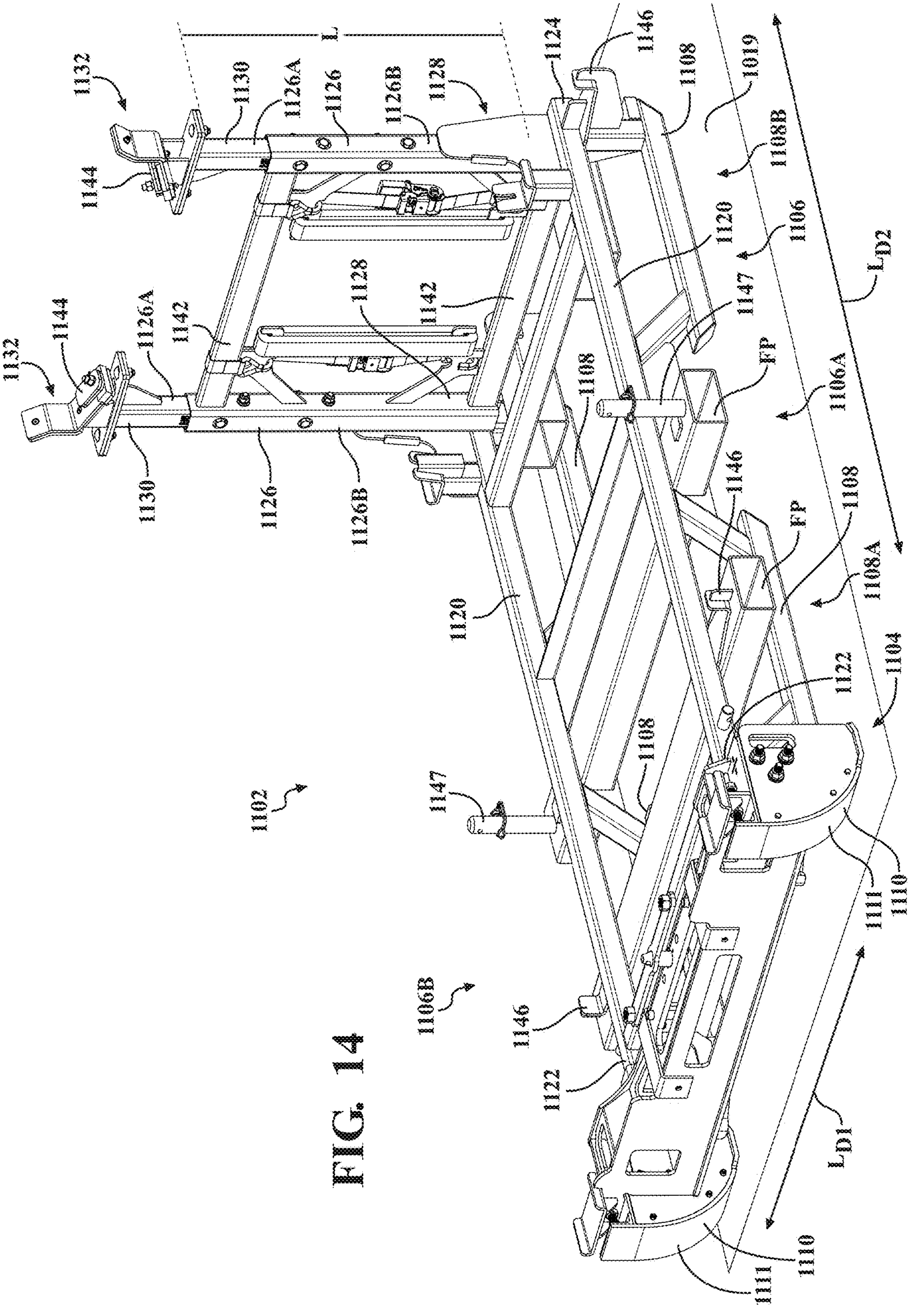
FIG. 14 is a perspective view of a bracket structure of the layover bracket system of FIG. 12.

With reference to FIG. 14, the extension section 1106 of the bracket structure 1102 includes at least one un-wheeled support element 1108, and preferably two pairs 1108A and 1108B of un-wheeled support elements 1108, wherein the un-wheeled support elements 1108 in each pair 1108A, 1108B are spaced apart from one another in a lateral direction $L_{D1}$ of the bracket structure 1102 and the first pair 1108A is spaced apart from the second pair 1108B in a longitudinal direction $L_{D2}$ of the bracket structure 1102. The un-wheeled support elements 1108 are provided for supporting the system 1100 while the vehicle 1010 is supported on the system 1100 in the horizontal position, as will be discussed in greater detail herein. According to embodiments, the un-wheeled support elements 1108 may be spaced apart from one another in the lateral and longitudinal directions $L_{D1}$. $L_{D2}$ of the bracket structure 1102 such that the un-wheeled support elements 1108 are respectively located toward opposed lateral sides 1106A, 1106B of the extension section 1106 to provide maximum support and stability for the vehicle 1010 while supported on the system 1100 in the horizontal position. It is contemplated that the base section 104 may include any suitable number of un-wheeled support elements 1108. According to one exemplary embodiment, the un-wheeled support elements 1108 may comprise elongate rail members with generally flat surfaces that extend along the floor surface 1019 when the system 1100 is supporting the vehicle 1010 in a horizontal position.

The base section 1104 includes at least one curved ramp surface 1110 facing away from the vehicle 1010 when the base section 1104 is secured to the vehicle 1010, see also FIGS. 12 and 13. The at least one curved ramp surface 1110 supports the system 1100 and the vehicle 1010 on the floor surface 1019 while the vehicle 1010 is being transitioned between the vertical and horizontal positions via the system 1100. The at least one curved ramp surface 1110 may include a traction portion 1111, see FIG. 14, to militate against unwanted sliding or skidding movement of the bracket structure 1102 and the supported vehicle 1010 when the system 1100 is being used to transition the vehicle 1010 between the vertical and horizontal positions. The traction portion 1111 may be integrally formed with the curved ramp surface 1110, such as, for example, a series of corrugations or protuberances formed in the curved ramp surface 1110, or may be separately formed from the curved ramp surface 1110 and applied thereto, such as, for example, a friction pad or rubber pad.

Figure 15:
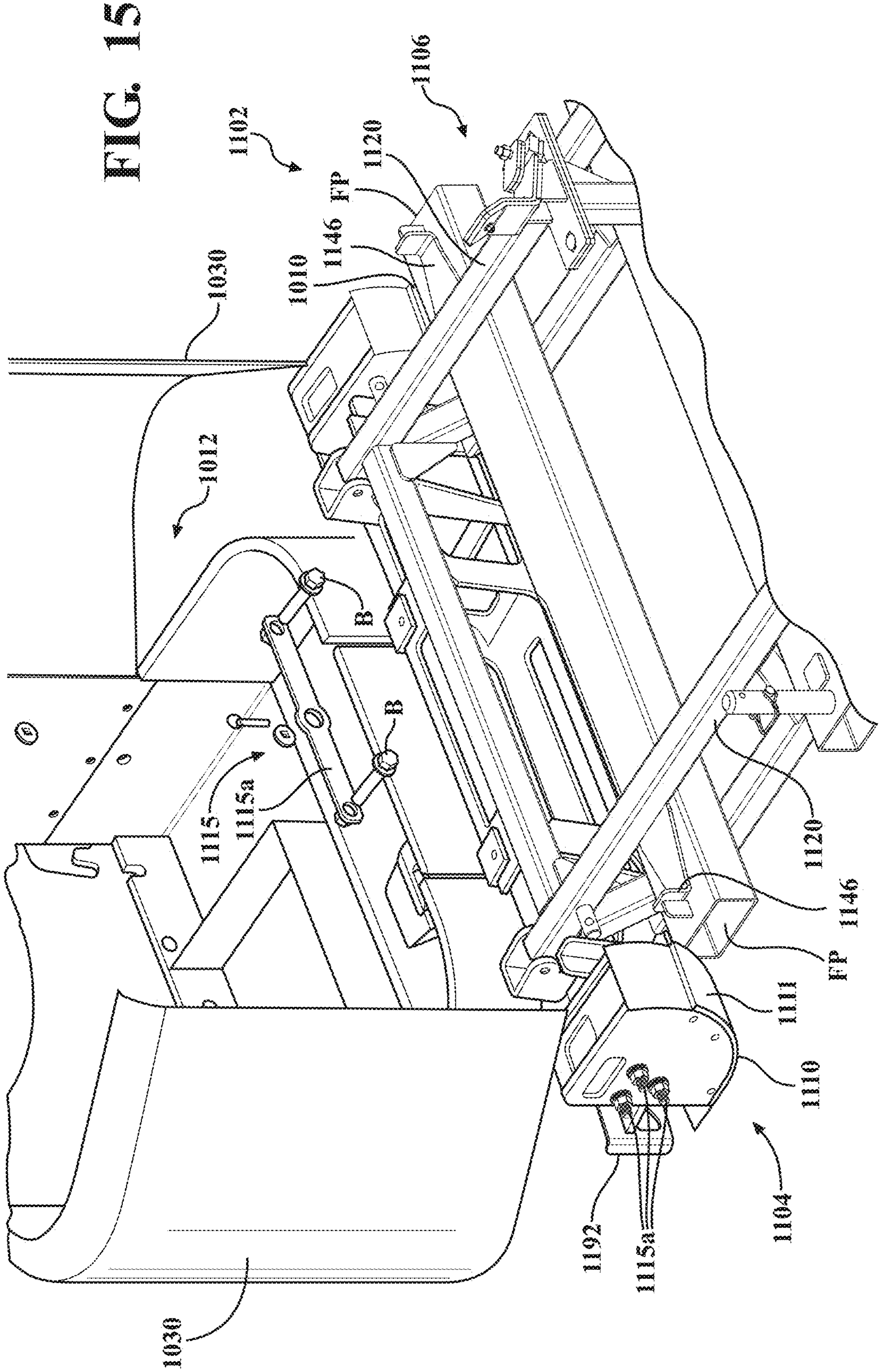
FIG. 15 is a perspective view of a portion of the vehicle being attached to the bracket structure of FIG. 14.

With reference to FIG. 15, the base section 1104 further includes fastening structure, for example a bracket and pin structure 1115 and one or more bolts B according to this embodiment, which fastening structure is used to removably attach the base section 1104 to the vehicle 1010 at a first location, as will be discussed in greater detail below. The first location may correspond to the first portion 1013 of the vehicle 1010, such that the base section 1104 is removably securable to the lower portion 1015 of the power unit 1012 adjacent to the floor surface 1019 when the vehicle 1010 is in an upright position. Additional details in connection with removably attaching the base section 1104 to the vehicle 1010 will be discussed below.

Figure 16C:
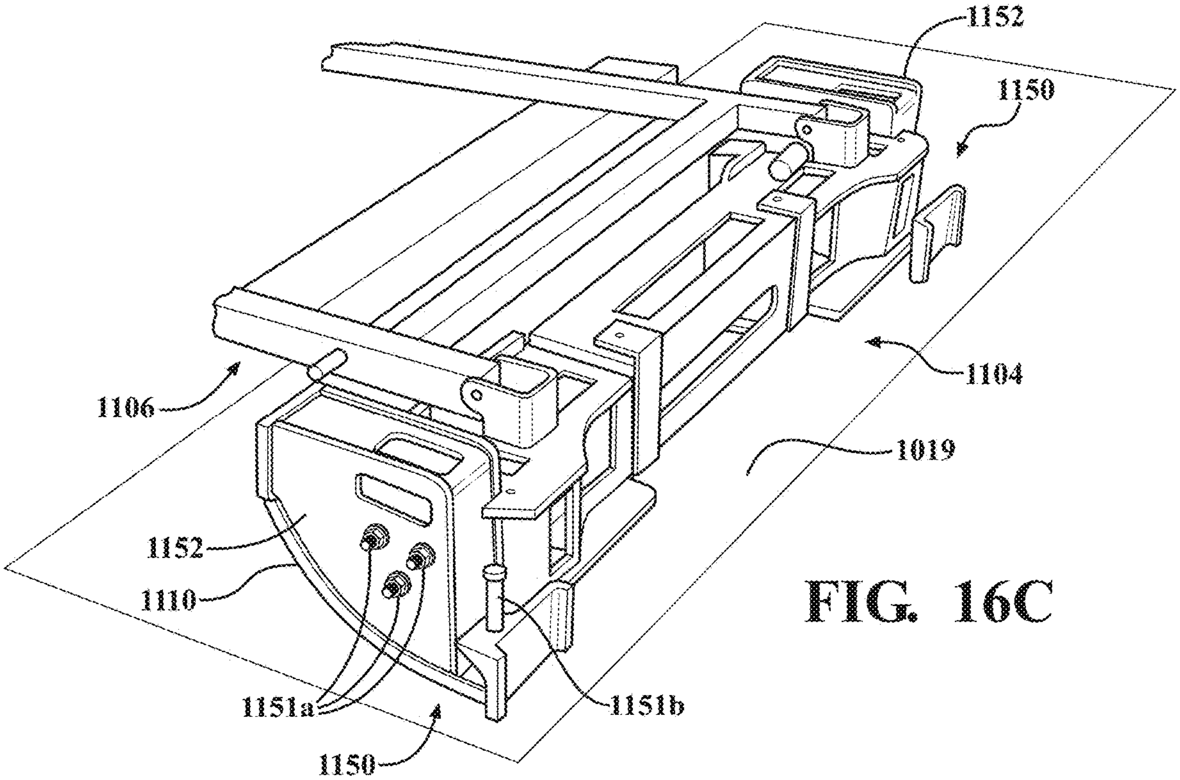
Figure 16D:
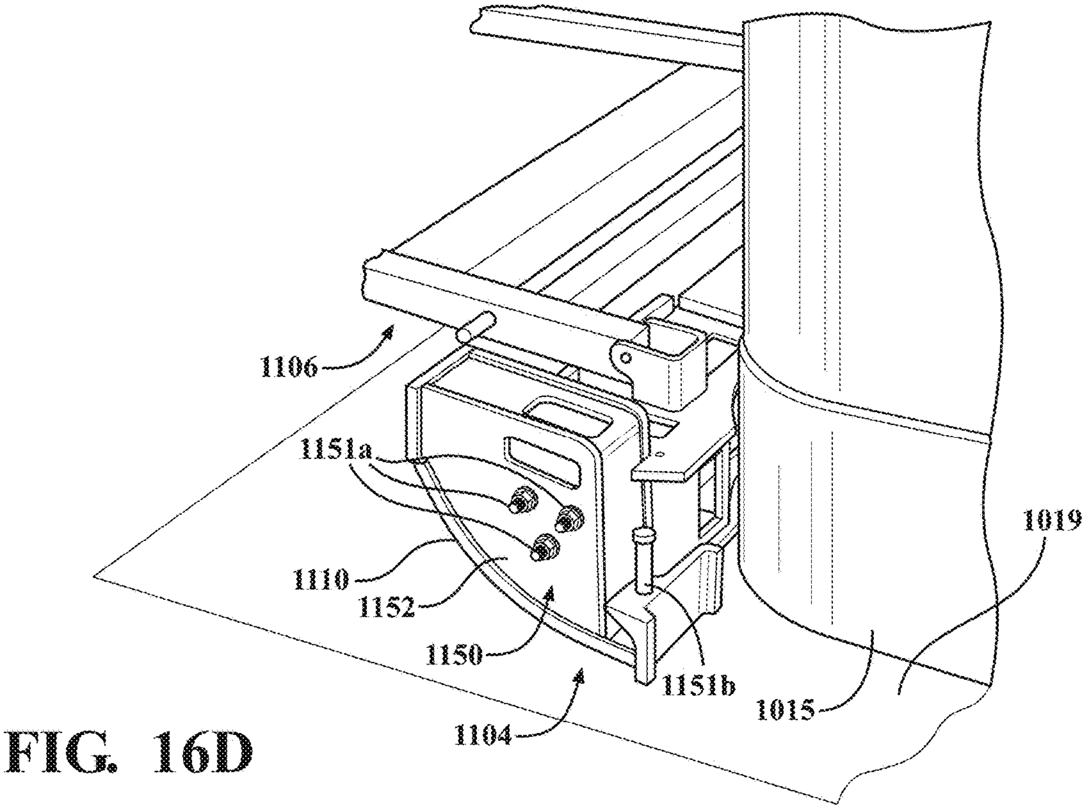

With reference to FIGS. 16C and 16D, the base section 1104 may include at least one raise/lower assembly 1150 for raising and lowering positional portions 1152 of the base section 1104, e.g., for moving the positional portion 1152 between a raised position where it is distal from the floor surface 1019 and a lowered position where it is proximate to the floor surface 1019. According to the exemplary embodiment shown, the base section 1104 includes two raise/lower assemblies 1150 that are respectively located adjacent to the curved ramped surfaces 1110. Each raise/lower assembly 1150 may comprise one or more bolts 1151, and in the exemplary embodiment shown, each raise/lower assembly 1150 comprises three first bolts 1151*a* and one second bolt 1151*b*. When the first and second bolts 1151*a*, 1151*b* are loosened, e.g., manually by an operator, the positional portion 1152 of the base section 1104 can be moved between the raised position and the lowered position. Once each positional portion 1152 is in its desired position, the first and second bolts 1151*a* and 1151*b* are tightened, e.g., manually by the operator, to secure the positional portion 1152 in its desired position, i.e., the positional portion 1152 can only be raised or lowered when the first and second bolts 1151*a* and 1151*b* are loosened. In an exemplary embodiment, before the base section 1104 is positioned adjacent to the first portion 1013 of the vehicle 1010, each positional portion 1152 may be positioned in the raised position so that the bracket structure 1102 can be moved more freely without the positional portions 1152 contacting the floor surface 1019, and once the base section 1104 is positioned adjacent the vehicle 1010 and is secured to the vehicle (as discussed below), each positional portion 1152 may be moved to the lowered position so that the curved ramped surfaces 1110 are located proximate to the floor surface 1019.

Referring back to FIG. 14, the extension section 1106 of the bracket structure 1102 includes at least one first bar 1120, and preferably a pair of first bars 1120, each first bar 1120 having a first end 1122 and a second end 1124. With reference to FIGS. 16A and 16B, the first end 1122 of the at least one first bar 1120 is pivotably connected to the base section 1104 via a pivot connection provided by a pivot pin 1125. A U-shaped bracket 1127 may be provided to limit movement between the at least one first bar 1120 and the base section 1104, and a removable locking pin 1129 may be provided to restrict pivoting movement between the at least one first bar 1120 and the base section 1104 when such pivoting movement is not desired.

The extension section 1106 further includes at least one second bar 1126, and preferably a pair of second bars 1126, each second bar 1126 having a first end 1128 and a second end 1130, see FIG. 14. The first end 1128 of the at least one second bar 1126 is rigidly attached to the second end 1124 of the at least one first bar 1120 at an angle transverse to the at least one first bar 1120, wherein this angle may be 90 degrees. The second end 1130 of the at least one second bar 1126 engages the vehicle 1010 at a second location, wherein the second location is spaced apart from the first location in the first direction $F_D$. The second location may correspond to the second portion 1017 of the vehicle 1010 such that the extension section 1106 engages an intermediate portion 10 of the mast assembly 1016, see FIG. 12.

As shown in FIG. 14, a length L of the at least one second bar 1126 may be adjustable such that the distance between the first and second ends 1128, 1130 thereof may be adjusted such that the system 1100 is able to accommodate a variety of different types and/or sizes of industrial vehicles. The length adjustment of the at least one second bar 1126 may be effected, such as, for example, by forming the at least one second bar 1126 with two bar members 1126A, 1126B that are movably securable with respect to one another. According to one exemplary embodiment, the first bar member 1126A is slidable within a hollow interior portion of the second bar member 1126B. The bar members 1126A, 1126B may be temporarily locked together and prevented from moving with respect to one another, for example, using spring loaded pins on the first bar member 1126A or bolts that are able to be inserted through a selective one of a series of openings formed in the second bar member 1126B so as to adjust the total length L of the at least one second bar 1126.

The extension section 1106 includes securing structure 1132 for temporarily attaching the extension section 1106 to the vehicle 1010 at the second location. The securing structure 1132 may comprise any suitable structure for removably securing the extension section 1106 to the vehicle 1010 at the second location, such as, for example, a clamping or bolting structure 1144 that is located at the second end 1130 of one or both of the second bars 1126 (see FIG. 14), or a strap (not shown) that is secured around the mast assembly 1016 at the second location and a component of the extension section 1106, such as around one or more cross bar members 1142 that extend in the lateral direction $L_D$ between the first bars 1120 and/or between the second bars 1126. The cross bar members 1142 also provide stability to the extension section 1106.

As shown in FIG. 14, the extension section 1106 may further include at least one fork retainer 1146 for supporting forks 1023 that have been removed from the vehicle 1010 for transport. In the embodiment shown, two sets of fork retainers 1146 are provided, which are connected to the first bars 1120 of the extension section 1106. The extension section 1106 may further include at least one fork pin 1147 that receives a fork brace structure 1023*a* of the fork 1023. The fork pins 1147 and the fork retainers 1146 cooperate to secure and support the forks 1023 during transport and while supporting the vehicle 1010 on the system 1100. It is contemplated that the fork retainers 1146 and fork pins 1147 may be located elsewhere on the bracket structure 1102 as desired. The extension section 1106 may further include one or more storage compartment(s), such as, for example, a mesh bag, for holding tools and/or additional other items (not shown).

Figure 17:
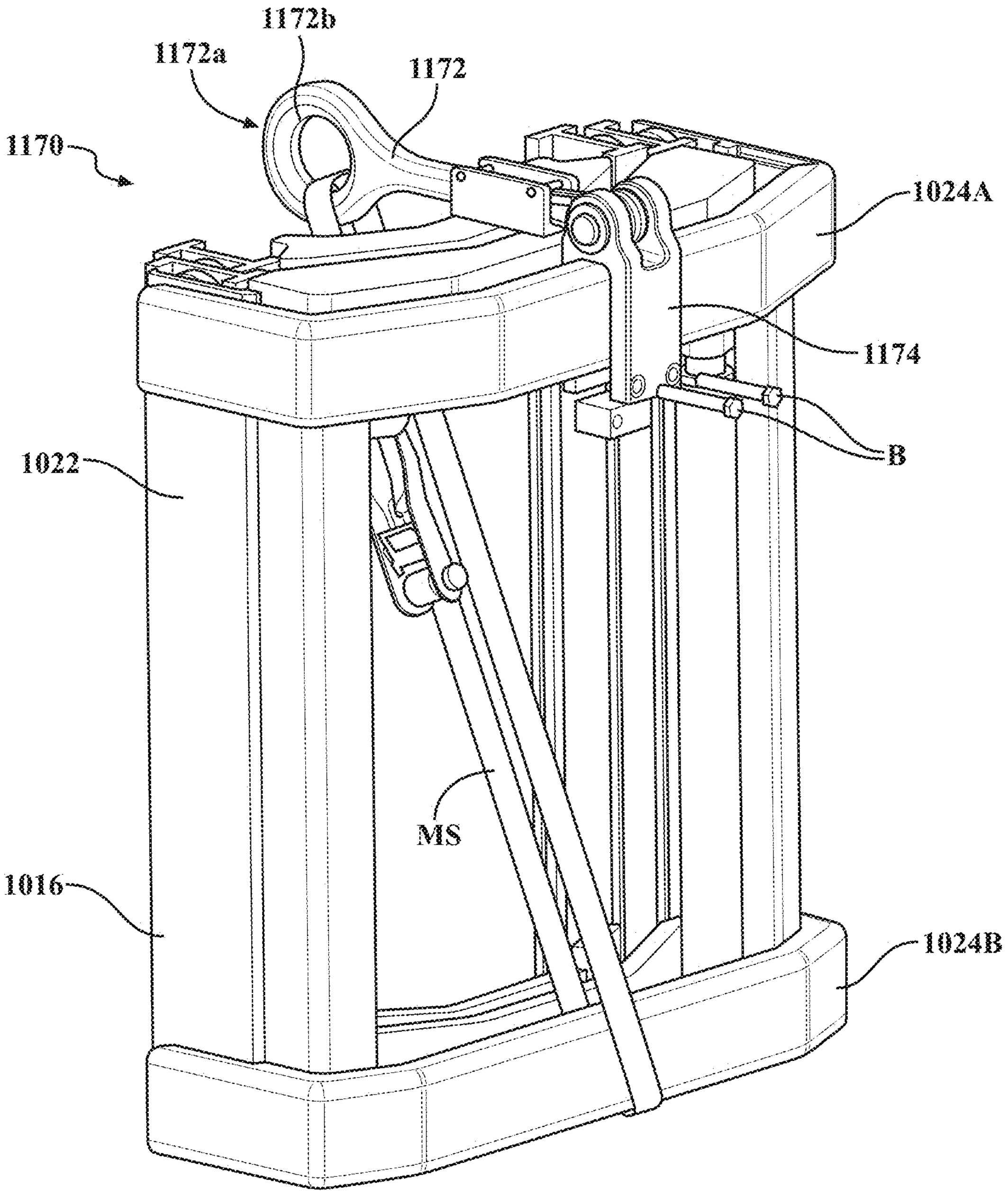
FIG. 17 is a perspective view of a connection mechanism of the layover bracket system of FIG. 12 attached to a mast of the vehicle.

Referring to FIGS. 12 and 17, the system 1100 may further include a connection mechanism 1170 that is used to facilitate the transition of the vehicle 1010 between the vertical and horizontal positions, as will be discussed in greater detail herein. The connection mechanism 1170 comprises a main body 1172 and an attachment portion 1174 that can be removably coupled to an upper portion 1022 of the vehicle 1010, such as, for example, an upper cross beam 1024A located at the top of the mast assembly 1016. The attachment portion 1174 may be a U-shaped bracket that is received over the top of the upper cross beam 1024A and is secured to the upper cross beam 1024A via fastening structure, such as one or more bolts B. The main body 1172 may include a coupling portion 1172*a* that includes an opening or eyelet 1172*b* for receiving a mast strap MS. The mast strap MS may be attached to the coupling portion 1172*a* on one end and to a portion of the mast assembly 1016, e.g., a second cross member 1024B, on another end. The main body 1172 of the connection mechanism 1170 may function as a stop for preventing movement of the mast assembly 1016, e.g., for preventing stages of the mast assembly 1016 from extending, while the vehicle 1010 is supported on the system 1100 in the horizontal position and while the vehicle 1010 is transitioned between the vertical and horizontal positions via the system 1100. The connection mechanism 1170 is coupled to and actuated by a machine 1176, such as a crane, another industrial vehicle, etc., to facilitate the transition of the vehicle 1010 between the upright position and the horizontal position via the system 1100, as will be discussed in greater detail herein.

Figure 18A:
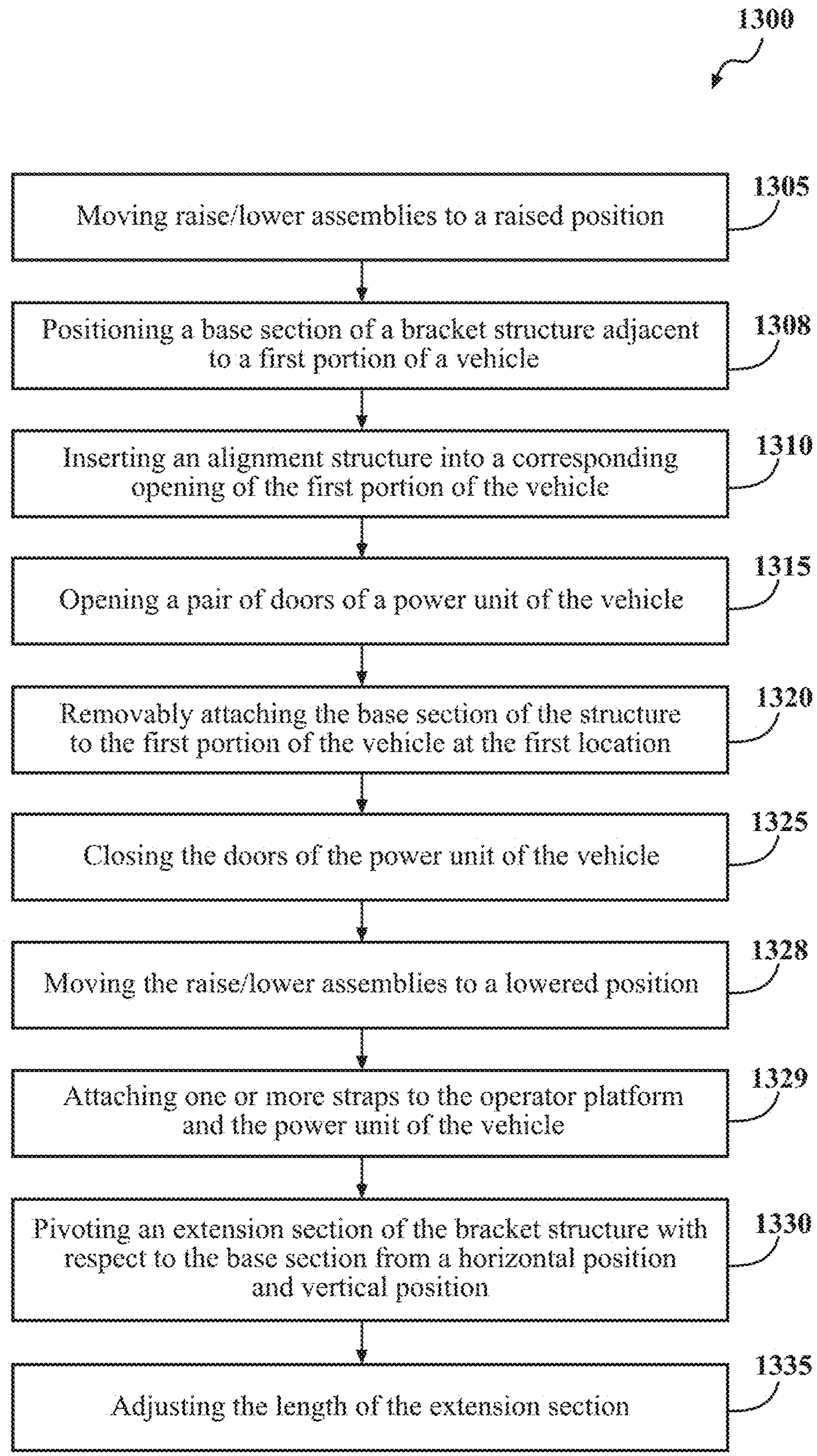
FIGS. 18A and 18B illustrate a method for transitioning a vehicle between a vertical position and a horizontal position using the layover bracket system of FIG. 12 in accordance with embodiments.
Figure 18B:
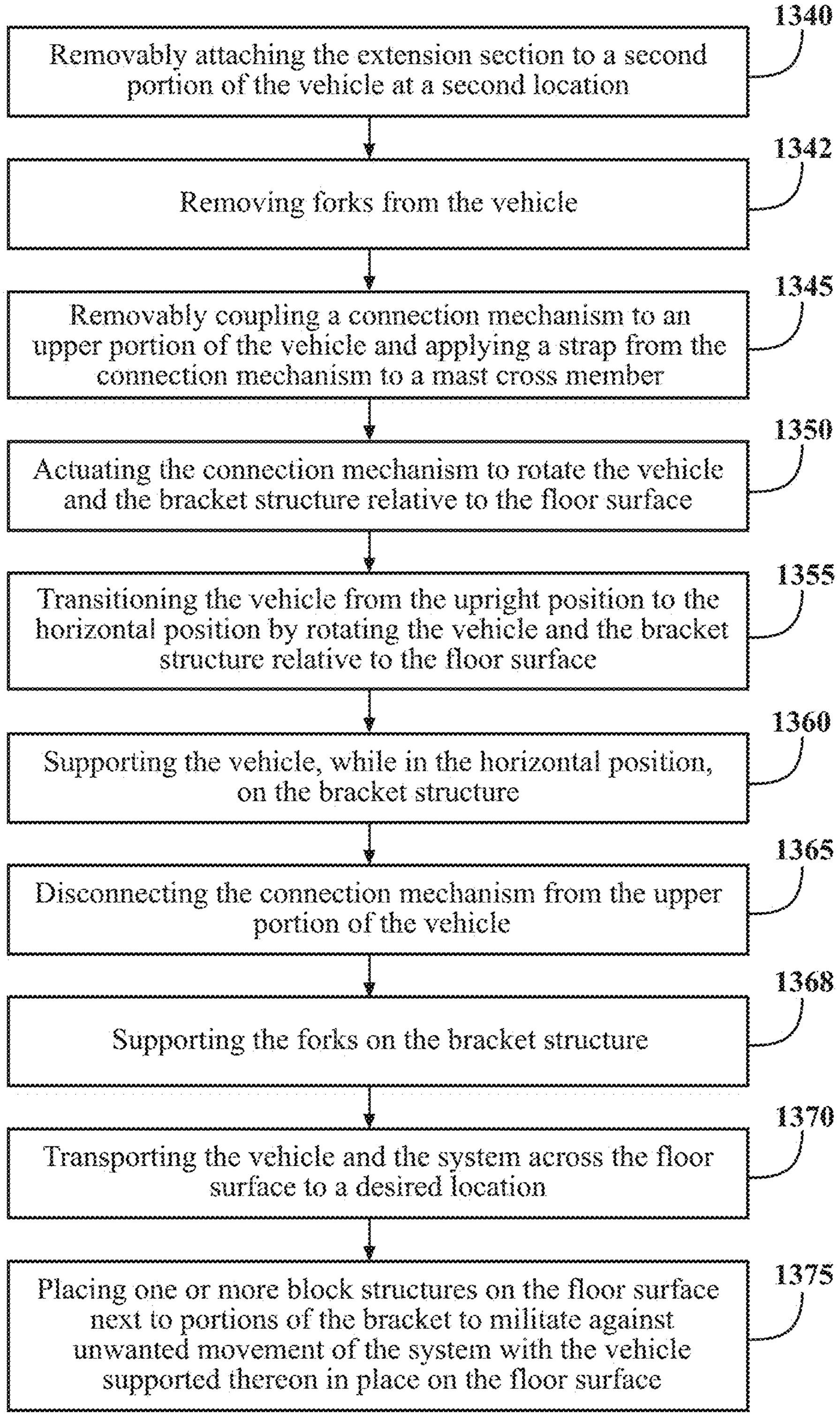

With reference now to FIGS. 18A and 18B, an exemplary method 1300 for transitioning an industrial vehicle between a vertical position and a horizontal position using a layover bracket system in accordance with embodiments will now be described. The method 1300 will be described with reference to the vehicle 1010 and the system 1100 as discussed above. Unless mentioned otherwise, the order of the steps provided for the method below is exemplary, i.e., the steps of the disclosed method do not need to be completed in the order provided unless the step indicates that it is to be completed before or after another step.

As an initial step, components of the vehicle 1010 may be secured in preparation for transitioning the vehicle 1010 from the upright position to the horizontal position. This preparation may include, for example, attaching straps S around various vehicle components, such as, for example an operator platform $O_P$ and outriggers, the power unit 1012 and/or battery cover, etc., see, for example, FIG. 13. The strap S around the operator platform $O_P$ and outriggers may prevent extension of the mast stages, since the operator platform $O_P$ according to the exemplary vehicle 1010 according to this embodiment is raised/lowered with the upper mast stage and the outriggers are fixed with respect to the mast assembly 1016.

Figure 15A:
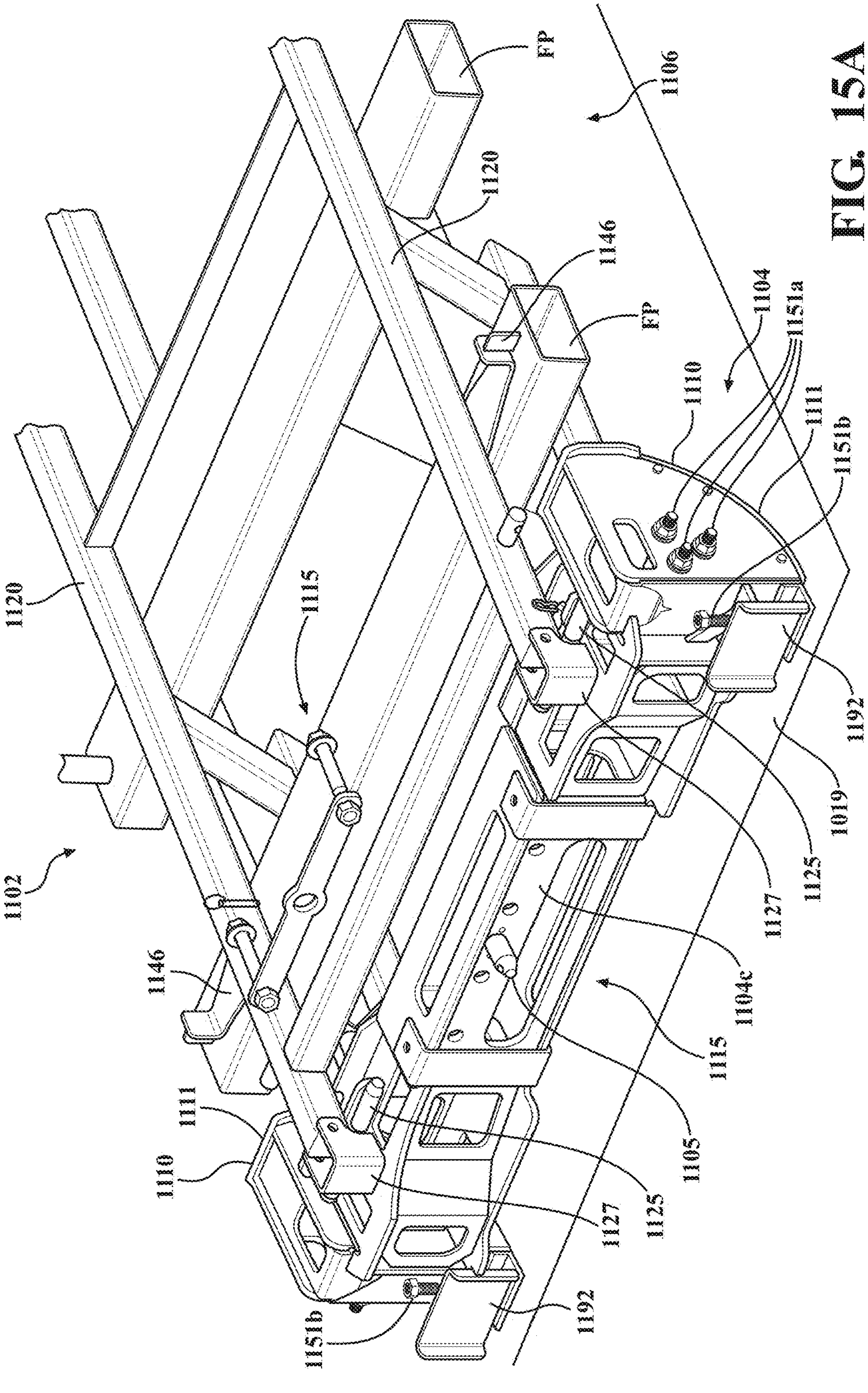
FIG. 15A is a perspective view of a portion of the bracket structure of FIG. 14.
Figure 15B:
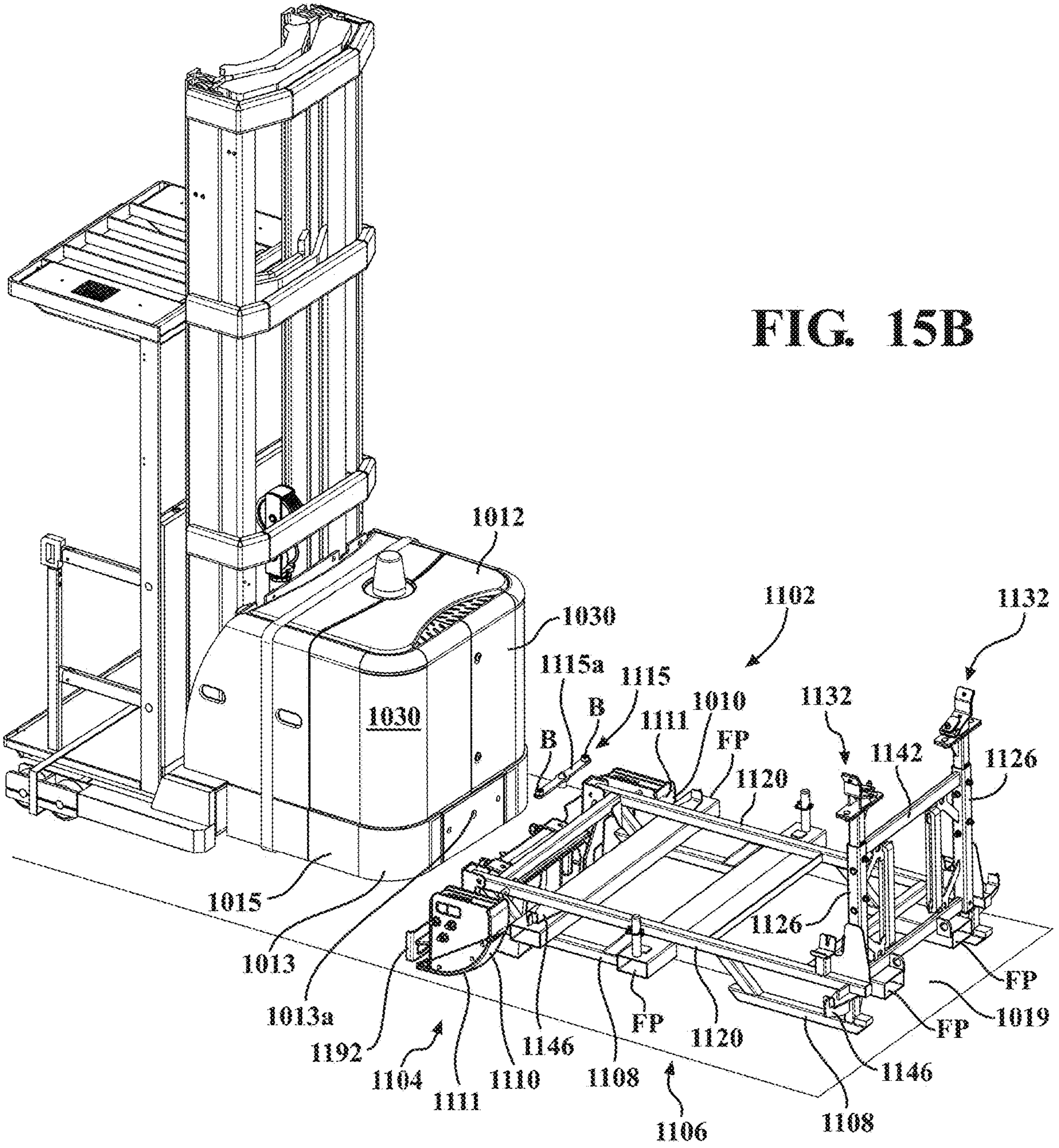
FIG. 15B is a perspective view of the bracket structure of FIG. 14 being aligned with the vehicle for attaching to the vehicle.

Referring to FIG. 18A, at step 1305, if equipped on the bracket structure 1102, the raise/lower assemblies 1150 may be moved to the raised position (if they are not already in the raised position), and at step 1308 the base section 1104 of the bracket structure 1102 is positioned adjacent to the first portion 1013 of the vehicle 1010. As a non-limiting example, an operator of a separate materials handling vehicle may move the bracket structure 1102 by inserting forks of the separate materials handling vehicle into fork pockets FP (see FIG. 14) of the bracket structure 1102 and may move the bracket structure 1102 with the separate materials handling vehicle until the base section 1104 of the bracket structure 1102 is aligned with the first portion 1013 of the vehicle 1010. The base section 1104 may optionally include an alignment structure 1105 (see FIG. 15A), such as, for example, a projection that extends outwardly from a front face 1104C of the base section 1104 and is aligned with a structure or indicia on the first portion 1013 of the vehicle 1010, such as an opening 1013*a*, see FIG. 15B. At step 1310, the alignment structure 1105 may be inserted into the opening 1013*a* of the first portion 1013 of the vehicle 1010 to properly position the bracket structure 1102 relative to the vehicle 1010 as shown in FIG. 15.

At step 1315, a pair of doors 1030 of the vehicle power unit 1012 are opened so the operator can access an area inside the power unit 1012 where the base section 1104 will be removably attached to the vehicle 1010 at the first location, see FIG. 15. At step 1320, the base section 1104 of the bracket structure 1102 is removably attached to the first portion 1013 of the vehicle 1010 at the first location. As shown in FIG. 15, the base section 1104 may be fastened to the first portion 1013 of the vehicle 1010 using the bracket and pin structure 1115 and the bolts B. A bracket 1115*a* of the bracket and pin structure 1115 is placed on the inside of the doors at the first portion 1013 of the vehicle, and the bolts B may be tightened from the outside, making attachment of the bracket structure base section 1104 to the power unit 1012 easier. After the base section 1104 is removably secured to the vehicle 1010, the doors 1030 of the power unit 1012 are closed at step 1325, and if equipped on the bracket structure 1102, the raise/lower assemblies 1150 may be moved to the lowered positions at step 1328. At step 1329, one or more additional straps S may be attached around the operator platform $O_P$ to prevent the operator platform $O_P$ from moving relative to the mast assembly 1016, and one or more additional straps S may be attached around the power unit 1012 to prevent the doors 1030 from opening while the vehicle 1010 is located in the horizontal position and while the vehicle 1010 is transitioned from the upright position to the horizontal position via the system 1100.

Figure 12A:
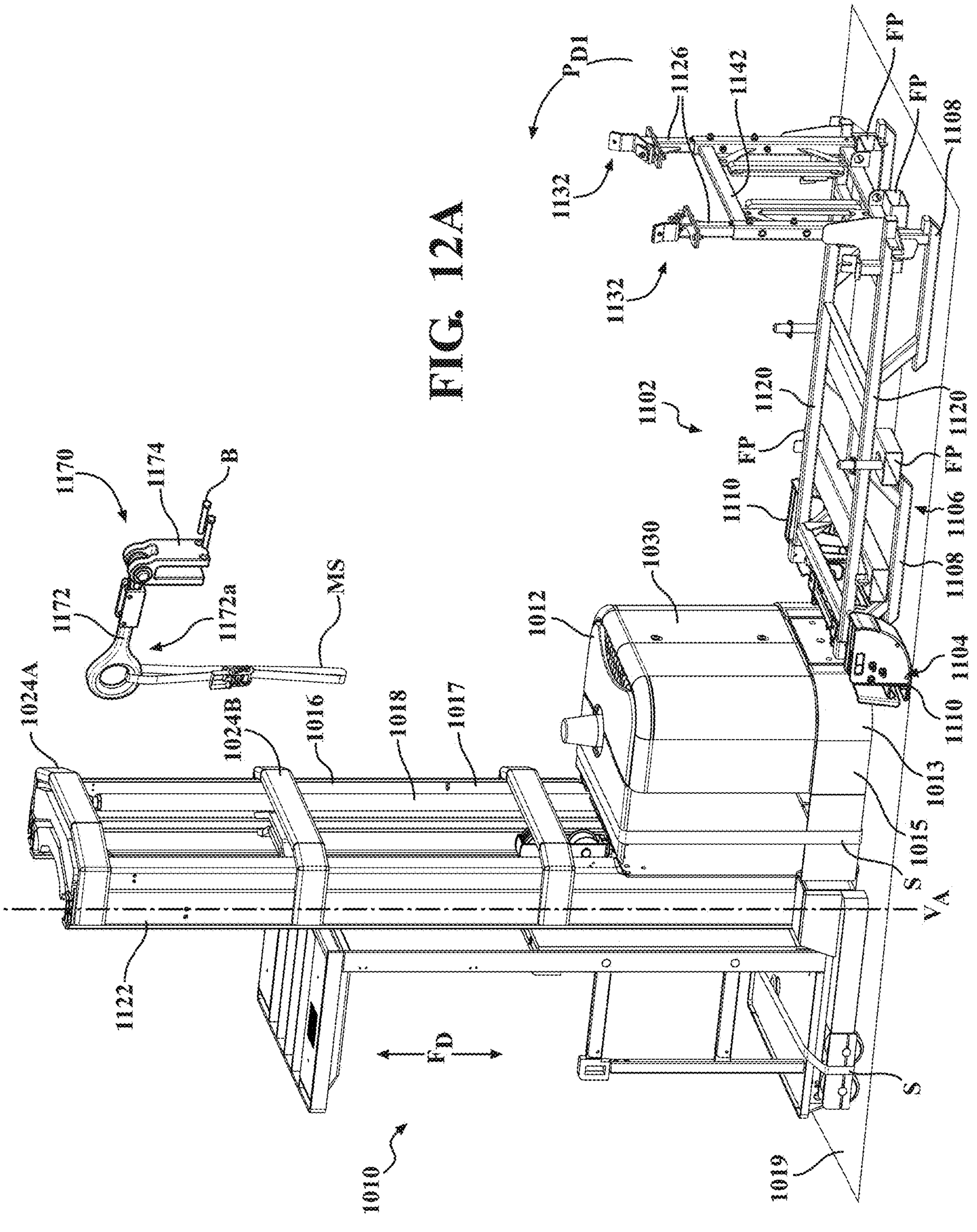
FIG. 12A is a perspective view of the layover bracket system of FIG. 12 attached to the vehicle while the vehicle is in a vertical position.
Figure 12B:
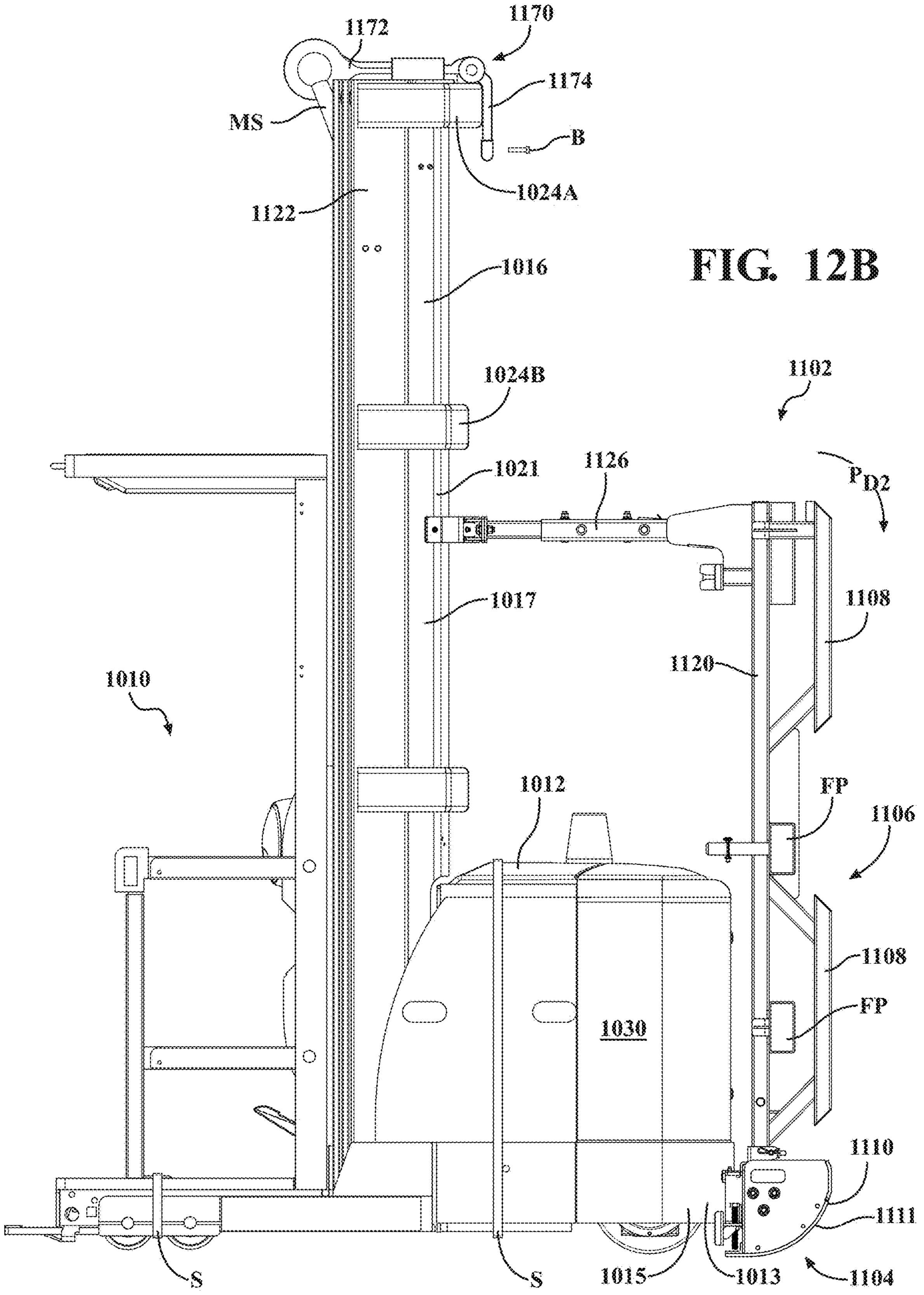
FIG. 12B is a side plan view of the layover bracket system of FIG. 12 attached to the vehicle while the vehicle is in the vertical position.

At step 1330, the extension section 1106 of the bracket structure 1102 is pivoted with respect to the base section 1104 in a first pivot direction $P_{D1}$ (see FIG. 12A) from a horizontal position as shown in FIG. 12A to a vertical position as shown in FIG. 12B. In the illustrated embodiment, pivoting the extension section 1106 with respect to the base section 1104 is effected by pivoting the at least one first bar 1120 of the extension section 1106 in the first pivot direction $P_{D1}$ relative to the base section 1104.

Depending on the distance from the at least one first bar 1120 of the extension section 1106 to the second portion 1017 of the vehicle 1010, the length L of the at least one second bar 1126 of the extension section 1106 may be adjusted at step 1335 such that the at least one second bar 1126 extends up to the vehicle 1010 at the second location. Next, the extension section 1106 is removably attached to the second portion 1017 of the vehicle 1010 at the second location using the securing structure 1132 at step 1340, see FIG. 18B. The second location of the vehicle 1010 may correspond to a location where, when the vehicle 1010 is supported by the bracket structure 1102, the vehicle 1010 will not tip, e.g., as a result of bumps or other forces incurred while the vehicle 1010 is being transported while in the horizontal position.

After steps 1320 and 1340 have been completed, the bracket structure 1102 is at this point attached to the vehicle 1010 at two locations that are spaced apart from one another in the first direction $F_D$, i.e., at the first and second locations at the first and second portions 1013, 1017 of the vehicle 1010. Before step 1330, while the vehicle 1010 is in the vertical position, the at least one first bar 1120 of the extension section 1106 is in a horizontal position, the at least one second bar 1126 of the extension section 1106 is in a vertical position, and the at least one un-wheeled support element 1108 of the extension section 1106 is in a floor engaging position where the at least one un-wheeled support element 1108 engages the floor surface, as shown in FIG. 12A. After step 1340, while the vehicle 10 is in the vertical position, the at least one first bar 1120 of the extension section 1106 is in a vertical position, the at least one second bar 1126 of the extension section 1106 is in a horizontal position, and the at least one un-wheeled support element 1108 of the extension section 1106 is in a non-floor engaging position where the at least one un-wheeled support element 1108 does not engage the floor surface, as shown in FIG. 12B. At step 1342, the forks 1023 may be removed from the vehicle 1010 and may be placed aside as desired.

At step 1345, the connection mechanism 1170 is removably coupled to the upper portion 1022 of the vehicle 1010, for example, to the upper cross beam 1024A of the mast assembly 1016. At this step, the mast strap MS may also be fed through the opening 1172*b* and also attached to the second cross member 1024B. At step 1350, the connection mechanism 1170 is actuated to initiate rotation of the vehicle 1010 and the bracket structure 1102 relative to the floor surface 1019. Actuating the connection mechanism 1170 may be effected by using the machine 1176 to rotate the connection mechanism 1170, thus transitioning the vehicle 1010, with the bracket structure 1102 coupled thereto, from the vertical position to the horizontal position at step 1355, see FIG. 12. During this transition, the bracket structure 1102 rotates while the at least one curved ramp surface 1110 of the base section 1104 supports the bracket structure 1102 and the vehicle 1010 on the floor surface 1019 so as to effectively roll the bracket structure 1102 and the vehicle 1010 from the vertical position to the horizontal position. After step 1355, while the vehicle 1010 is in the horizontal position, the at least one first bar 1120 of the extension section 106 is in a horizontal position, the at least one second bar 1126 of the extension section 1106 is in a vertical position, and the at least one un-wheeled support element 1108 of the extension section 1106 is in a floor engaging position where the at least one un-wheeled support element 1108 engages the floor surface, as shown in FIG. 12.

At step 1360, the bracket structure 1102 supports the vehicle 1010 on the floor surface 1019 in the horizontal position of the vehicle 1010, as shown in FIG. 12. At optional step 1365, the connection mechanism 1170 is detached from the upper portion 1022 of the vehicle 1010 (the connection mechanism 1170 may remain attached to the vehicle 1010 during transport of the vehicle 1010 if desired). At step 1368, the forks 1023 may be supported on the bracket structure 1102 via the fork retainers 1146. At step 1370 the system 1100 with the supported vehicle 1010 may be transported to a desired location across the floor surface 1019. Transport of the system 1100 with the vehicle 1010 supported thereon may be done, for example, by inserting the forks of another vehicle into the fork pockets FP, lifting the bracket structure 1102 and the vehicle 1010 supported thereon, and moving to a desired location. At optional step 1375, one or more anchors or blocks (not shown in this embodiment) are used to further militate against unwanted movement of the system 1100 with the supported vehicle 1010 on the floor surface 1019.

Figure 19A:
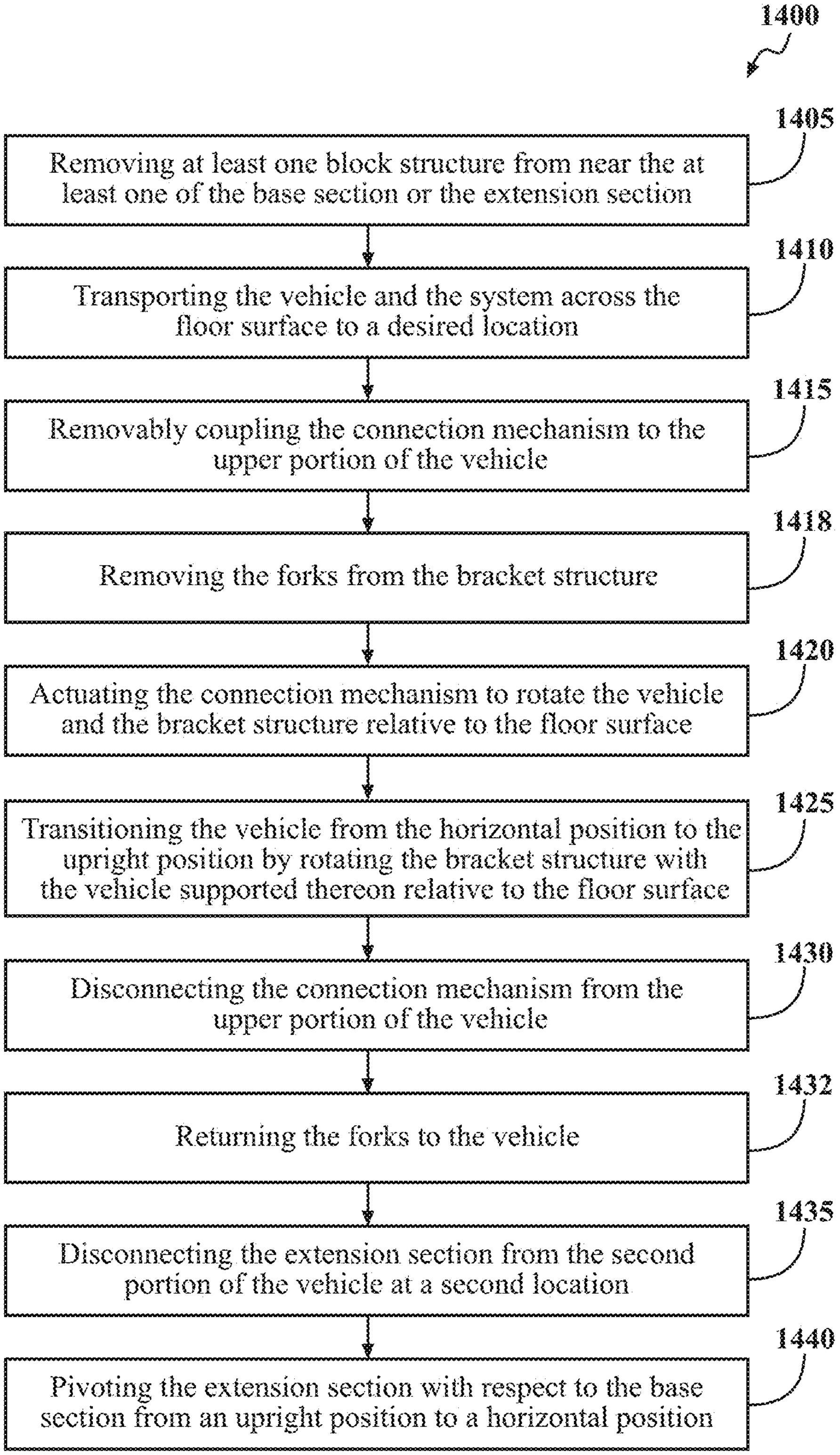
FIGS. 19A and 19B illustrate a method for transitioning a vehicle between a horizontal position and a vertical position using the layover bracket system of FIG. 12 in accordance with embodiments.
Figure 19B:
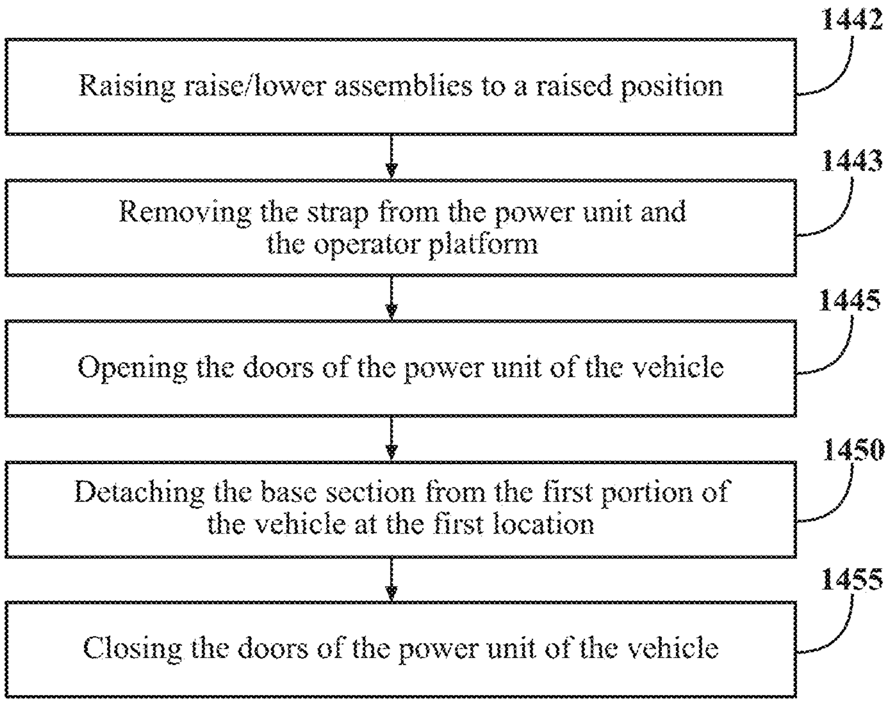

Referring now to FIGS. 19A and 19B, an exemplary method 1400 for transitioning an industrial vehicle between a horizontal position and a vertical position using a layover bracket system in accordance with embodiments will now be described. The method 1400 will be described with reference to the vehicle 1010 and the system 1100 as discussed above. Unless mentioned otherwise, the order of the steps provided for the method below is exemplary, i.e., the steps of the disclosed method do not need to be completed in the order provided unless the step indicates that it is to be completed before or after another step.

Referring to FIG. 19A, at optional step 1405, if utilized, at least one anchor or block is removed to allow movement of the system 1000 with the supported vehicle 1010. At step 1410, the system 1100 and the supported vehicle 1010 may be transported across the floor surface 1019 to a desired location, for example using a separate materials handling vehicle.

At step 1415, if not previously performed, e.g., prior to transport of the vehicle 1010, the connection mechanism 1170 is removably attached to the upper portion 1022 of the vehicle 1010, for example, to the upper cross beam 1024A of the mast assembly 1016. At this step, the mast strap MS may also be fed through the opening 1172*b* and also attached to the second cross member 1024B. At step 1418, the forks 1023 may be removed from bracket structure 1102 and may be placed aside as desired.

At step 1420, the connection mechanism 1170 is actuated to initiate rotation of the vehicle 1010 and the bracket structure 1102 relative to the floor surface 1019. Actuating the connection mechanism 1170 may be effected by using the machine 1176 to rotate the connection mechanism 1170, thus transitioning the vehicle 1010, with the bracket structure 1102 coupled thereto, from the horizontal position to the vertical position at step 1425, see FIG. 12B. During this transition, the bracket structure 1102 rotates while the at least one curved ramp surface 1110 of the base section 1104 supports the bracket structure 1102 and the vehicle 1010 on the floor surface 1019 so as to effectively roll the bracket structure 1102 and the vehicle 1010 from the horizontal position to the vertical position.

Once the vehicle 1010 is in the vertical position, at step 1430, the connection mechanism 1170 is detached from the upper portion 1022 of the vehicle 1010. At step 1432 the forks 1023 may be returned to the vehicle 1010. At step 1435, the extension section 1106 is detached from the second portion 1017 of the vehicle 1010 at the second location.

At step 1440, the extension section 1106 is pivoted with respect to the base section 1104 in a second pivot direction $P_{D2}$ (see FIG. 12B) from a vertical position as shown in FIG. 12B to a horizontal position as shown in FIG. 12A. In the illustrated embodiment, pivoting the extension section 1106 with respect to the base section 1104 is effected by pivoting the at least one first bar 1120 of the extension section 1106 in the second pivot direction $P_{D2}$ relative to the base section 1104. Before step 1440, while the vehicle 1010 is in the vertical position the at least one first bar 1120 of the extension section 1106 is in a vertical position, the at least one second bar 1126 of the extension section 1106 is in a horizontal position, and the at least one un-wheeled support element 1108 of the extension section 1106 is in a non-floor engaging position where the at least one un-wheeled support element 1108 does not engage the floor surface, as shown in FIG. 12B. After step 1440, the at least one first bar 1120 of the extension section 1106 is in a horizontal position, the at least one second bar 1126 of the extension section 1106 is in a vertical position, and the at least one un-wheeled support element 1108 of the extension section 1106 is in a floor engaging position where the at least one un-wheeled support element 1108 engages the floor surface, as shown in FIG. 12A.

Referring now to FIG. 19B, at step 1442, if equipped on the bracket structure 1102, the raise/lower assemblies 1150 may be moved to the raised positions. At step 1443, if used, the strap(s) that keep the doors 1030 of the power unit 1012 closed and the strap(s) used on the operator platform $O_P$ are removed. At step 1445, the doors 1030 are opened so the operator can access the area inside the power unit 1012 so that the base section 1104 can be detached from the vehicle 1010 at the first location. At step 1450, the base section 1104 is detached from the first portion 1013 of the vehicle 1010 at the first location. In the illustrated embodiment, this is effected by removing the bolts B and the bracket and pin structure 1115, see FIG. 15, and then moving the bracket structure 1102 away from the vehicle 1010. After the base section 1104 has been detached from the first portion 1013 of the vehicle 1010, the doors 1030 of the power unit 1012 may be closed at step 1455. Optionally, the straps S and/or other items may be stored in the storage compartment(s) of the bracket structure 1102. The forks 1023 may be removed from the fork retainers 1146 and secured to the vehicle 1010 at any suitable time using conventional methods.

Figure 20:
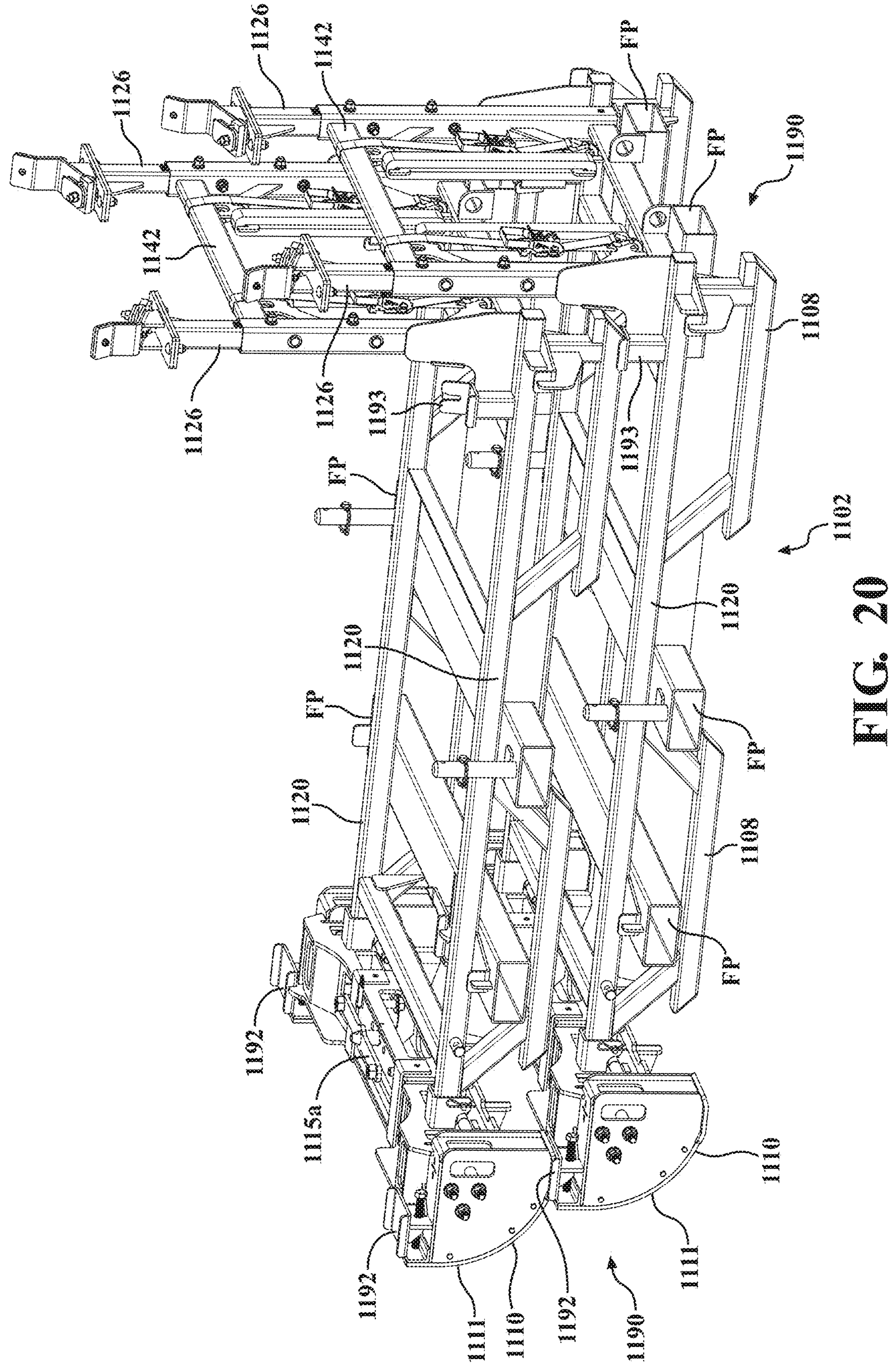
FIG. 20 is a perspective view illustrating the nesting of a plurality of bracket structures according to embodiments.

Referring now to FIG. 20, a plurality of bracket structures 1102 according to embodiments are shown. The bracket structures 1102 may include any or all of the structure of the bracket structures 1102 discussed herein. The bracket structures 1102 according to this embodiment further include nesting structure 1190 that allows multiple bracket structures 1102 to be stacked on top of one another. The exemplary nesting structure 1190 shown in FIG. 20 includes base section nesting supports 1192 that extend upwardly from an upper surface of the base section 1104, and extension section nesting supports 1193 that extend upwardly from an upper surface of the at least one first bar 1120. Each base section nesting support 1192 may receive a curved ramp surface 1110 of another bracket structure 1102 that is nested on top of the bracket structure 1102, and each extension section nesting support 1193 may receive an un-wheeled support element 1108 of the other bracket structure 1102 nested on top of the bracket structure 1102. The stacked configuration for a plurality of bracket structures 1102 provided by the nesting structure 1190 provides space saving benefits when moving/transporting multiple bracket structures 1102.

To prepare the bracket structures 1102 for stacking/nesting, the base section 1104 of each bracket structure 1102 may be rotated such that it is in the position shown in FIG. 16B, wherein the base section nesting supports 1192 extend upwardly from the upper surface of the base section 1104. The locking pin 1129 may be used to lock the position of the base section 1104 and the extension section 1106 relative to one another, see, for example, FIG. 16B. The bracket structures 1102 may then be stacked on top of one another as shown in FIG. 20.

The various features, aspects, and embodiments described herein can be used in any combination(s) with one another, or on their own.

Having thus described embodiments in detail, it will be apparent that modifications and variations are possible without departing from the scope of the appended claims.

The various features, aspects, and embodiments described herein can be used in any combination(s) with one another, or on their own.

Having thus described embodiments in detail, it will be apparent that modifications and variations are possible without departing from the scope of the appended claims.

What is claimed is:

1. A method for transitioning an industrial vehicle between an upright position and a horizontal position using a layover bracket system, the method comprising:

removably attaching a base section of the layover bracket system to a first portion of the vehicle at a first location;

pivoting an extension section of the layover bracket system with respect to the base section;

removably attaching the extension section of the layover bracket system to a second portion of the vehicle at a second location, wherein:

the extension section is pivotably coupled to the base section; and the second location is spaced apart in a first direction from the first location, the first direction being parallel to a vertical axis of the vehicle when positioned in the upright position; and transitioning the vehicle from the upright position to the horizontal position by rotating the vehicle and the layover bracket system relative to a floor surface.

2. The method of claim 1, wherein the base section comprises at least one curved ramp surface that supports the layover bracket system and the vehicle on the floor surface while the vehicle is being transitioned from the upright position to the horizontal position.

3. The method of claim 1, further comprising, after transitioning the vehicle from the upright position to the horizontal position, removably coupling an anchor structure to the floor surface and to at least one of the base section or the extension section to secure the layover bracket system with the vehicle supported thereon in place on the floor surface.

4. The method of claim 1, wherein the extension section comprises at least one bar that engages the second portion of the vehicle at the second location, wherein a length of the at least one bar is adjustable.

5. The method of claim 1, wherein transitioning the vehicle from the upright position to the horizontal position comprises:

removably coupling a connection mechanism to an upper portion of the vehicle; and actuating the connection mechanism to rotate the vehicle and the layover bracket system relative to the floor surface to transition the vehicle from the upright position to the horizontal position.

6. The method of claim 1, wherein:

the extension section comprises:

at least one first bar pivotably coupled to the base section; and at least one second bar rigidly attached to the at least one first bar and positioned at an angle transverse to the at least one first bar, the at least one second bar engaging the second portion of the vehicle at the second location; and pivoting the extension section with respect to the base section comprises pivoting the at least one first bar relative to the base section from a horizontal position of the at least one first bar to a vertical position of the at least one first bar.

7. The method of claim 1, wherein the vehicle is completely supported on the layover bracket system once the vehicle is transitioned to the horizontal position.

8. The method of claim 1, wherein the extension section comprises at least one wheel, and wherein pivoting the extension section causes the at least one wheel to transition from being in a floor engaging position wherein the at least one wheel of the extension section engages the floor surface, to a non-floor engaging position wherein the at least one wheel of the extension section does not engage the floor surface.

9. The method of claim 1, wherein the extension section comprises a plurality of un-wheeled support elements for supporting the system while the vehicle is supported on the system.

10. The method of claim 9, wherein the plurality of un-wheeled support elements comprise elongate rail members with surfaces that extend along the floor surface when the system is supporting the vehicle in the horizontal position.

11. A method comprising:

providing a layover bracket system having an industrial vehicle supported thereon in a horizontal position, the layover bracket system comprising a base section removably attached to a first portion of the vehicle at a first location and an extension section pivotably coupled to the base section and removably attached to a second portion of the vehicle at a second location spaced apart in a first direction from the first location, the first direction being parallel to a vertical axis of the vehicle when positioned in an upright position;

transitioning the vehicle from the horizontal position to the upright position by rotating the layover bracket system with the vehicle supported thereon relative to a floor surface;

detaching the extension section of the layover bracket system from the second portion of the vehicle;

pivoting the extension section relative to the base section; and detaching the base section of the layover bracket system from the first portion of the vehicle.

12. The method of claim 11, wherein the base section comprises at least one curved ramp surface that supports the layover bracket system and the vehicle on the floor surface while the vehicle is being transitioned from the horizontal position to the upright position.

13. The method of claim 11, wherein the extension section comprises at least one bar that engages the second portion of the vehicle at the second location, wherein a length of the at least one bar is adjustable.

14. The method of claim 11, wherein transitioning the vehicle from the horizontal position to the upright position comprises:

removably coupling a connection mechanism to an upper portion of the vehicle; and actuating the connection mechanism to rotate the vehicle and the layover bracket system relative to the floor surface to transition the vehicle from the horizontal position to the upright position.

15. The method of claim 11, wherein the extension section comprises at least one first bar pivotably coupled to the base section and at least one second bar rigidly attached to the at least one first bar and positioned at an angle transverse to the at least one first bar, the at least one second bar engaging the second portion of the vehicle at the second location.

16. The method of claim 11, wherein the extension section comprises at least one wheel, and wherein pivoting the extension section causes the at least one wheel to transition from being in a non-floor engaging position wherein the at least one wheel of the extension section does not engage the floor surface, to a floor engaging position wherein the at least one wheel of the extension section engages the floor surface.

17. The method of claim 11, wherein the extension section comprises a plurality of un-wheeled support elements for supporting the system while the vehicle is supported on the system.

18. The method of claim 17, wherein the plurality of un-wheeled support elements comprise elongate rail members with surfaces that extend along the floor surface when the system is supporting the vehicle in the horizontal position.

* * * * *